(12) United States Patent
Dailey et al.

(10) Patent No.: US 11,704,003 B2
(45) Date of Patent: Jul. 18, 2023

(54) GRAPHICAL USER INTERFACE FOR SLIDE-SCANNER CONTROL

(71) Applicant: LEICA BIOSYSTEMS IMAGING, INC., Vista, CA (US)

(72) Inventors: Timothy Dailey, Vista, CA (US); Peyman Najmabadi, Vista, CA (US); Nicholas Newberg, Vista, CA (US); Paul Georgief, Vista, CA (US); Lance Mikus, Vista, CA (US); Prentash Djelosevic, Vista, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 6 days.

(21) Appl. No.: 17/631,336

(22) PCT Filed: Aug. 6, 2020

(86) PCT No.: PCT/US2020/045243
§ 371 (c)(1),
(2) Date: Jan. 28, 2022

(87) PCT Pub. No.: WO2021/026374
PCT Pub. Date: Feb. 11, 2021

(65) Prior Publication Data
US 2022/0283679 A1    Sep. 8, 2022

Related U.S. Application Data

(60) Provisional application No. 62/883,465, filed on Aug. 6, 2019.

(51) Int. Cl.
*G06F 3/048* (2013.01)
*G06F 3/0484* (2022.01)
(Continued)

(52) U.S. Cl.
CPC ..... *G06F 3/0484* (2013.01); *G01N 35/00029* (2013.01); *G01N 35/00732* (2013.01);
(Continued)

(58) Field of Classification Search
CPC ... G01N 2035/0439; G01N 2035/0456; G01N 2035/0448
See application file for complete search history.

(56) References Cited

U.S. PATENT DOCUMENTS

D852,976 S    7/2019 Newberg et al.
D853,579 S    7/2019 Newberg et al.
(Continued)

FOREIGN PATENT DOCUMENTS

EP    2362228 A1    8/2011
WO    WO 2015/143084 A1    9/2015
(Continued)

OTHER PUBLICATIONS

Gorrec et al., Automated Protocols for Macromolecular Crystallization at the MRC Laboratory of Molecular Biology, 2018, Journal of Visualized Experiments, 18 pages.*
(Continued)

*Primary Examiner* — Linh K Pham
(74) *Attorney, Agent, or Firm* — Frost Brown Todd LLP

(57) ABSTRACT

Graphical user interface for managing a workflow of a slide scanning system. In an embodiment, the graphical user interface comprises a graphical representation of a carousel used by the scanning system. The graphical representation of the carousel comprises a graphical representation of each of a plurality of rack slots, configured to receive slide racks. The graphical representation of the carousel indicates a position of the carousel, and the graphical representation of
(Continued)

each of the plurality of rack slots indicates a status of the represented rack slot and/or a slide rack within the represented rack slot.

20 Claims, 39 Drawing Sheets

(51) Int. Cl.
*G01N 35/00* (2006.01)
*G01N 35/02* (2006.01)
*G06F 3/0488* (2022.01)

(52) U.S. Cl.
CPC ......... *G01N 35/025* (2013.01); *G06F 3/0488* (2013.01); *G01N 2035/009* (2013.01); *G01N 2035/0091* (2013.01)

(56) References Cited

U.S. PATENT DOCUMENTS

| | | | |
|---|---|---|---|
| D870,142 S | 12/2019 | Dailey et al. | |
| 10,697,943 B2* | 6/2020 | Yamamoto | G01N 30/24 |
| D891,637 S | 7/2020 | Newberg et al. | |
| 2002/0154157 A1* | 10/2002 | Sherr | H04L 63/12 |
| | | | 715/716 |
| 2016/0213143 A1* | 7/2016 | Hogeback | A47B 73/00 |
| 2017/0176480 A1* | 6/2017 | Moschell | G01N 35/00722 |
| 2020/0241024 A1* | 7/2020 | Yabutani | G01N 35/00722 |
| 2021/0147786 A1* | 5/2021 | Yamamoto | C12M 41/48 |

FOREIGN PATENT DOCUMENTS

| | | |
|---|---|---|
| WO | WO 2017/053891 A1 | 3/2017 |
| WO | WO 2017/184821 A1 | 10/2017 |
| WO | WO 2018/126138 A1 | 7/2018 |
| WO | WO 2019/036647 A1 | 2/2019 |
| WO | WO 2019/068038 A1 | 4/2019 |
| WO | WO 2019/068039 A1 | 4/2019 |
| WO | WO 2019/068043 A1 | 4/2019 |
| WO | WO 2019/071040 A1 | 4/2019 |
| WO | WO 2019/071042 A1 | 4/2019 |
| WO | WO 2019/071044 A1 | 4/2019 |
| WO | WO 2019/071049 A1 | 4/2019 |
| WO | WO 2019/104342 A1 | 5/2019 |
| WO | WO 2019/108691 A1 | 6/2019 |
| WO | WO 2019/108854 A1 | 6/2019 |
| WO | WO 2019/109020 A1 | 6/2019 |
| WO | WO 2019/109024 A1 | 6/2019 |
| WO | WO 2019/109027 A1 | 6/2019 |
| WO | WO 2019/109028 A1 | 6/2019 |
| WO | WO 2019/109031 A1 | 6/2019 |
| WO | WO 2019/109032 A1 | 6/2019 |
| WO | WO 2019/109034 A1 | 6/2019 |
| WO | WO 2019/169337 A1 | 9/2019 |

OTHER PUBLICATIONS

Aperio GT 450, screenshot of Google image search results, accessed on Jan. 17, 2019.
Aperio GT 450 User's Guide, Revision C, published Oct. 28, 2019.
Leica Biosystems: "Leica Aperio GT 450 RUO", uploaded Jul. 30, 2019, retrieved from the internet <https://vimeo.com/350887835>, accessed Sep. 8, 2022.
International Search Report and Written Opinion dated Dec. 14, 2020, for International Application No. PCT/US2020/045243, 9 pages.
International Preliminary Report on Patentability dated Oct. 29, 2021, for International Application No. PCT/US2020/045243, 6 pages.

* cited by examiner

GRAPHICAL USER INTERFACE FOR SLIDE-SCANNER CONTROL

CROSS-REFERENCE TO RELATED APPLICATIONS

The present application claims priority to U.S. Patent Provisional App No. 62/883,465, filed Aug. 6, 2019, which is hereby incorporated herein by reference as if set forth in full.

In addition, the present application is related to the following applications, are all hereby incorporated herein by reference as if set forth in full:
International Patent App. No. PCT/US2016/053581, filed Sep. 23, 2016;
International Patent App. No. PCT/US2017/028532, filed Apr. 20, 2017;
International Patent App. No. PCT/US2018/063456, filed Nov. 30, 2018;
International Patent App. No. PCT/US2018/063460, filed Nov. 30, 2018;
International Patent App. No. PCT/US2018/063450, filed Nov. 30, 2018;
International Patent App. No. PCT/US2018/063461, filed Nov. 30, 2018;
International Patent App. No. PCT/US2018/062659, filed Nov. 27, 2018;
International Patent App. No. PCT/US2018/063464, filed Nov. 30, 2018;
International Patent App. No. PCT/US2018/054460, filed Oct. 4, 2018;
international Patent App. No. PCT/US2018/063465, filed Nov. 30, 2018;
International Patent App. No. PCT/US2018/054462, filed Oct. 4, 2018;
International Patent App. No. PCT/US2018/063469, filed Nov. 30, 2018;
International Patent App. No. PCT/US2018/054464, filed Oct. 4, 2018;
International Patent App. No. PCT/US2018/046944, filed Aug. 17, 2018;
International Patent App. No. PCT/US2018/1054470, filed Oct. 4, 2018;
International Patent App. No. PCT/US2018/053632, filed Sep. 28, 2018;
International Patent App. No. PCT/US2018/053629, filed Sep. 28, 2018;
International Patent App. No. PCT/US2018/053637, filed Sep. 28, 2018;
International Patent App. No. PCT/US2018/062905, filed Nov. 28, 2018;
International Patent App. No. PCT/US2018/063163, filed Nov. 29, 2018;
International Patent App. No. PCT/US2017/068963, filed Dec. 29, 2017;
International Patent App. No. PCT/US2019/1020411, filed Mar. 1, 2019;
U.S. patent application Ser. No. 29/631,492, filed Dec. 29, 2017;
U.S. patent application Ser. No. 29/631,495, filed Dec. 29, 2017;
U.S. patent application Ser. No. 29/631,499, filed Dec. 29, 2017; and
U.S. patent application Ser. No. 29/631,501, filed Dec. 29, 2017.

BACKGROUND

Field of the Invention

The embodiments described herein are generally directed to control of a slide scanning system, and, more particularly, to a graphical user interface for managing a workflow of a slide scanning system.

SUMMARY

Accordingly, systems, methods, and non-transitory computer-readable media are disclosed for a graphical user interface for managing a workflow of a slide scanning system.

In an embodiment, a method comprises using at least one hardware processor of a scanning system, which comprises a display and a carousel comprising a plurality of rack slots configured to receive slide racks, to: generate a graphical user interface comprising a graphical representation of the carousel, wherein the graphical representation of the carousel comprises a graphical representation of each of the plurality of rack slots, wherein the graphical representation of the carousel indicates a position of the carousel, and wherein the graphical representation of each of the plurality of rack slots indicates a status of the represented rack slot or a slide rack within the represented rack slot; and display the graphical user interface on the display of the scanning system.

Each status of the represented rack slot or a slide rack within the represented rack slot may be one of: an empty status indicating that the represented rack slot is empty; a waiting status indicating that the represented rack slot has a slide rack and the slide rack within the represented rack slot is waiting to be processed by the scanning system; a scanning status indicating that the represented rack slot has a slide rack and the slide rack within the represented rack slot is being processed by the scanning system; a complete status indicating that the represented rack slot has a slide rack and the slide rack within the represented rack slot has been completely processed by the scanning system; or a warning status indicating that the represented rack slot has a slide rack and a warning was encountered during processing of the slide rack within the represented rack slot.

The display may comprise a touch-panel display, wherein the graphical representation of each of the plurality of rack slots is selectable via the touch-panel display, and wherein the method further comprises using the at least one hardware processor to, when the graphical representation of any one of the plurality of rack slots is selected: display a selectable graphical representation of one or more functions available for the represented rack slot; and, when the selectable graphical representation of any one of the one or more functions is selected, execute the function represented by the selected graphical representation. The one or more functions may comprise one or more of: a rotate function, which rotates the carousel to position the represented rack slot within an exposed portion of the scanning system, which is exposed to an external environment of the scanning system; a priority function, which prioritizes processing of the represented rack slot over processing of one or more other ones of the plurality of rack slots; a Z-stacking function, which scans at least one slide within the represented slide rack at multiple focal depths; or a setting function, which scans at least one slide within the represented slide rack according to a specified scan protocol.

The graphical representation of the carousel may comprise a time-till-operation indication, and the method may further comprise using the at least one hardware processor to, when determining to rotate the carousel, automatically: delay rotation of the carousel for a delay period; and, during the delay period, animate the time-till-operation indication to indicate a time remaining within the delay period. The method may further comprise using the at least one hardware processor to, when determining to rotate the carousel, reset the delay period in response to detecting a user interaction with the carousel.

The display may comprise a touch-panel display, wherein the graphical representation of each of the plurality of rack slots is selectable via the touch-panel display, and wherein the graphical user interface further comprises a viewing pane, and the method may further comprise using the at least one hardware processor to: in response to the graphical representation of any one of the plurality of rack slots being selected, populate the viewing pane with information about the represented rack slot or a slide rack within the represented rack slot; and, when no graphical representation of any one of the plurality of rack slots has been selected, while scanning system is processing a slide rack, populate the viewing pane with information about the slide rack being processed. The information about the represented rack slot or a slide rack within the represented rack slot may comprise, when the represented rack slot is occupied by a slide rack: when the occupying slide rack has not yet been processed, an indication that the slide rack is waiting to be processed; and, when the occupying slide rack is being processed or has been processed, processing results. In a rack view, the processing results may comprise an inventory of slides within the occupying slide rack, wherein the inventory comprises, for each inventoried slide, an indication of a status of the inventoried slide, wherein the status of the inventoried slide comprises one of: a completed status, which indicates that the inventoried slide has been scanned; a scanning status, which indicates that the inventoried slide is currently being scanned; or a warning status, which indicates that a warning was encountered during scanning of the inventoried slide. In a slide view, the processing results may comprise a digital image of one of the inventoried slides. The slide view may be accessed by selecting an inventoried slide, from the inventory in the rack view, via the touch-panel display.

Any embodiment of these methods may be embodied in executable software modules of a scanning system, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for a graphical user interface for managing a workflow of a slide scanning system. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Scanning System

1.1. Overview

Figure 1A:
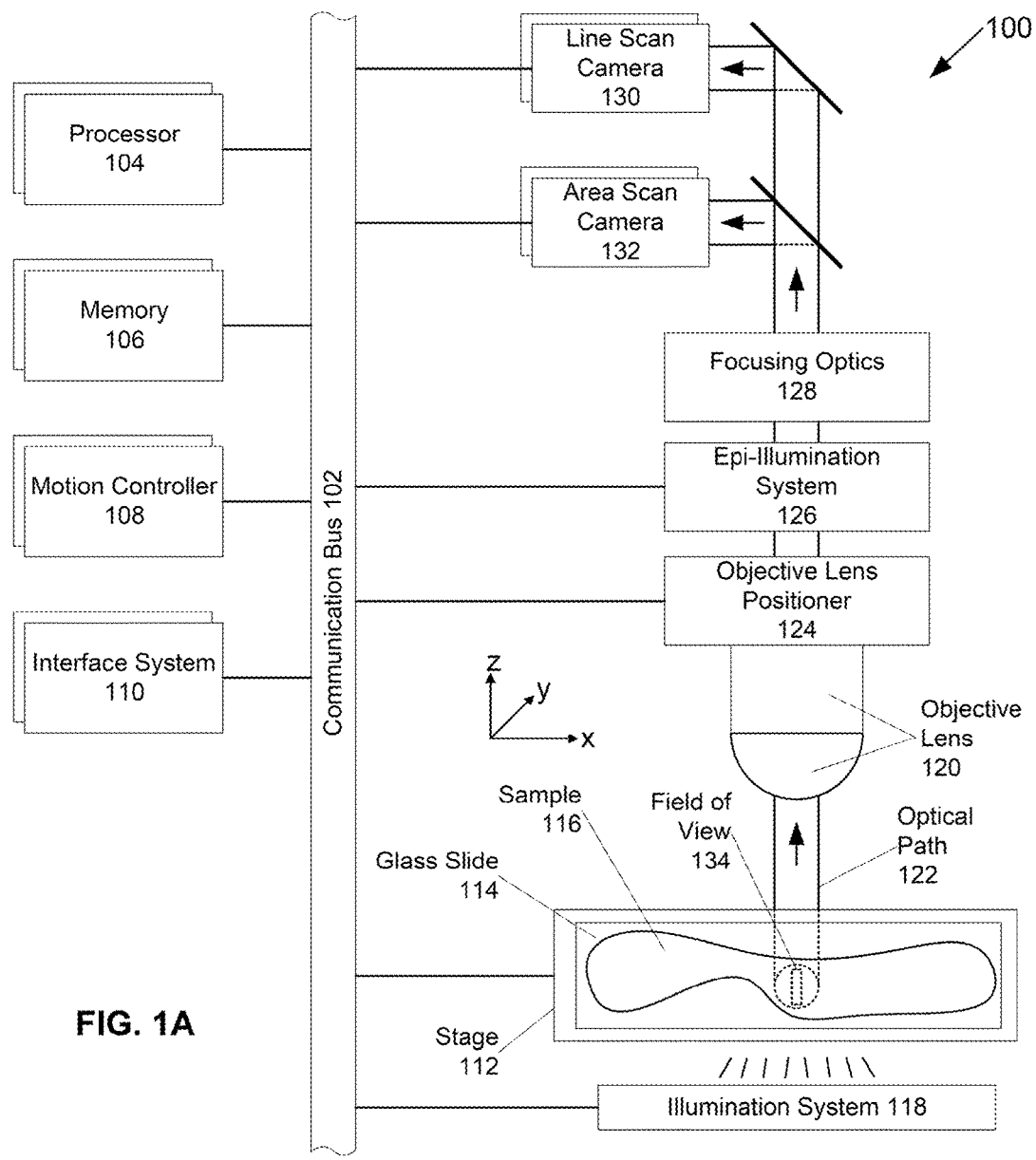
FIG. 1A illustrates an example processor-enabled device that may be used in connection with the various embodiments described herein, according to an embodiment.
Figure 1B:
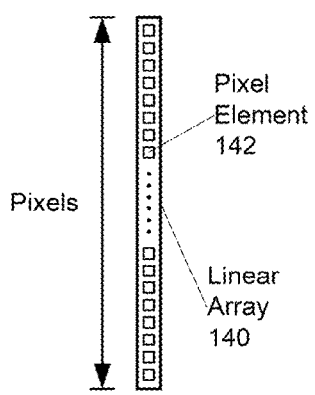
FIG. 1B illustrates an example line scan camera having a single linear array, according to an embodiment.

FIG. 1A is a block diagram illustrating an example processor-enabled device 100 that may be used in connection with various embodiments described herein. Alternative forms of the device 100 may also be used as will be understood by the skilled artisan. In the illustrated embodiment, the device 100 is presented as a digital imaging device (also referred to herein as a scanner system, scanning system, digital scanning apparatus, digital slide scanning apparatus, etc.) that comprises one or more processors 104, one or more memories 106, one or more motion controllers 108, one or more interface systems 110, one or more movable stages 112 that each support one or more glass slides 114 with one or more samples 116, one or more illumination systems 118 that illuminate sample 116, one or more objective lenses 120 that each define an optical path 122 that travels along an optical axis, one or more objective lens positioners 124, one or more optional epi-illumination systems 126 (e.g., included in a fluorescence scanner system one or more focusing optics 128, one or more line scan cameras 130, and/or one or more area scan cameras 132, each of which define a separate field of view 134 on sample 116 and/or glass slide 114. The various elements of scanner system 100 are communicatively coupled via one or more communication busses 102. Although there may be one or more of each of the various elements of scanner system 100, for simplicity in the description that follows, these elements will be described in the singular, except when needed to be described in the plural to convey the appropriate information.

Processor 104 may include, for example, a central processing unit (CPU) and a separate graphics processing unit (GPU) capable of processing instructions in parallel, or a multicore processor capable of processing instructions in parallel. Additional separate processors may also be provided to control particular components or perform particular functions, such as image processing. For example, additional processors may include an auxiliary processor to manage data input, an auxiliary processor to perform floating point mathematical operations, a special-purpose processor having an architecture suitable for fast execution of signal-processing algorithms (e.g., digital-signal processor), a slave processor subordinate to the main processor (e.g., back-end processor), an additional processor for controlling line scan camera 130, stage 112, objective lens 120, and/or a display (not shown). Such additional processors may be separate discrete processors or may be integrated with processor 104.

Memory 106 provides storage of data and instructions for programs that can be executed by processor 104. Memory 106 may include one or more volatile and/or non-volatile computer-readable storage mediums that store the data and instructions. These mediums may include, for example, random-access memory (RAM), read-only memory (ROM), a hard disk drive, a removable storage drive (e.g., comprising flash memory), and/or the like. Processor 104 is configured to execute instructions that are stored in memory 106, and communicate via communication bus 102 with the various elements of scanner system 100 to carry out the overall function of scanner system 100.

Communication bus 102 may include a communication bus that is configured to convey analog electrical signals and/or a communication bus that is configured to convey digital data. Accordingly, communications from processor 104, motion controller 108, and/or interface system 110, via communication bus 102, may include both electrical signals and digital data. Processor 104, motion controller 108, and/or interface system 110 may also be configured to communicate with one or more of the various elements of scanning system 100 via a wireless communication link.

Motion control system 108 is configured to precisely control and coordinate X, Y, and/or Z movement of stage 112 (e.g., within an X-Y plane) and/or objective lens 120 (e.g., along a Z axis orthogonal to the X-Y plane, via objective lens positioner 124). Motion control system 108 may also be configured to control movement of any other moving part in scanner system 100. For example, in a fluorescence scanner embodiment, motion control system 108 is configured to coordinate movement of optical filters and/or the like in epi-illumination system 126.

Interface system 110 allows scanner system 100 to interface with other systems and human operators. For example, interface system 110 may include a user interface (e.g., a touch panel display) to provide information directly to an operator and/or allow direct input from an operator. Interface system 110 may also be configured to facilitate communication and data transfer between scanning system 100 and one or more external devices that are directly connected to scanning system 100 (e.g., a printer, removable storage medium, etc.), and/or one or more external devices that are indirectly connected to scanning system 100, for example, via one or more networks (e.g., an image server, an operator station, a user station, an administrative server, etc.).

Illumination system 118 is configured to illuminate at least a portion of sample 116. Illumination system 118 may include, for example, one or more light sources and illumination optics. The light source(s) could comprise a variable intensity halogen light source with a concave reflective mirror to maximize light output and a KG-1 filter to suppress heat. The light source(s) could comprise any type of arc-lamp, laser, or other source of light. In an embodiment, illumination system 118 illuminates sample 116 in transmission mode, such that line scan camera 130 and/or area scan camera 132 sense optical energy that is transmitted through sample 116. Alternatively or additionally, illumination system 118 may be configured to illuminate sample 116 in reflection mode, such that line scan camera 130 and/or area scan camera 132 sense optical energy that is reflected from sample 116. Illumination system 118 may be configured to be suitable for interrogation of sample 116 in any known mode of optical microscopy.

In an embodiment, scanner system 100 includes an epi-illumination system 126 to optimize scanner system 100 for fluorescence scanning. It should be understood that, if fluorescence scanning is not supported by scanner system 100, epi-illumination system 126 may be omitted. Fluorescence scanning is the scanning of samples 116 that include fluorescence molecules, which are photon-sensitive molecules that can absorb light at a specific wavelength (i.e., excitation). These photon-sensitive molecules also emit light at a higher wavelength (i.e., emission), Because the efficiency of this photoluminescence phenomenon is very low, the amount of emitted light is often very low. This low amount of emitted light typically frustrates conventional techniques for scanning and digitizing sample 116 (e.g., transmission-mode microscopy).

Advantageously, in an embodiment of scanner system 100 that utilizes fluorescence scanning, use of a line scan camera 130 that includes multiple linear sensor arrays (e.g., a time-delay-integration (TDI) line scan camera) increases the sensitivity to light of line scan camera 130 by exposing the same area of sample 116 to each of the plurality of linear sensor arrays of line scan camera 130. This is particularly useful when scanning faint fluorescence samples with low levels of emitted light. Accordingly, in a fluorescence-scanning embodiment, line scan camera 130 is preferably a monochrome TDI line scan camera. Monochrome images are ideal in fluorescence microscopy because they provide a more accurate representation of the actual signals from the various channels present on sample 116. As will be understood by those skilled in the art, a fluorescence sample can be labeled with multiple florescence dyes that emit light at different wavelengths, which are also referred to as "channels."

Furthermore, because the low-end and high-end signal levels of various fluorescence samples present a wide spectrum of wavelengths for line scan camera 130 to sense, it is desirable for the low-end and high-end signal levels that line scan camera 130 can sense to be similarly wide. Accordingly, in a fluorescence-scanning embodiment, line scan camera 130 may comprise a monochrome 10-bit 64-linear-array TDI line scan camera. It should be noted that a variety of bit depths for line scan camera 130 can be employed for use with such an embodiment.

Movable stage 112 is configured for precise X-Y movement under control of processor 104 or motion controller 108. Movable stage 112 may also be configured for Z movement under control of processor 104 or the motion controller 108. Moveable stage 112 is configured to position sample 116 in a desired location during image data capture by line scan camera 130 and/or area scan camera 132. Movable stage 112 is also configured to accelerate sample 116 in a scanning direction to a substantially constant velocity, and then maintain the substantially constant velocity during image data capture by line scan camera 130. In an embodiment, scanner system 100 may employ a high-precision and tightly coordinated X-Y grid to aid in the location of sample 116 on movable stage 112. In an embodiment, movable stage 112 is a linear-motor-based X-Y stage with high-precision encoders employed on both the X and the Y axes. For example, very precise nanometer encoders can be used on the axis in the scanning direction and on the axis that is in the direction perpendicular to the scanning direction and on the same plane as the scanning direction. Stage 112 is also configured to support glass slide 114 upon which sample 116 is disposed.

Sample 116 can be anything that may be interrogated by optical microscopy. For example, glass microscope slide 114 is frequently used as a viewing substrate for specimens that include tissues and cells, chromosomes, deoxyribonucleic acid (DNA), protein, blood, bone marrow, urine, bacteria, beads, biopsy materials, or any other type of biological material or substance that is either dead or alive, stained or unstained, labeled or unlabeled. Sample 116 may also be an array of any type of DNA or DNA-related material, such as complementary DNA (cDNA) or ribonucleic acid (RNA), or protein that is deposited on any type of slide or other substrate, including any and all samples commonly known as a microarrays. Sample 116 may be a microtiter plate (e.g., a 96-well plate). Other examples of sample 116 include integrated circuit boards, electrophoresis records, petri dishes, film, semiconductor materials, forensic materials, and machined parts.

Objective lens 120 is mounted on objective positioner 124, which, in an embodiment, employs a very precise linear motor to move objective lens 120 along the optical axis defined by objective lens 120. For example, the linear motor of objective lens positioner 124 may include a 50-nanometer encoder. The relative positions of stage 112 and objective lens 120 in X, Y, and/or Z axes are coordinated and controlled in a closed-loop manner using motion controller 108 under the control of processor 104 that employs memory 106 for storing information and instructions, including the computer-executable programmed steps for overall operation of scanning system 100.

In an embodiment, objective lens 120 is a plan apochromatic ("APO") infinity-corrected objective with a 120 is suitable for transmission-mode illumination microscopy, reflection-mode illumination microscopy, and/or epi-illumination-mode fluorescence microscopy (e.g., an Olympus 40X, 0.75NA or 20X, 0.75 NA). Advantageously, objective lens 120 is capable of correcting for chromatic and spherical aberrations. Because objective lens 120 is infinity-corrected, focusing optics 128 can be placed in optical path 122 above objective lens 120 where the light beam passing through objective lens 120 becomes a collimated light beam. Focusing optics 128 focus the optical signal captured by objective lens 120 onto the light-responsive elements of line scan camera 130 and/or area scan camera 132, and may include optical components such as filters, magnification changer lenses, and/or the like. Objective lens 120, combined with focusing optics 128, provides the total magnification for scanning system 100. In an embodiment, focusing optics 128 may contain a tube lens and an optional 2× magnification changer. Advantageously, the 2× magnification changer allows a native 20× objective lens 120 to scan sample 116 at 40× magnification.

Line scan camera 130 comprises at least one linear array of picture elements 142 ("pixels"). Line scan camera 130 may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a three linear array ("RA-green-blue" or "RGB") color line scan camera or a ninety-six linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. Scanner system 100 also supports linear arrays that are manufactured in a variety of formats including some with 512 pixels, some with 1,024 pixels, and others having as many as 4,096 pixels. Similarly, linear arrays with a variety of pixel sizes can also be used in scanner system 100. The salient requirement for the selection of any type of line scan camera 130 is that the motion of stage 112 can be synchronized with the line rate of line scan camera 130, so that stage 112 can be in motion with respect to line scan camera 130 during the digital image capture of sample 116.

In an embodiment, the image data generated by line scan camera 130 is stored in a portion of memory 106 and processed by processor 104 to generate a contiguous digital image of at least a portion of sample 116. The contiguous digital image can be further processed by processor 104, and the processed contiguous digital image can also be stored in memory 106.

In an embodiment with two or more line scan cameras 130, at least one of the line scan cameras 130 can be configured to function as a focusing sensor that operates in combination with at least one of the other line scan cameras 130 that is configured to function as an imaging sensor. The focusing sensor can be logically positioned on the same optical axis as the imaging sensor or the focusing sensor may be logically positioned before or after the imaging sensor with respect to the scanning direction of scanner system 100. In such an embodiment with at least one line scan camera 130 functioning as a focusing sensor, the image data generated by the focusing sensor may be stored in a portion of memory 106 and processed by processor 104 to generate focus information, to allow scanner system 100 to adjust the relative distance between sample 116 and objective lens 120 to maintain focus on sample 116 during scanning. Additionally, in an embodiment, the at least one line scan camera 130 functioning as a focusing sensor may be oriented such that each of a plurality of individual pixels 142 of the focusing sensor is positioned at a different logical height along the optical path 122.

In operation, the various components of scanner system 100 and the programmed modules stored in memory 106 enable automatic scanning and digitizing of sample 116, which is disposed on glass slide 114. Glass slide 114 is securely placed on movable stage 112 of scanner system 100 for scanning sample 116. Under control of processor 104, movable stage 112 accelerates sample 116 to a substantially constant velocity for sensing by line scan camera 130, where the speed of stage 112 is synchronized with the line rate of line scan camera 130. After scanning a stripe of image data, movable stage 112 decelerates and brings sample 116 to a substantially complete stop. Movable stage 112 then moves orthogonal to the scanning direction to position sample 116 for scanning of a subsequent stripe of image data (e.g., an adjacent stripe). Additional stripes are subsequently scanned until an entire portion of sample 116 or the entire sample 116 is scanned.

For example, during digital scanning of sample 116, a contiguous digital image of sample 116 is acquired as a plurality of contiguous fields of view that are combined together to form an image stripe. A plurality of adjacent image stripes are similarly combined together to form a contiguous digital image of a portion or the entire sample 116. The scanning of sample 116 may include acquiring vertical image stripes or horizontal image stripes. The scanning of sample 116 may be either top-to-bottom, bottom-to-lop, or both (i.e., bi-directional), and may start at any point on sample 116. Alternatively, the scanning of sample 116 may be either left-to-right, right-to-left, or both (i.e., bi-directional), and may start at any point on sample 116. It is not necessary that image stripes be acquired in an adjacent or contiguous manner. Furthermore, the resulting image of sample 116 may be an image of the entire sample 116 or only a portion of the sample 116.

In an embodiment, computer-executable instructions (e.g., programmed modules and software) are stored in memory 106 and, when executed, enable scanning system 100 to perform the various functions (e.g., display the graphical user interface) described herein. In this description, the term "computer-readable storage medium" is used to refer to any media used to store and provide computer-executable instructions to scanning system 100 for execution by processor 104. Examples of these media include memory 106 and any removable or external storage medium (not shown) communicatively coupled with scanning system 100 either directly (e.g., via a universal serial bus (USB), a wireless communication protocol, etc.) or indirectly (e.g., via a wired and/or wireless network).

FIG. 113 illustrates a line scan camera 130 having a single linear array 140, which may be implemented as a charge coupled device ("CCD") array. The single linear array 140 comprises a plurality of individual pixels 142. In the illustrated embodiment, the single linear array 140 has 4,096 pixels 142. In alternative embodiments, linear array 140 may have more or fewer pixels. For example, common formats of linear arrays include 512, 1,024, and 4,096 pixels. Pixels 142 are arranged in a linear fashion to define a field of view 134 for linear array 140. The size of field of view 134 varies in accordance with the magnification of scanner system 100.

Figure 1C:
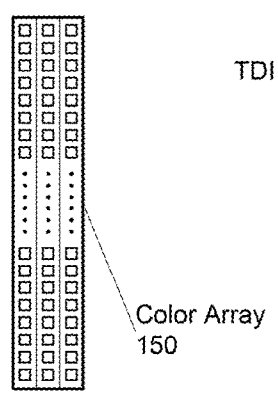
FIG. 1C illustrates an example line scan camera having three linear arrays, according to an embodiment.
Figure 1D:
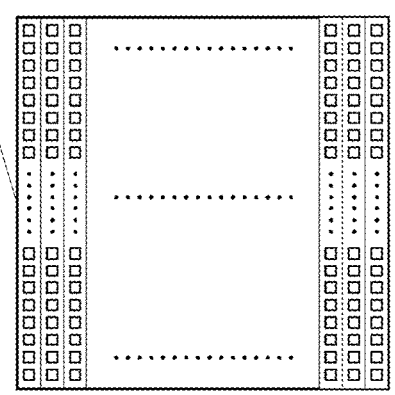
FIG. 1D illustrates an example line scan camera having a plurality of linear arrays, according to an embodiment.

FIG. 1C illustrates a line scan camera 130 having three linear arrays 140, each of which may be implemented as a CCD array. The three linear arrays combine to form a color array 150, In an embodiment, each individual linear array in color array 150 detects a different color intensity, including, for example, red, green, or blue. The color image data from each individual linear array 140 in color array 150 is combined to term a single field of view 134 of color image data.

FIG. ID illustrates a line scan camera 130 having a plurality of linear arrays 140, each of which may be implemented as a CCD array. The plurality of linear arrays combine to form a TDI array 160. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays 140. For example, common formats of TDI line scan cameras include 24, 32, 48, 64, 96, 120, and even more linear arrays.

1.2. Carousel for Slide Racks

In an embodiment, scanning system 100 comprises a carousel configured to hold a plurality of slide racks. Each slide rack is configured to hold a plurality of glass slides 114. The carousel may be configured to hold slide racks of different sizes, including slide racks which hold different numbers of glass slides 114 and/or different sizes of glass slides 114 (e.g., 25 mm×75 mm or "1×3" slides, and 50 mm×75 mm or "2×3" slides).

Figure 2A:
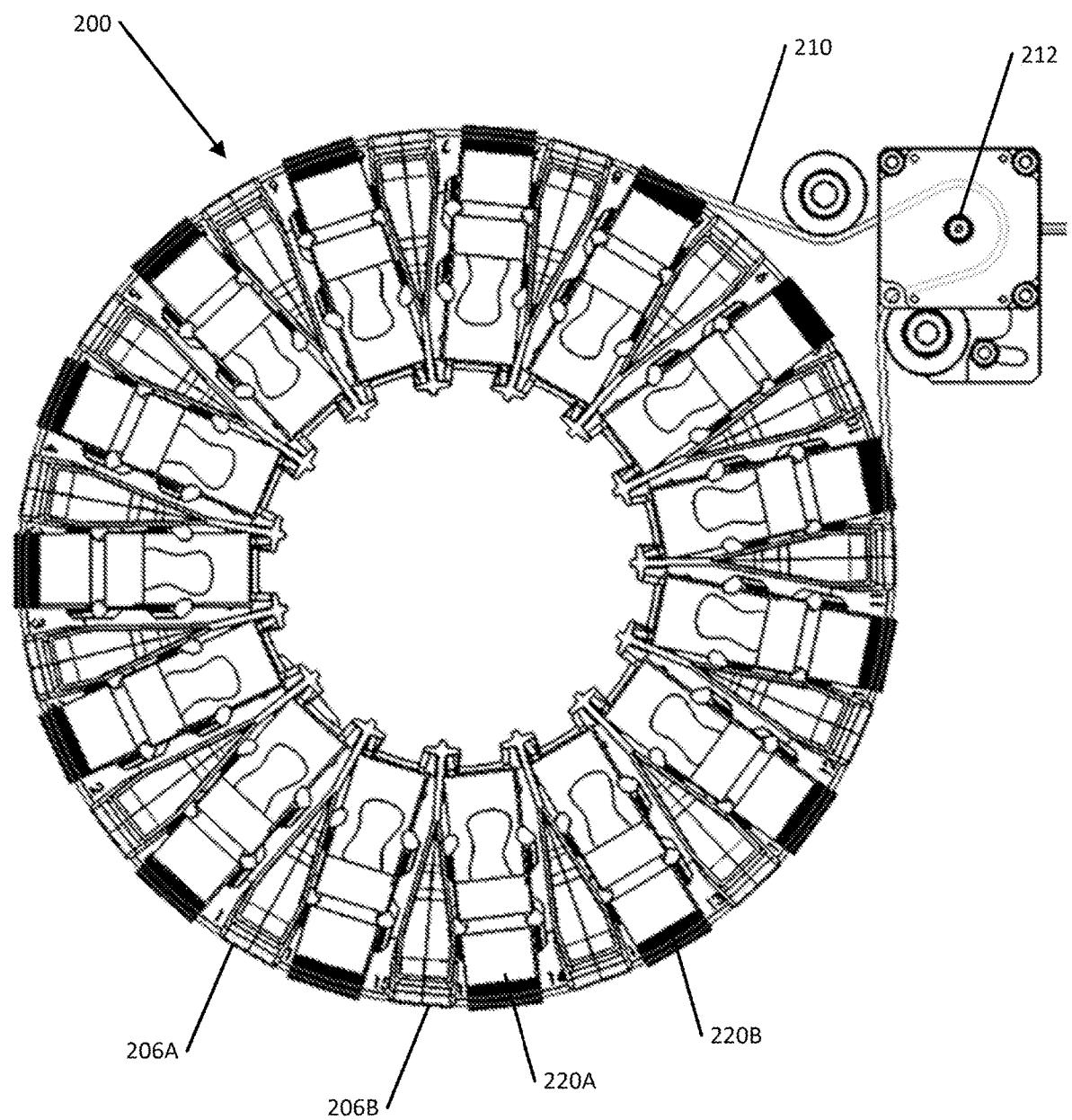
FIGS. 2A and 2B illustrate a top view and perspective view, respectively, of an example carousel, according to an embodiment.
Figure 2B:
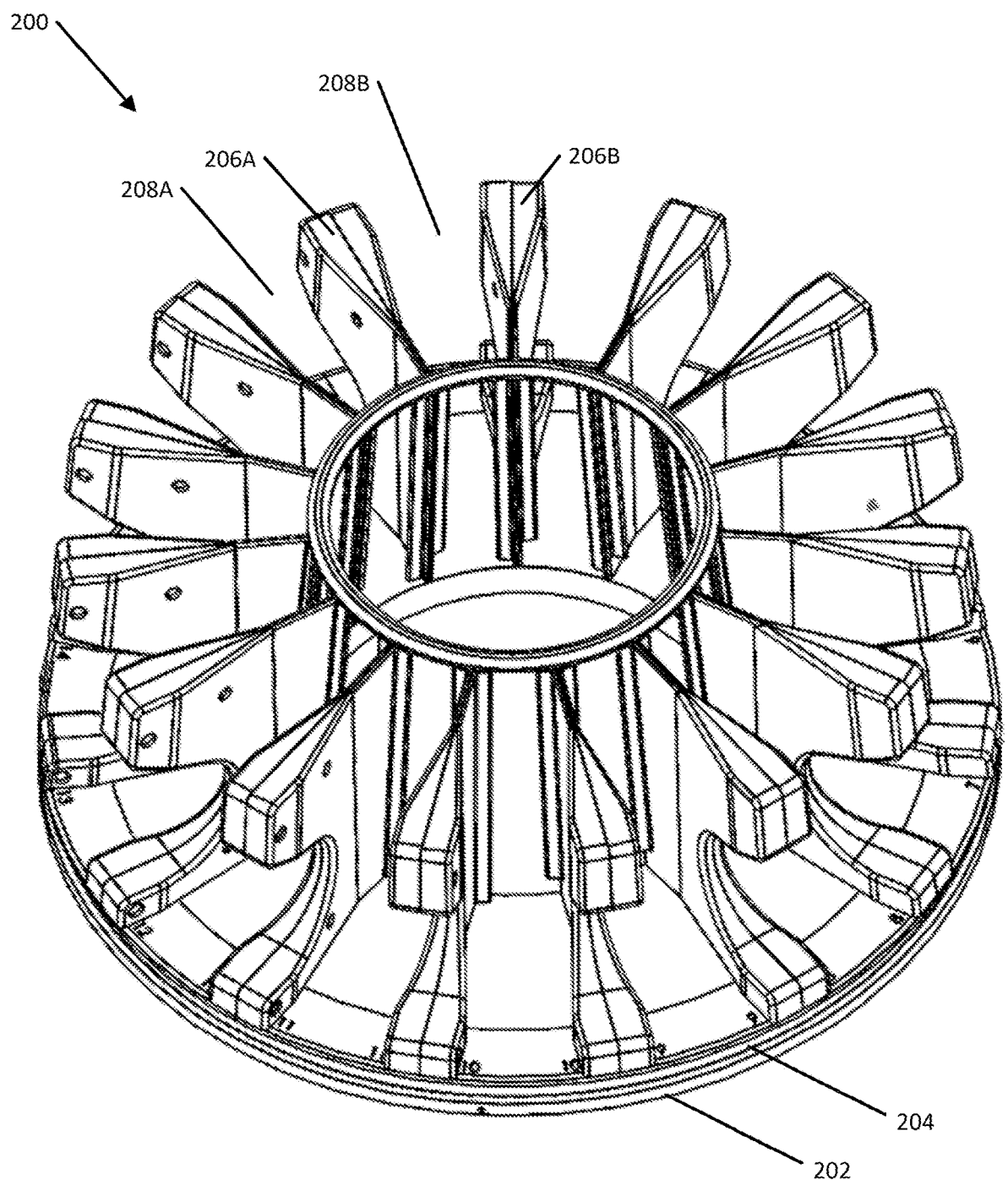

FIGS. 2A and 2B illustrate a top view and perspective view, respectively, of an example carousel 200, according to an embodiment. As illustrated, carousel 200 may be engaged with a carousel belt 210, which rotates carousel 200 around a fixed point. In an embodiment, carousel belt 210 may be positioned in a belt recess 204 around the circumference of base 202 of carousel 200, such that carousel belt 210 extends around the circumference of base 202. In addition, carousel belt 210 may extend around at least one rotor 212 that is rotated by a carousel motor (not shown). The carousel motor may be controlled by a processor 104 that spins the carousel motor in each of two directions (e.g., clockwise and counterclockwise), to rotate rotor 212, which in turn rotates carousel belt 210, which thereby rotates carousel 200 in the chosen direction. In an alternative embodiment, carousel 200 may have a drive system that employs a belt or another mechanism, such as direct gearing or direct drive. Advantageously, the drive system may be paired with a variety of types of bearing systems to implement movement of carousel 200.

Figure 2C:
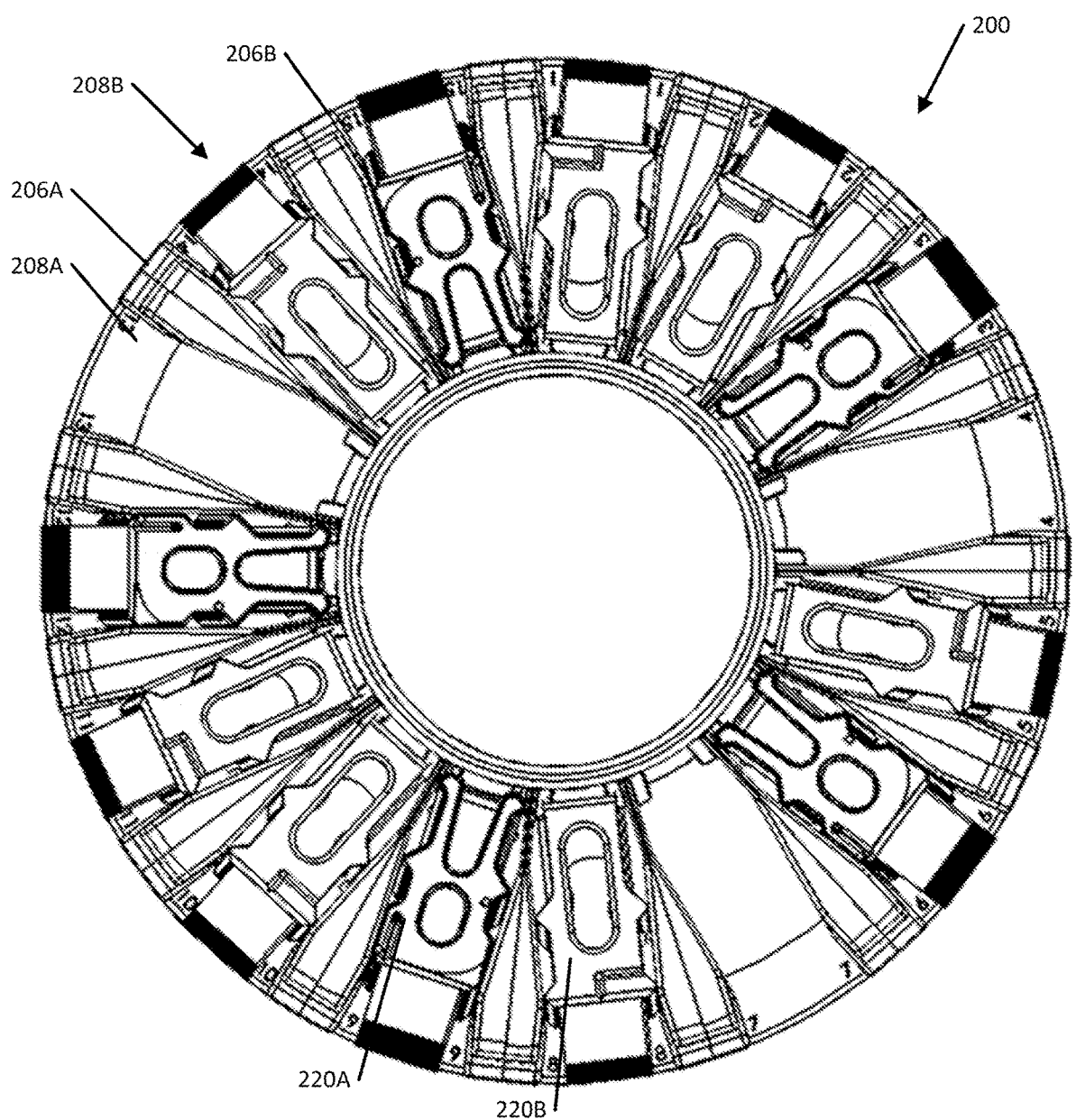
FIGS. 2C and 2D illustrate a top view and perspective view, respectively, of an example carousel, loaded with a plurality of slide racks, according to an embodiment.
Figure 2D:
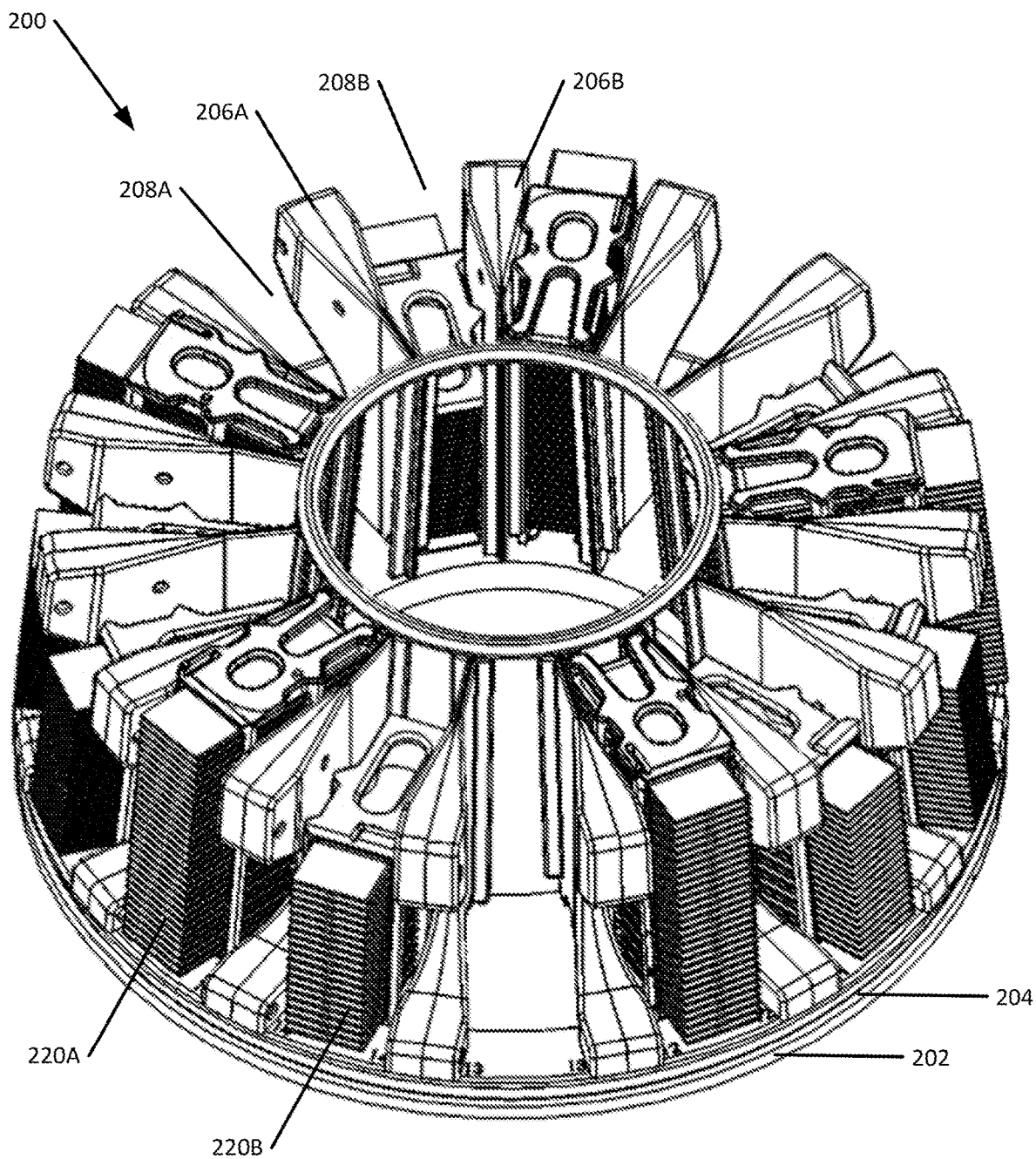

In an embodiment, carousel 200 comprises a plurality of rack spacers 206 extending upward from the top surface of base 202. Each pair of adjacent rack spacers 206 form a rack slot 208. Each rack slot 208 is configured to hold a slide rack 220, and may be configured to hold each of a plurality of different sizes and/or types of slide racks 220 (e.g., manufactured by different manufacturers). For example, slide racks 220 may be of different heights and/or widths, and each rack slot 208 may be sized to hold slide racks 220 having all of these different heights and/or widths. In addition, each rack slot 208 may comprise a detector (e.g., a sensor) that is positioned to determine whether or not the rack slot 208 is occupied by a slide rack 220. Based on an output of the detector, a processor 104 of scanning system 100 may, for each rack slot 208, determine whether or not that rack slot 208 is occupied by a slide rack 220, FIGS. 2C and 2D illustrate a top view and perspective view, respectively, of an example carousel 200, loaded with a plurality of slide racks 220, according to an embodiment. As shown, rack slot 208A is not occupied by any slide rack 220, whereas rack slot 208B is occupied by a slide rack 220. Thus, processor 104, via a detector within each rack slot 208, would determine that rack slot 208A is not occupied by a slide rack 220, and would determine that rack slot 208B is occupied by a slide rack 220. In addition, as shown, slide racks 220 can be of different sizes. For example, slide rack 220A is taller than slide rack 220B and holds more glass slides 114.

Figure 2E:
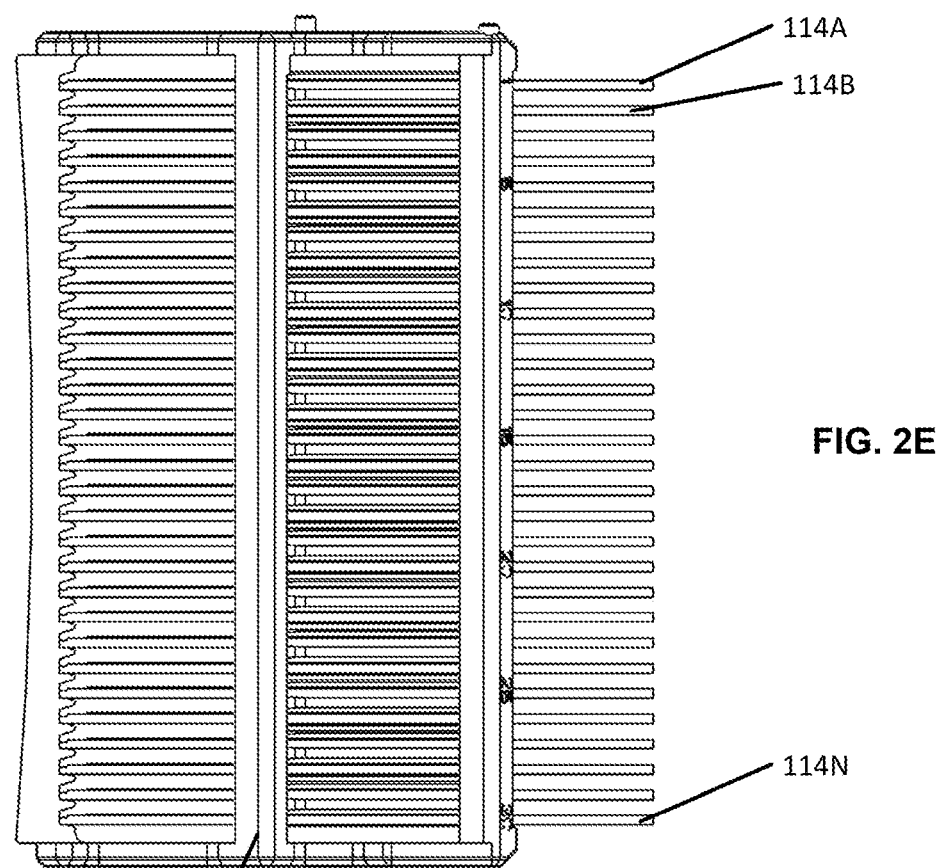
FIGS. 2E and 2F illustrate a side view of an example slide rack and a perspective view of an example slide rack, respectively, according to an embodiment.
Figure 2F:
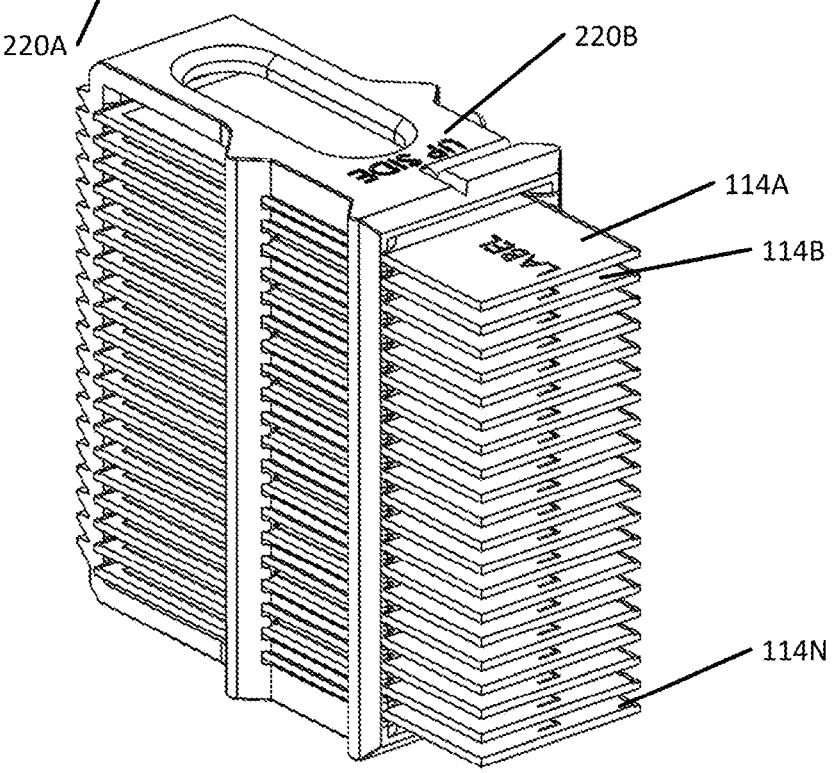

FIGS. 2E and 2F illustrate a side view of example slide rack 220A and a perspective view of example slide rack 220B, respectively, according to an embodiment. Slide rack 220A is taller and holds thirty glass slides 114, whereas slide rack 220B is shorter and holds twenty glass slides 114. Slide racks 220A and 220B may be manufactured by different manufacturers. However, each rack slot 208 is configured to receive both of slide racks 220A and 220B.

In an embodiment, a portion of carousel 200 is exposed or exposable to an exterior of scanning system 100. In other words, a certain number of adjacent rack slots 208 may be always be in an exposed position. For example, in a carousel of fifteen rack slots 208, six of the rack slots 208 may be exposed, while the remaining nine rack slots 208 are unexposed within an interior of scanning system 100. It should be understood that carousel 200 may rotate to change which subset of adjacent rack slots 208 are exposed and which subset of adjacent rack slots 208 are not exposed, at any given time.

In an embodiment, in order to facilitate loading, a processor 104 of scanning system 100 automatically controls carousel 200 to maximize the number of empty rack slots 208 that are exposed. For example, processor 104 may determine which rack slots 208 are occupied by slide racks 220, via a detector in each rack slot 208. Processor 104 may then identify the maximum contiguous segment of empty rack slots 208, and rotate carousel 200 to position as many empty rack slots 208, in that maximum contiguous segment, as possible, within an exposed portion of scanning system 100.

1.3. Push-Pull Assembly

Figure 3A:
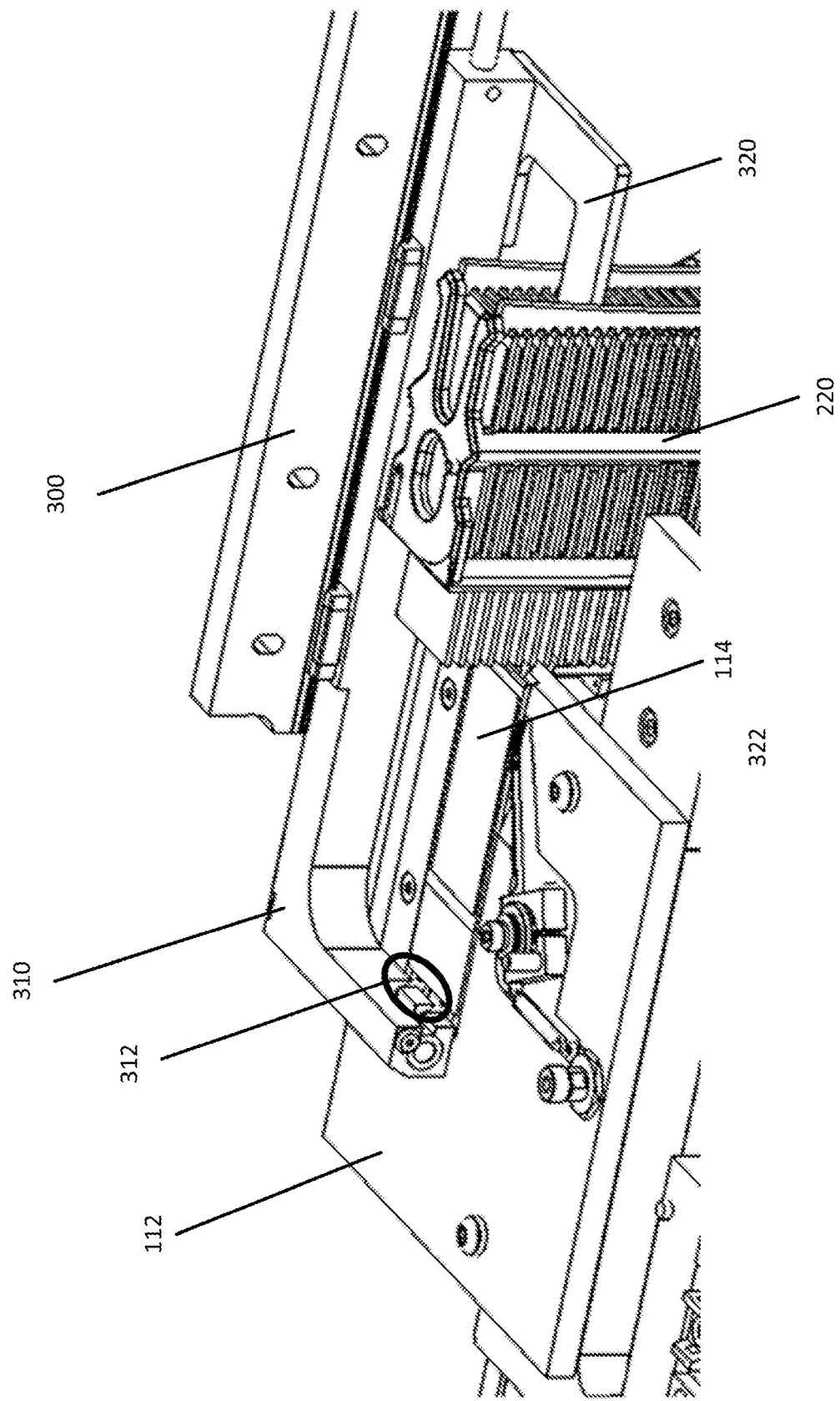
FIGS. 3A and 3B illustrate perspective views of an example push/pull assembly, slide rack, and scanning stage of a scanning system, according to an embodiment.
Figure 3B:
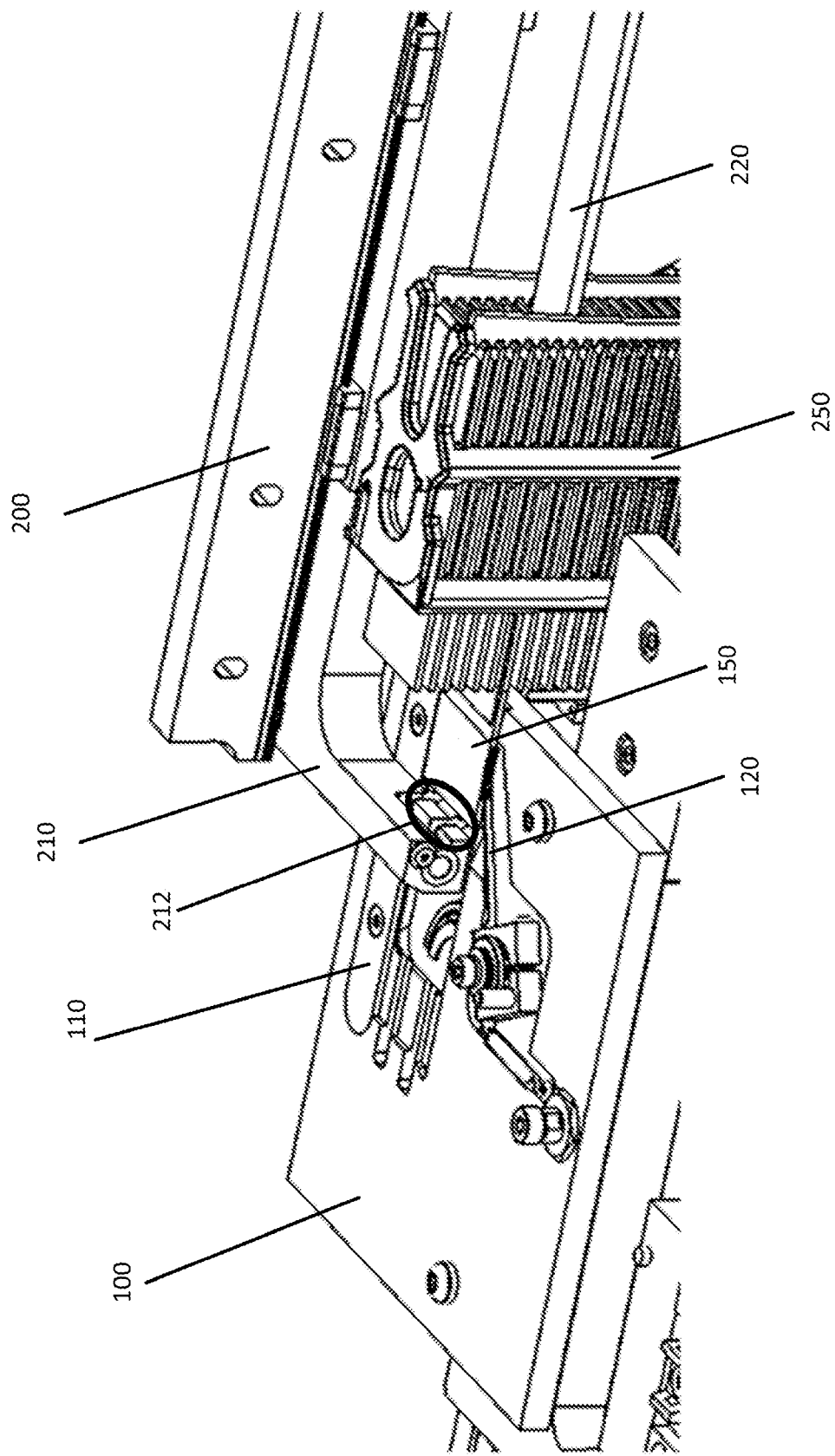

In an embodiment, scanning system 100 comprises a push/pull assembly configured to load each glass slide 114 from a slide rack 220 onto stage 112, and unload each glass slide 114 from stage 112 back into slide rack 220. FIGS. 3A and 3B illustrate perspective views of an example push/pull assembly 300, slide rack 220, and scanning stage 112 of scanning system 100, according to an embodiment. In the illustrated embodiment, push/pull assembly 300 is shown comprising a push bar 320 extending into slide rack 220. The illustrated push/pull assembly 300 also comprises a pull bar 310 with an open end comprising one or more pull fingers 312. Pull finger(s) 312 are configured to move within corresponding pull finger groove(s) in stage 112.

In an embodiment, push bar 320 and pull fingers 312 work in combination to push a glass slide 114, to be scanned, out from slide rack 220 and into a slide recess in stage 112. After glass slide 114 is scanned, push bar 320 and pull fingers 312 again work in combination to push glass slide 114 off of stage 112 and into an empty slot in slide rack 220 that is aligned with and in the same plane as the slide recess in stage 112. FIG. 3A illustrates push/pull assembly 300 when a glass slide 114 is entirely supported on stage 112, whereas FIG. 39 illustrates push/pull assembly 300 when glass slide 114 is partially supported on stage 110 and partially within a slot of slide rack 220 (e.g., during loading or unloading of glass slide 114).

2. Process Overview

Embodiments of processes for controlling a slide scanner will now be described in detail. It should be understood that the described processes may be embodied in one or more software modules that are executed by one or more hardware processors 104 within scanning system 100. The described processes may be implemented as instructions represented in source code, object code, and/or machine code. These instructions may be executed directly by the hardware processor(s) 104, or alternatively, may be executed by a virtual machine operating between the object code and the hardware processor(s) 104.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

In an embodiment, scanning system 100 is controlled via a user interface that comprises a touch panel display. The touch panel display displays a graphical user interface comprising input elements (e.g., selectable icons, textboxes, virtual keyboards and/or keypads, etc.). As is well known in the art, a user may interact with each input element within the graphical user interface by touching (e.g., with his or her finger(s)) the touch panel display at a position corresponding to that input element. The touch panel display senses a contact position of the user's touch, and, if the contact position corresponds to an input element, a processor 104 of scanning system 100 executes functionality corresponding to that input element.

In an embodiment, the selection of any input element within the graphical user interface triggers an audible notification (e.g., a "click" sound) to provide feedback to the user to thereby confirm the selection. Contact with any non-input element (e.g., an image or icon that is not associated with any function, such as the items in legend 412) will not trigger any audible notification. In addition, whenever a slide rack 220 is loaded into a rack slot 208, such that a detector in the rack slot 208 detects the presence of the loaded slide rack 220, a processor 104 may trigger the same, similar, or a different audible notification. The audible notifications may be a user setting that can be toggle on or off or otherwise changed according to a user preference.

Figure 4A:
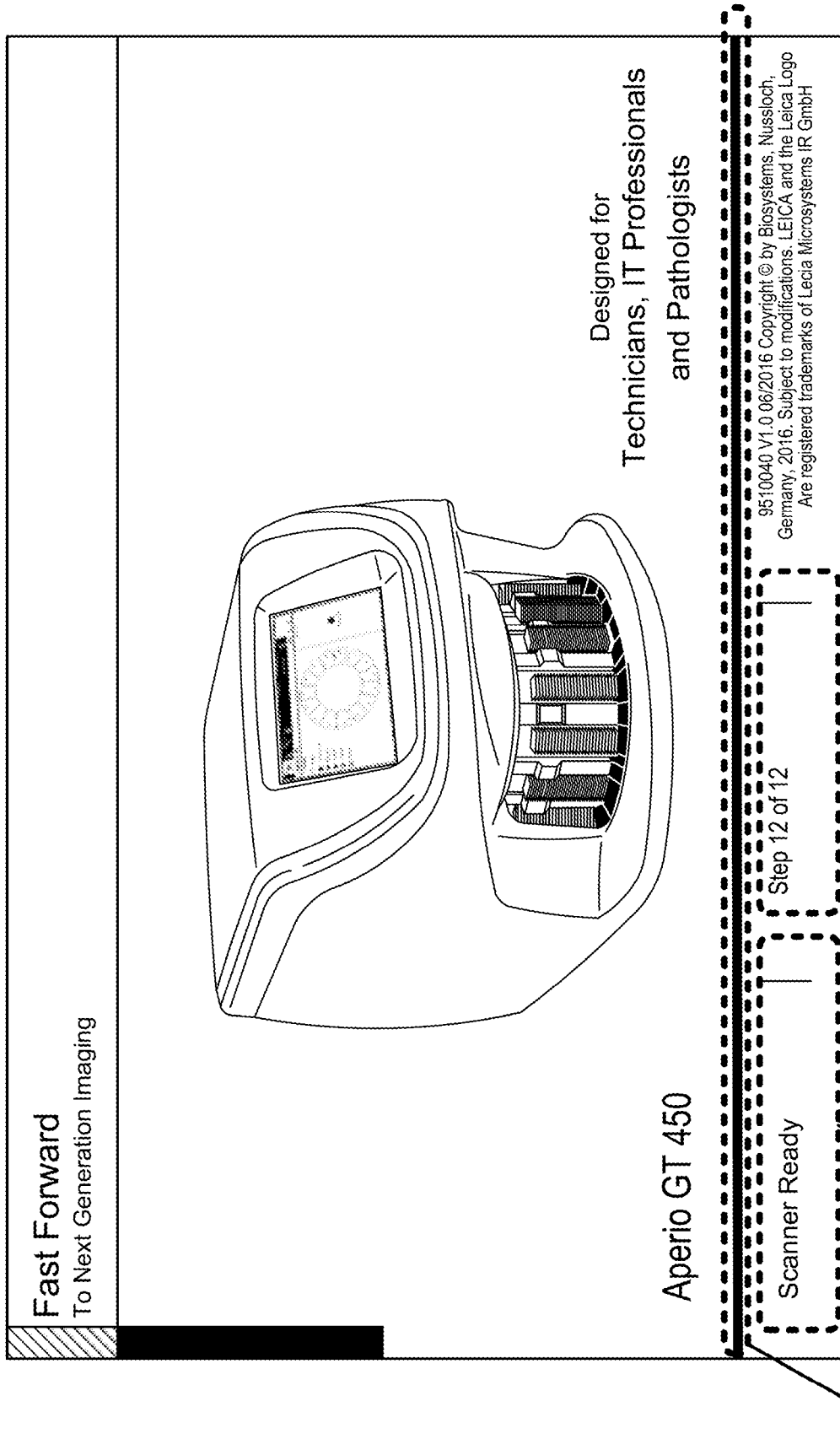
FIG. 4A-4AE illustrate a graphical user interface that may be used in connection with the various embodiments described herein, according to an embodiment.

FIGS. 4A-4AE illustrate an example graphical user interface of scanning system 100, according to an embodiment. As illustrated, the graphical user interface may comprise a plurality of different screens. An overall workflow that may be implemented by a processor 104, executing software stored in memory 106, will be described with respect to these screens, according to an embodiment. It should be understood that the arrangement of sections and input elements in FIGS. 4A-4AE are merely illustrative and non-limiting. A multitude of other arrangements are possible without affecting the functionality and workflow described herein.

FIG. 4A illustrates an example of a splash screen that may be displayed on the touch panel display of scanning system 100, according to an embodiment. For example, the splash screen may be displayed upon startup and during initialization of scanning system 100. As illustrated, a top section of the splash screen may comprise a title and branding (e.g., logo). In addition, a middle section of the splash screen may comprise information about scanning system 100, including a product image of scanning system 100, a model of scanning system 100, and/or the like. A bottom section of the splash screen may comprise additional information about scanning system 100, such as the current state of scanning system 100 in region 402, the progress of the startup or initialization process, a legal statement, and/or the like. As illustrated, the progress of the startup process may be shown by both a current step number and a total number of steps in region 404 (e.g., "Step 12 of 12" in the illustrated example) and a progress bar in region 406 that represents the percentage of startup tasks that have been completed (e.g., 100% completion in the illustrated example).

Figure 4B:
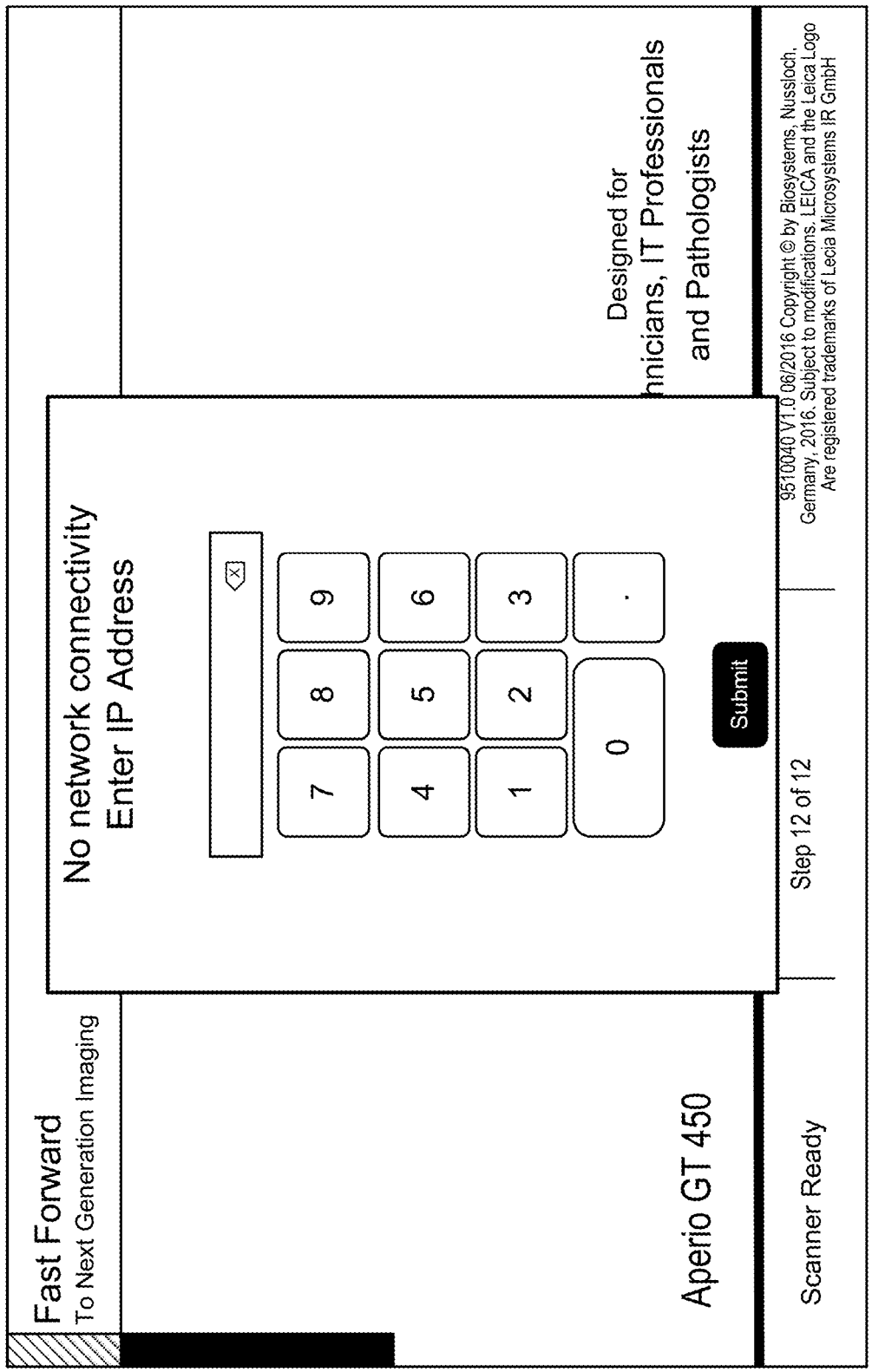

FIG. 4B illustrates a dialog frame that may be displayed on the touch panel display of scanning system 100, according to an embodiment. For example, during startup, processor 104 may utilize interface system 110 (e.g., comprising a network interface card) to check for a connection to a network server, with which scanning system 100 communicates. The network server may comprise a Scanner Administration Manager (SAM) server, which stores settings to be used by scanning system 100. If the network server is not found (e.g., after a timeout of, for example, one minute) or there is any other issue connecting to the network server, this dialog screen may be displayed. The dialog frame may be displayed within the first thirty seconds from startup if needed during the first startup or anytime the network server has never been specified), and/or any time that an issue with the connection to the network server arises. As illustrated, in the dialog frame, the user is prompted to enter the Internet Protocol (IP) address of the network server, using a keypad that is overlaid on top of whatever screen was being displayed (e.g., the splash screen in the illustrated example). The screen being overlaid may be grayed out, to emphasize the dialog frame. The keypad may comprise numerical inputs for typing in the IP address of the network server in the conventional IPv4 format (e.g., "###. ###. ###. ###"). Alternatively or additionally, an IPv6 format may be used. After entering the IP address for the network server, the user may select an input element to submit the entered IP address for connection testing. In response to the submission of the IP address, a processor 104 may attempt to connect to the network server at the entered IP address. If an issue is encountered during the connection testing, an error message may be displayed in the dialog frame, and the user may be prompted to reenter an IP address for the network server. Otherwise, if the connection to the network server is successful, processor 104 may remove the dialog frame and update settings, stored in memory 106, to reflect the IP address for the network server for subsequent use, such that the IP address does not need to be reentered (e.g., after a reboot).

Figure 4C:
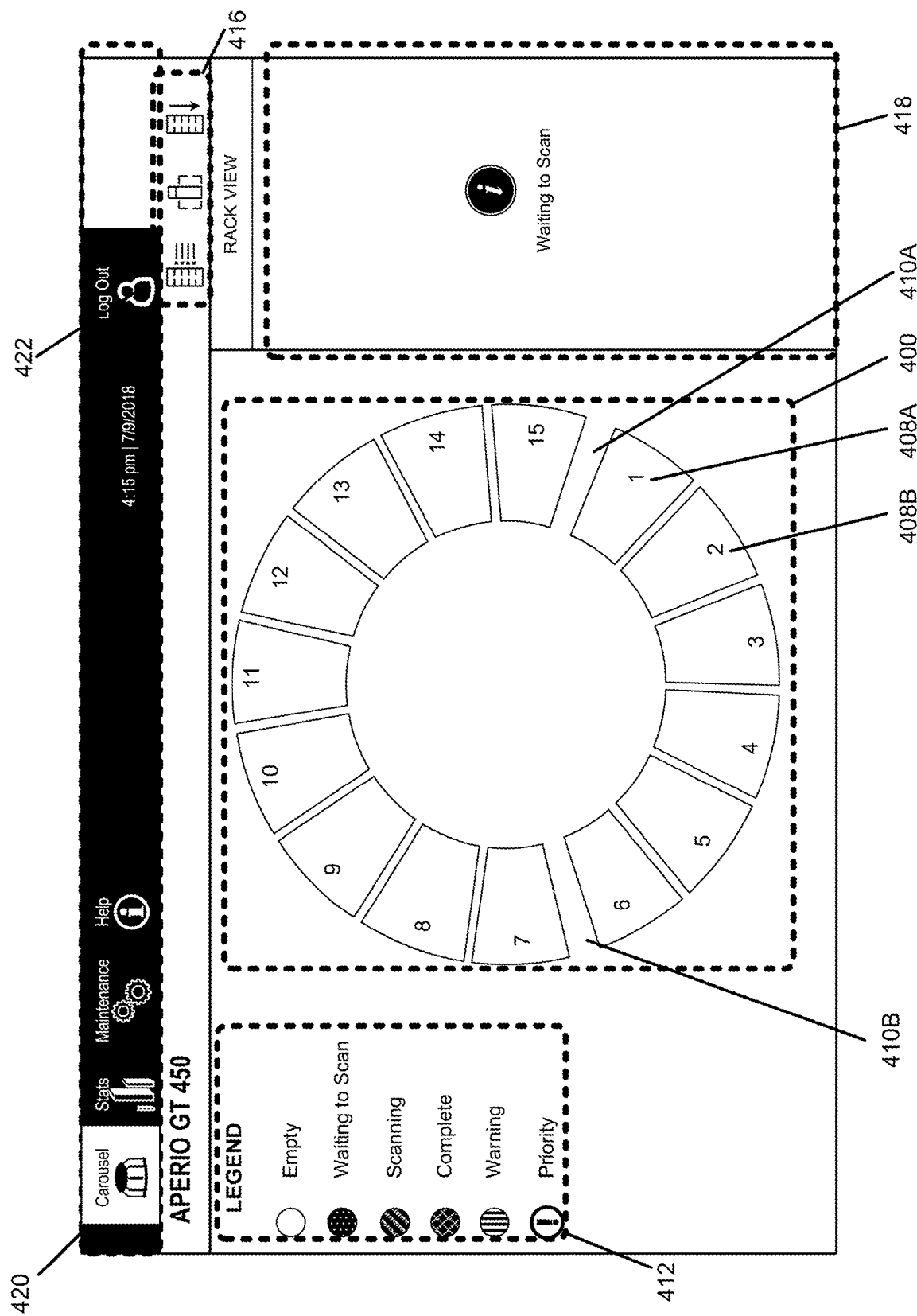

FIG. 4C illustrates a carousel screen that may be displayed on the touch panel display of scanning system 100, according to an embodiment. For example, after startup is complete, the splash screen may be replaced with the illustrated carousel screen. The carousel screen may be the primary screen through which the user controls scanning system 100. As shown, the carousel screen comprises a graphical representation 400 of carousel 200 (e.g., from a top or bottom view). In addition, graphical carousel representation 400 comprises a graphical representation 408 of each rack slot 208 in carousel 200. It should be understood that the positions of graphical slot representations 408 and graphical carousel representation 400, in the carousel screen, represent the actual positions of their physical counterparts (i.e., corresponding rack slot 208 and carousel 200, respectively), and are updated (e.g., during any rotation) to always remain synchronized with the actual positions of their physical counterparts. Notably, gaps 410A and 410B may divide the graphical slot representations 408 into two subsets. The top subset (e.g., the slots numbered 7-15 in FIG. 4C) represents the set of rack slots 208 that are currently within an interior of scanning system 100, with no exposure to the exterior of scanning system 100, whereas the bottom subset (e.g., the slots numbered 1-6 in FIG. 4C) represents the set of rack slots 208 that are currently exposed to the exterior of scanning system 100, such that slide racks 220 may be inserted into them. Each graphical slot representation 408 may indicate the status of the corresponding rack slot 208. For example, if the corresponding rack slot 208 is empty, the graphical slot representation 408 may be grayed out or otherwise indicate that the corresponding rack slot 208 is empty. Conversely, if the corresponding rack slot 208 is occupied by a slide rack 220, the graphical slot representation 408 may indicate the corresponding rack slot 208 is occupied and/or a state of the occupying slide rack 220. In the illustrated example of FIG. 4C, all rack slots 208 are graphically represented as empty by their corresponding graphical slot representations 408.

In an embodiment, each graphical slot representation 408 is an input element. Specifically, a user may touch the touch panel display of scanning system 100 at a position at which a graphical slot representation 408 is displayed to select that graphical slot representation 408. The user may then have the option to perform an operation on the slot rack 208 that corresponds to the selected graphical slot representation 408. A user may further touch the position of a selected graphical slot representation 408 to thereby deselect the graphical slot representation 408.

In an embodiment, carousel screen comprises a legend 412, which associates each of a plurality of colors with a status. Each graphical slot representation 408 may be rendered in the color representing the status of its corresponding rack slot 208. As a non-limiting example, gray may be associated with a status of "empty" (i.e., the corresponding rack slot 208 is not occupied by any slide rack 220), light blue may be associated with a status of "waiting to scan" (i.e., the corresponding rack slot 208 is occupied by a slide rack 220 that has yet to be processed), dark blue may be associated with a status of "scanning" (i.e., the corresponding rack slot 208 is occupied and glass slides 114 in the occupying slide rack 220 are currently being scanned), green may be associated with a status of "complete" (i.e., the corresponding rack slot 208 is occupied by a slide rack 220 that has been completely processed), and orange may be associated with a status of "warning" (i.e., there is an issue with the corresponding rack slot 208 and/or an issue during scanning a slide rack 220 in the corresponding rack slot 208). In addition, an icon (e.g., an exclamation point) may be associated with a status of "priority" (i.e., an occupying slide rack 220 in the corresponding rack slot 208 has priority for processing and will be scanned before slide racks 220 whose corresponding rack slots 208 do not have priority). Furthermore, in an embodiment, if a slide rack 220 is currently being processed (i.e., the glass slides 114 in the slide rack 220 are being scanned), the corresponding graphical slot representation 408 may pulse in the color for the status of "scanning" (e.g., dark blue). If the slide rack 220 that is currently being processed encounters one or more warnings during processing, the corresponding graphical slot representation 408 may pulse in alternating colors between the color associated with the status of "scanning" (e.g., dark blue) and the color associated with the status of "warning" (e.g., orange). It should be understood that different color-to-status and/or icon-to-status associations are possible, and that statuses of the various rack slots 208 and occupying slide racks 220 may be represented in other manners.

In an embodiment, the carousel screen comprises a view-selection ribbon 416, which comprises input elements for switching between views within viewing pane 418. For example, view-selection ribbon 416 may comprise an input element for a rack view, a slide view, and a rack-order view. In the rack view, viewing pane 418 displays a list of individual glass slides 114, along with their respective statuses, within a slide rack 220 that is currently occupying a rack slot 208 that corresponds to the currently selected graphical slot representation 408. In the slide view, viewing pane 418 displays a detailed view of a selected glass slide within a slide rack 220 that is currently occupying a rack slot 208 that corresponds to the currently selected graphical slot representation 408. In the rack-order view, viewing pane 418 indicates the order in which slide racks 220, within carousel 200, are to be scanned. In the event that no graphical rack representation 408 is currently selected, the graphical rack representation 408 corresponding to the slide rack 220 that is currently being processed may be automatically selected, and the corresponding rack view may be automatically displayed in viewing pane 418.

In an embodiment, the graphical user interface comprises a global navigation ribbon 420, which comprises input elements for navigating between primary screens of the graphical user interface. For example, navigation ribbon 420 may comprise an input element for viewing the carousel screen, an input element for viewing a statistics screen (e.g., a screen that displays usage statistics), an input element for viewing a maintenance screen (e.g., a screen that displays information about scanning system 100, including, for example, version numbers of installed software), and an input element for viewing a help screen (e.g., a screen that provides access to support functions, such as help documentation, support videos, troubleshooting functions, etc.). Navigation ribbon 420 may be identical across all of the primary screens of the graphical user interface.

In an embodiment, navigation ribbon 420 may comprise a log-in/log-out input element 422, as well as the current date and time and branding. The branding may comprise a logo, which is also an input element, that, when selected, transitions from the current screen to a product-information screen that displays product-specific information about scanning system 100. Log-in/log-out input element 422 allows a user to log in (if currently logged out) and log out (if currently logged in), and will transition between a logged-in state (e.g., with an account icon and the text "log out") and a logged-out state (e.g., with a lock icon and the text "log in").

Figure 4D:
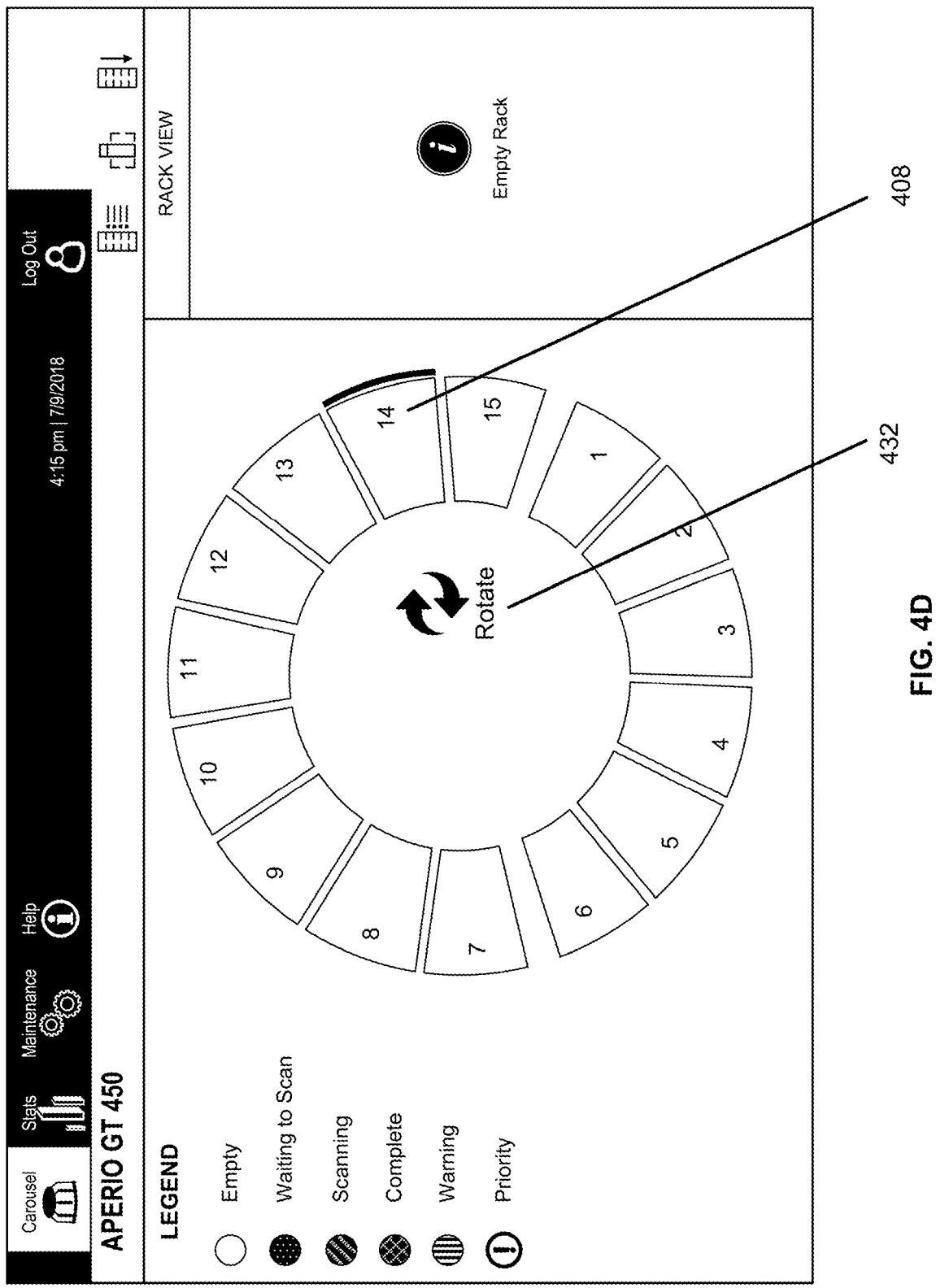

FIG. 4D illustrates the carousel screen when a graphical slot representation 408 has been selected. For example, a user may select graphical slot representation 408 by touching a position at which graphical slot representation 408 is being displayed. Once selected, the graphical slot representation 408 may be updated to indicate that it has been selected, using any distinguishing attribute. As illustrated, the portion of the border of the selected graphical slot representation 408, along the circumference of graphical carousel representation 400, may be highlighted (e.g., in dark gray or black). Alternatively, the selected graphical slot representation 408 may be distinguished in some other manner (e.g., by highlighting the entire border of graphical slot representation 408, by coloring or shading graphical slot representation 408, etc.). If the user selects a selected graphical slot representation 408, the selected graphical slot representation 408 may be deselected, and the deselected graphical slot representation 408 may be updated to remove the distinguishing attribute applied in response to the prior selection.

In an embodiment, when a graphical slot representation 408 is selected, input elements for functions related to the selected graphical slot representation 408 may appear. In the illustrated embodiment, these input elements may appear within a center of graphical carousel representation 400. For example, as illustrated in FIG. 4D, when an empty graphical slot representation 408 is selected, a rotation icon 432 appears in the center of graphical carousel representation 400. Rotation may be the only function associated with graphical slot representations 408 with a status of "empty."

When a user selects rotation icon 432, a processor 104 may control carousel 200 (e.g., by actuating a motor that rotates rotor 212 to rotate carousel belt 210, to thereby rotate carousel 200) to rotate the rack slot 208, corresponding to the currently selected graphical slot representation 408, so that that rack slot 208 is exposed to an exterior of scanning system 100. This allows the user to load the selected rack slot 208 with a slide rack 200. Notably, processor 104 will also update the graphical carousel representation 400 to reflect this rotation in the physical carousel 200. Specifically, graphical carousel representation 400 will be rotated in the same manner as the physical carousel 200, such that the selected graphical slot representation 408 is moved to a position within the bottom subset of graphical slot representations 408 that corresponds to the physical position of its corresponding rack slot 208. The graphical user interface may blink, flash, or pulse (e.g., in yellow) before and/or during rotation, and/or for a predefined time (e.g., three seconds) or number of intervals once rotation is complete, to warn users about the rotation.

Figure 4E:
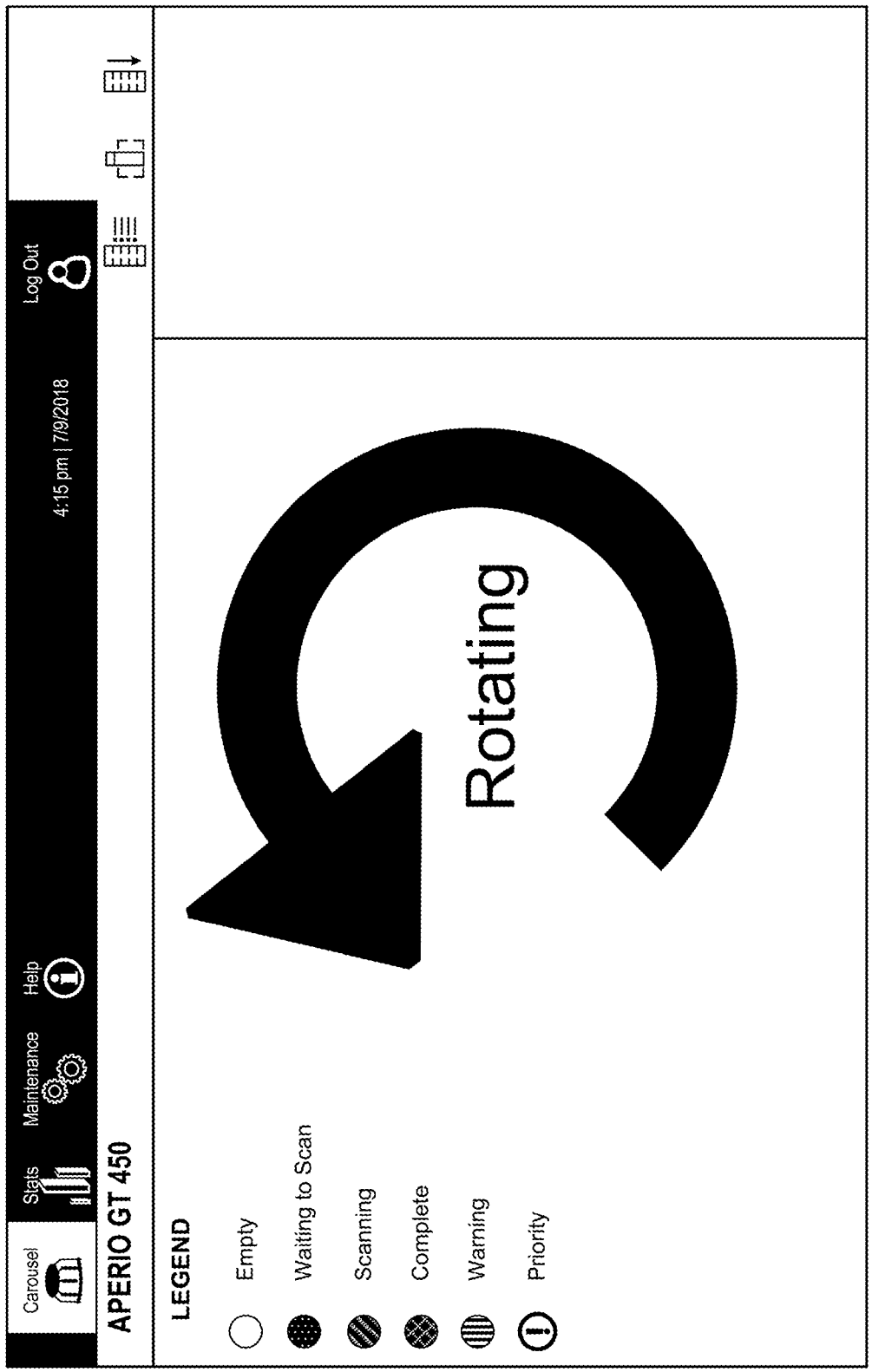

FIG. 4E illustrates an information screen that may be displayed on the touch panel display of scanning system 100, during rotation of carousel 200, according to an embodiment. This information screen comprises a large rotation graphic and the text "rotating." Alternatively, graphical carousel representation 400 may be animated within the carousel screen and synchronized with the actual rotation of carousel 200 to illustrate the rotation as it is occurring.

Figure 4F:
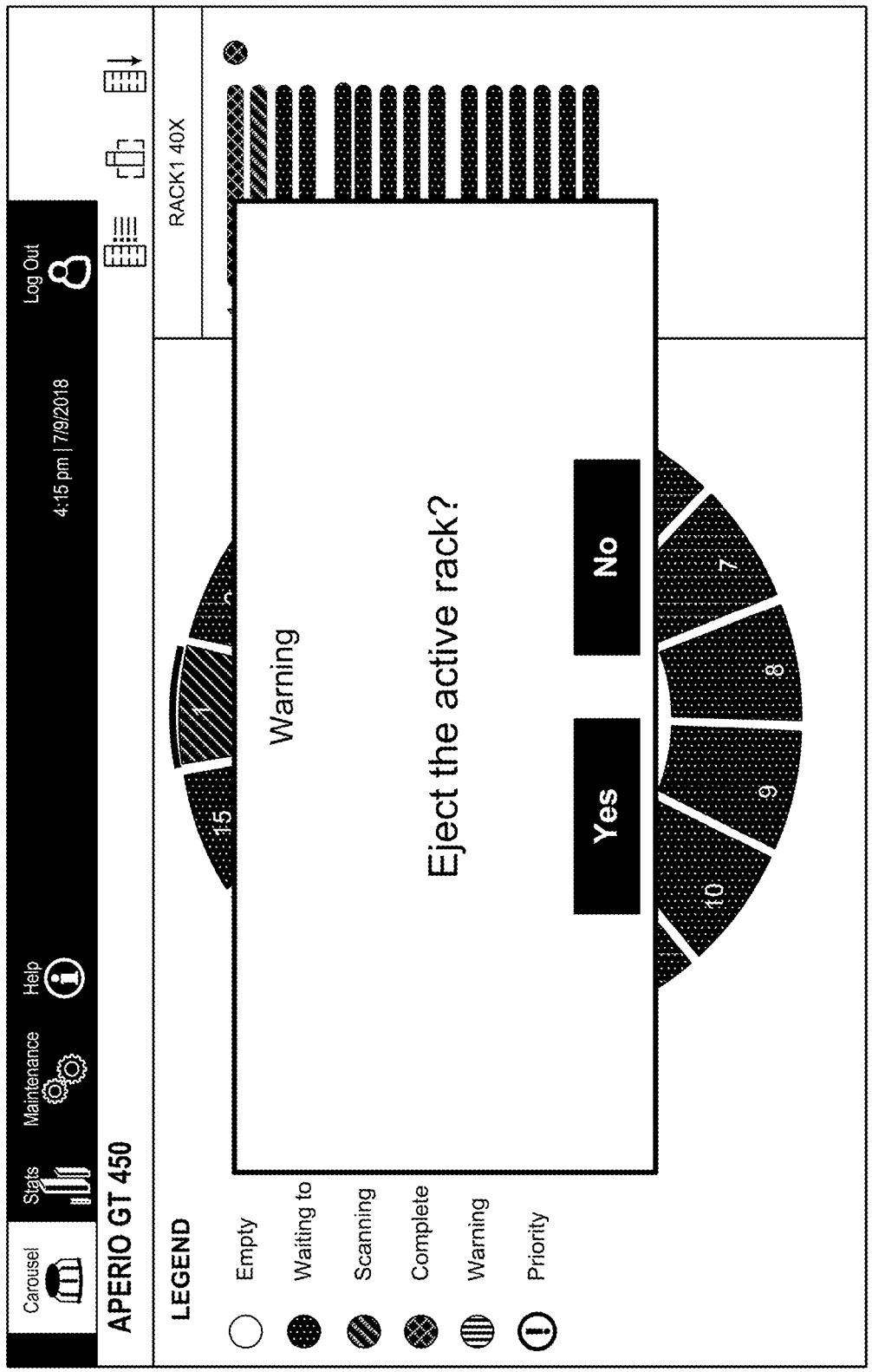

FIG. 4F illustrates a confirmation screen that may be displayed on the touch panel display of scanning system 100, when a user selects rotation icon 432 while the slide rack 220 that corresponds to the selected graphical slot representation 408 is currently being processed. In this case, because the slide rack 220 is in the midst of being processed, a processor 104 requires the user to confirm that processing should be halted so that the slide rack 220 may be rotated within its occupied slot rack 208 so that it is accessible to an exterior of scanning system 100. Notably, the confirmation screen may comprise a confirmation pane, overlaid over the carousel screen, which may be grayed out to distinguish the confirmation pane. If the user confirms ejection (e.g., selects "Yes" in the confirmation screen), processing may be halted and the rotation may occur as soon as possible (e.g., once any glass slide 114 being scanned has been returned to slide rack 220 and slide rack 220 has been properly seated within its corresponding rack slot 208). Otherwise, if the user does not confirm ejection (e.g., selects "No" in the confirmation screen), processing may continue as normal. In addition, as soon as processing has completed, processor 104 may automatically rotate carousel 200, to place slide rack 220 in a position to be accessed from an exterior of scanning system 100. Prior to rotation, an indication that carousel 200 is about to rotate may be provided (e.g., the current screen may blink for a few seconds).

Figure 4G:
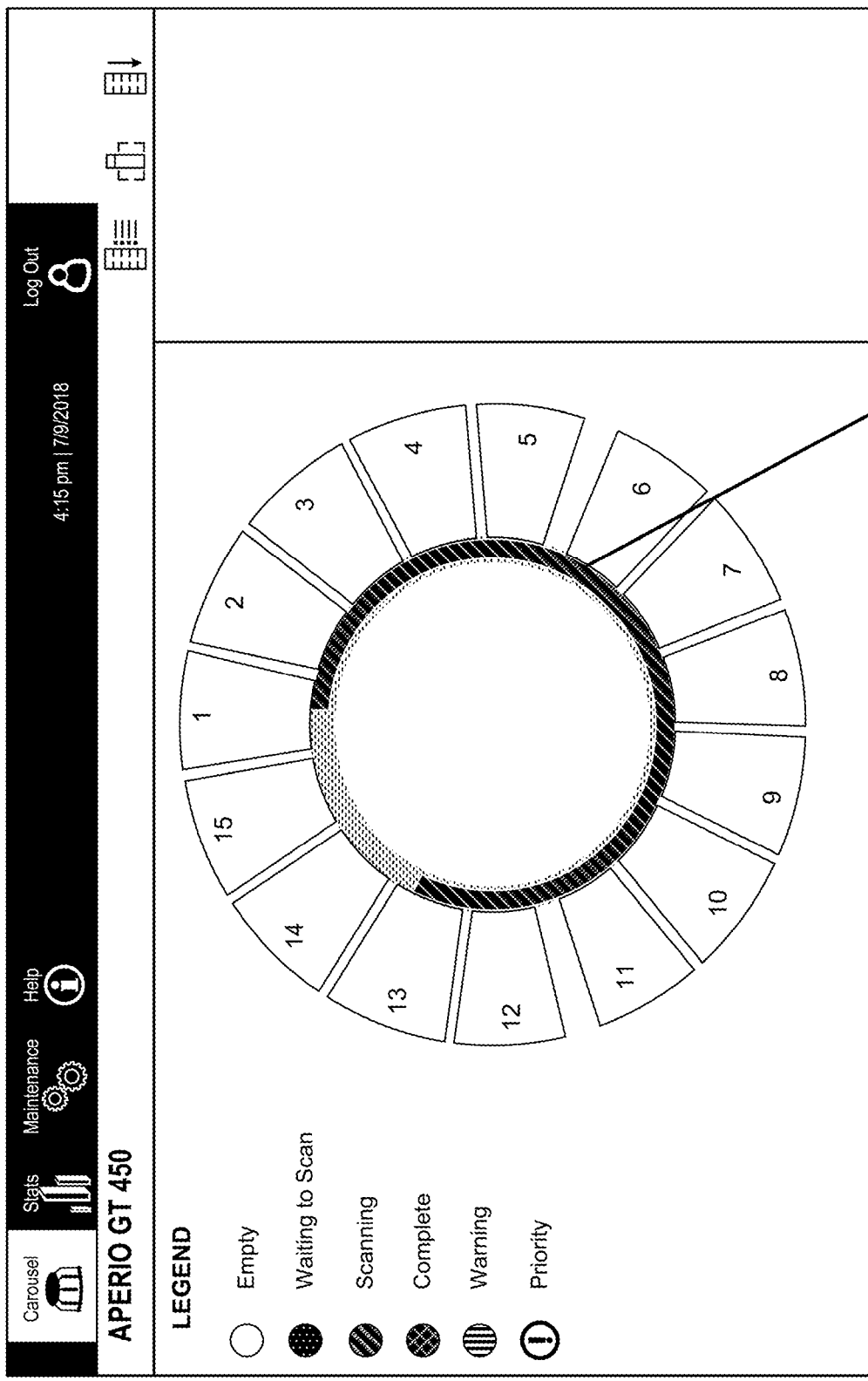

FIG. 4G illustrates the carousel screen with a time-till-operation indication 440, according to an embodiment. As illustrated, time-till-operation indication 440 may comprise a circle within the center of graphical carousel representation 400 that gradually transitions from a completely filled state (e.g., filled in with blue or other color and representing 100%), through a plurality of partially filled-in states (e.g., partially filled in with blue or other color and representing a proportional percentage), to a completely empty state (e.g., having no blue r other color and representing 0%). In this manner, time-till-operation indication 440 indicates the remaining delay until scanning system 100 begins an operation. The delay period for an operation may be a system or user setting (e.g., stored in the SAM server), The delay period may be set so as to enable a user to perform additional interactions (e.g., with carousel 200 and/or the touch panel display) before an operation occurs. For example, the delay period may be ten seconds. In an embodiment, after each additional user interaction, processor 104 may reset the delay period and update time-till-operation indication 440 to reflect the reset of the delay period (e.g., return time-till-operation indication 440 to its completely filled state). In addition, the graphical user interface may blink for a trailing portion of the delay period (e.g., the last three seconds) to warn the user.

For example, if a user inserts a new slide rack 220 into a previously empty rack slot 208, a processor 104 may detect this insertion (e.g., via a detector within rack slot 208), but delay rotation of carousel 200 to place the new slide rack 220 into a position to be processed until the delay period expires. During this delay period, processor 104 may display time-till-operation indication 440 within graphical carousel representation 400, such that time-till-operation indication 440 starts in a completely filled state and decreases the fill at the rate necessary to reach the completely empty state at the same time that the delay period expires. Once the delay period has expired, processor 104 may then control carousel 200 to rotate the new slide rack 220 into the position at which processing may begin. In this case, the delay period may allow the user to insert additional slide racks 220 and/or remove slide racks 220, establish priorities for processing, change settings, and/or the like, prior to the rotation and initiation of processing.

Figure 4H:
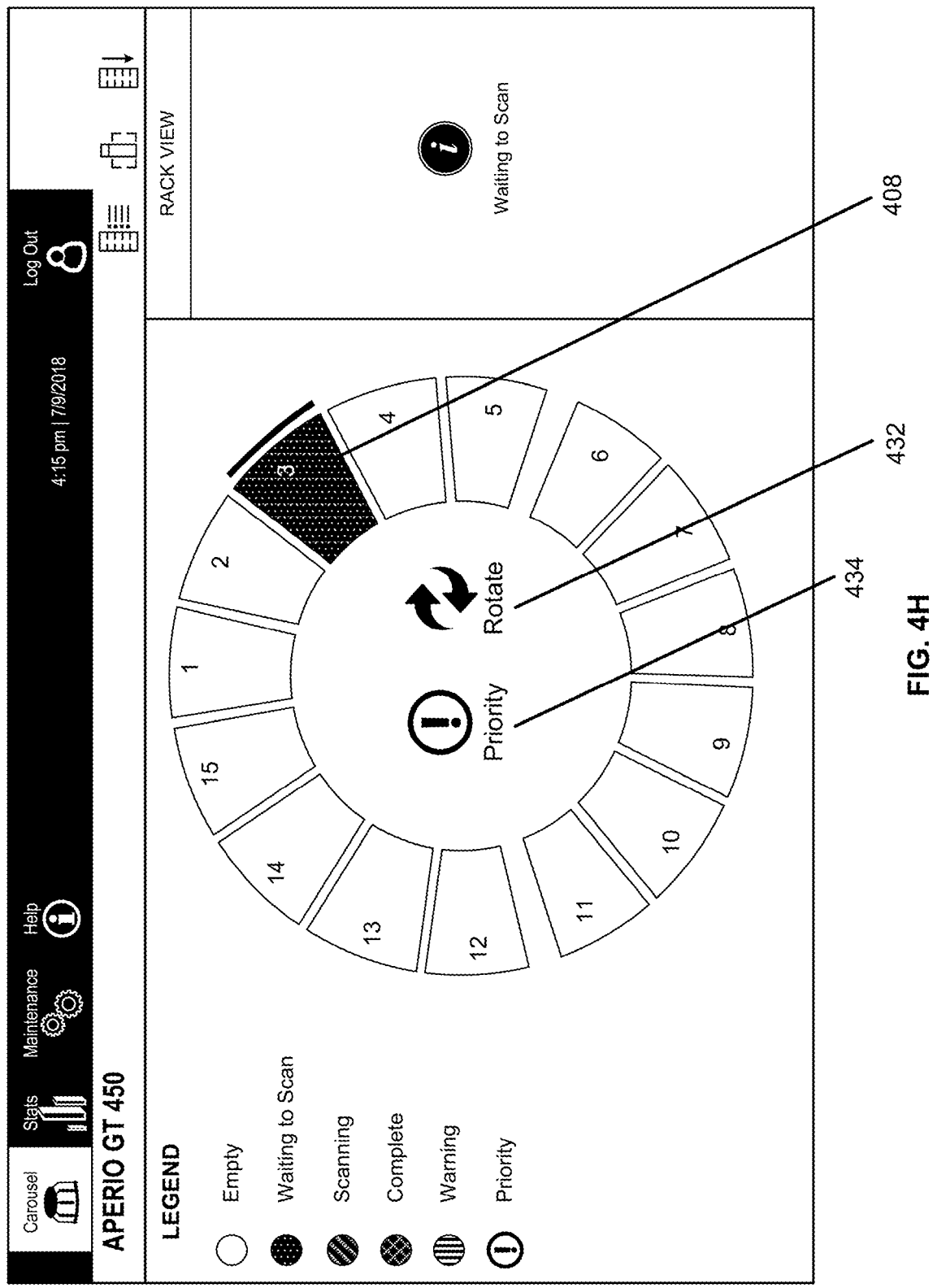

FIG. 4H illustrates the carousel screen, in which a graphical slot representation 408 has been selected that corresponds to a rack slot 208, which is occupied with a slide rack 220 that is waiting to be processed, according to an embodiment. The selected graphical slot representation 408 is colored to indicate that its status is "waiting to scan," and is distinguished by a highlighted border to indicate that it is currently selected. Notably, in this case, since the selected graphical slot representation 408 corresponds to an occupied rack slot 208 and is in the "waiting to scan" state, icons representing related functions may become available (e.g., appear or become selectable within graphical representation 400 of carousel 200). In the illustrated embodiment, the related functions include both a rotation function, operable by rotation icon 432, and a prioritization function, operable by a priority icon 434. However, additional, fewer, or different functions may be available than those illustrated. For example, other possible functions include a Z-stacking function (e.g., which provides that the selected rack slot 208 will undergo multi-layer scanning at multiple focal depths), a setting function (e.g., which provides that a specific scan protocol will be applied to the selected rack slot 208), and/or the like. Functions, which may be associated with multiple options (e.g., a setting function which may allow selection of one of a plurality of scan protocols to be applied to the selected rack slot 208), may be represented by an icon that, when selected, results in the display of a drop-down menu of selectable options. The user may select the specific option (e.g., specific scan protocol) from the drop-down menu, and the selected option will be applied to the selected rack slot 208. The configuration for the Z-stacking function and/or scan protocols may be set using a graphical user interface of the SAM server and/or stored in the SAM server. Alternatively, these configurations could be set and stored locally (e.g., set via the graphical user interface and stored within memory 106 of scanning system 100).

When a user selects the priority icon 434, processor 104 will prioritize processing for the slide rack 220 occupying the rack slot 208 corresponding to the selected graphical slot representation 408. In other words, that slide rack 220 will be processed before any lower priority slide racks 220. In an embodiment, up to a predefined number (e.g., three) of slide racks 220 may be prioritized in this manner, at any given tune. Within a set of prioritized slide racks 220, the slide racks 220 may be processed in any order (e.g., the order of selection, an order that minimizes rotation, an arbitrary order, etc.). Alternatively, a user may be provided with inputs for setting the exact sequence in which slide racks 220 should be processed.

Figure 4I:
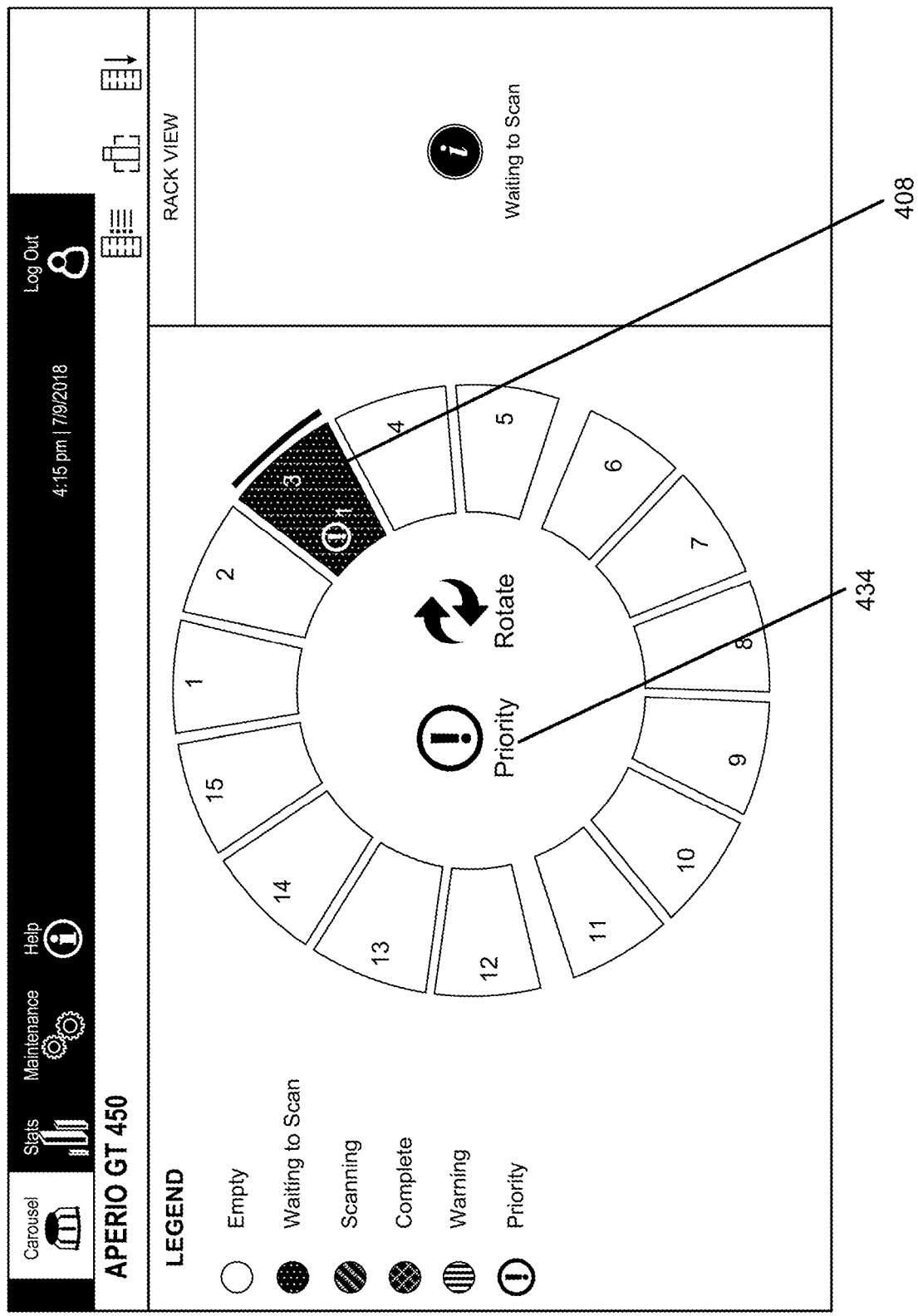

FIG. 4I illustrates the carousel screen from FIG. 4H, after the user has prioritized the selected graphical slot representation 408, according to an embodiment. Specifically, it is assumed that the user selected priority icon 434 while graphical slot representation 408 was selected. To indicate the prioritization of selected graphical slot representation 408, a priority icon (e.g., an exclamation point) is displayed in the prioritized graphical slot representation 408. The priority icon in graphical slot representation 408 may be identical or similar to priority icon 434 (e.g., both exclamation points in the illustrated examples). In addition, the priority icon in graphical slot representation 408 may be associated with a number (e.g., one, two, or three) representing its overall priority (e.g., with respect to other prioritized graphical slot representations 408).

Figure 4J:
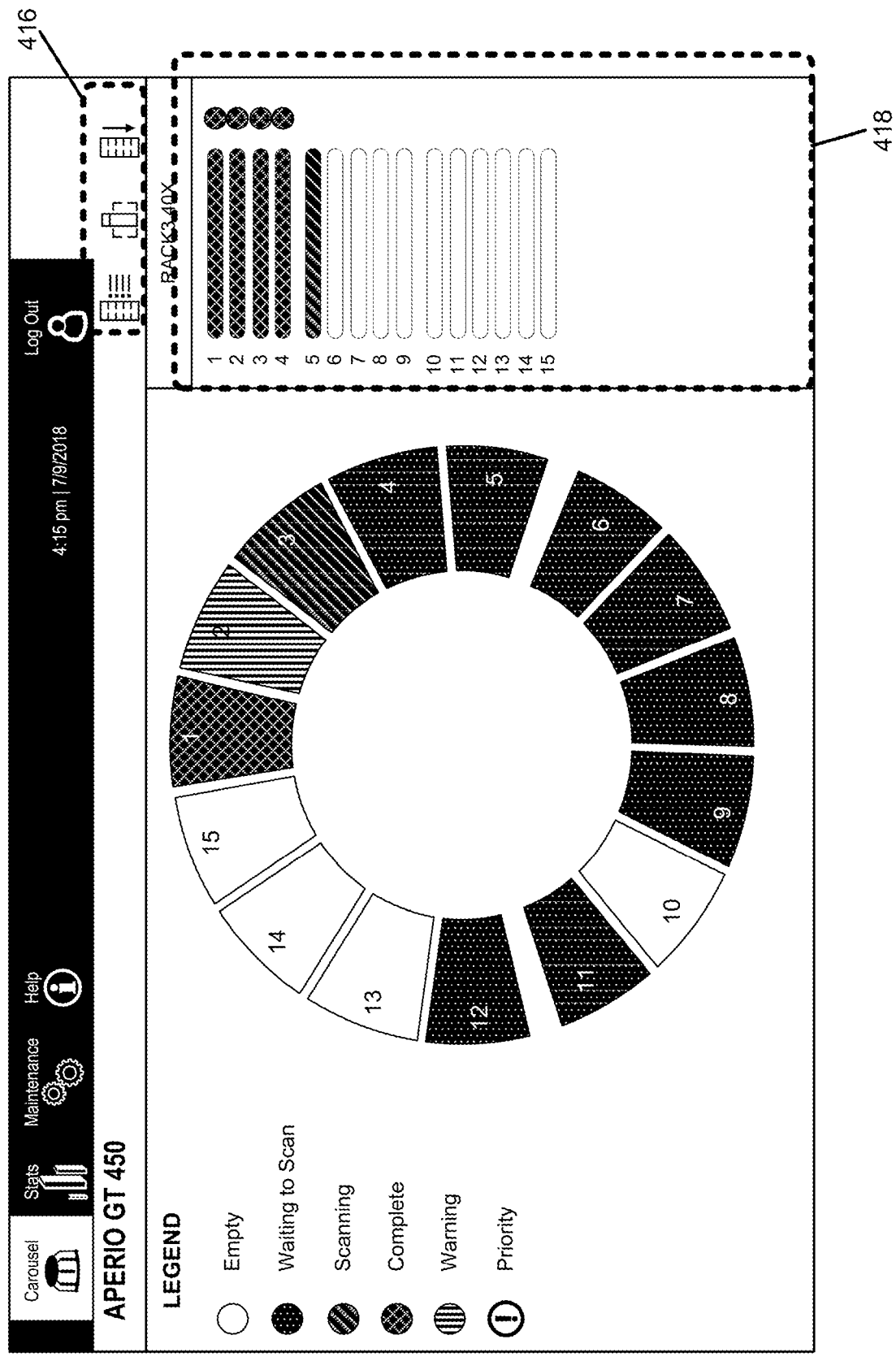

FIG. 4J illustrates the carousel screen corresponding to a plurality of occupied rack slots 208 with varying statuses, according to an embodiment. Notably, in an embodiment, a user simply needs to insert slide racks 220 into any exposed and unoccupied rack slot 208 to begin using scanning system 100. Scanning system 100 will detect any new slide racks 220 and automatically rotate carousel 200 to begin processing them, without the need of any further user interaction. The carousel screen can be thought of as a dashboard that visually represents all of the processing performed and being performed by scanning system 100. In the illustrated example, the graphical slot representation 408, labeled "1," indicates that the corresponding slide rack 220 has been completely processed, the graphical slot representation 408, labeled "2," indicates that processing of the corresponding slide rack 220 encountered a warning, the graphical slot representation 408, labeled "3," indicates that the corresponding slide rack 220 is currently being processed, and the graphical slot representations 408, labeled "4"-"9," "11," and "12," are occupied with slide racks 220 waiting to be processed. The remaining graphical slot representations 408, labeled "10" and "13"-"15," indicate that the corresponding rack slots 208 are empty. To view the warnings associated with the processing of a slide rack 220, a user simply needs to select the corresponding graphical slot representation 408 (e.g., by touching the touch panel display at a position at which the corresponding graphical slot representation 408 is displayed). For example, in response to selection of the graphical slot representation 408, labeled "2," the warnings associated with the corresponding processing may be displayed.

Figure 4K:
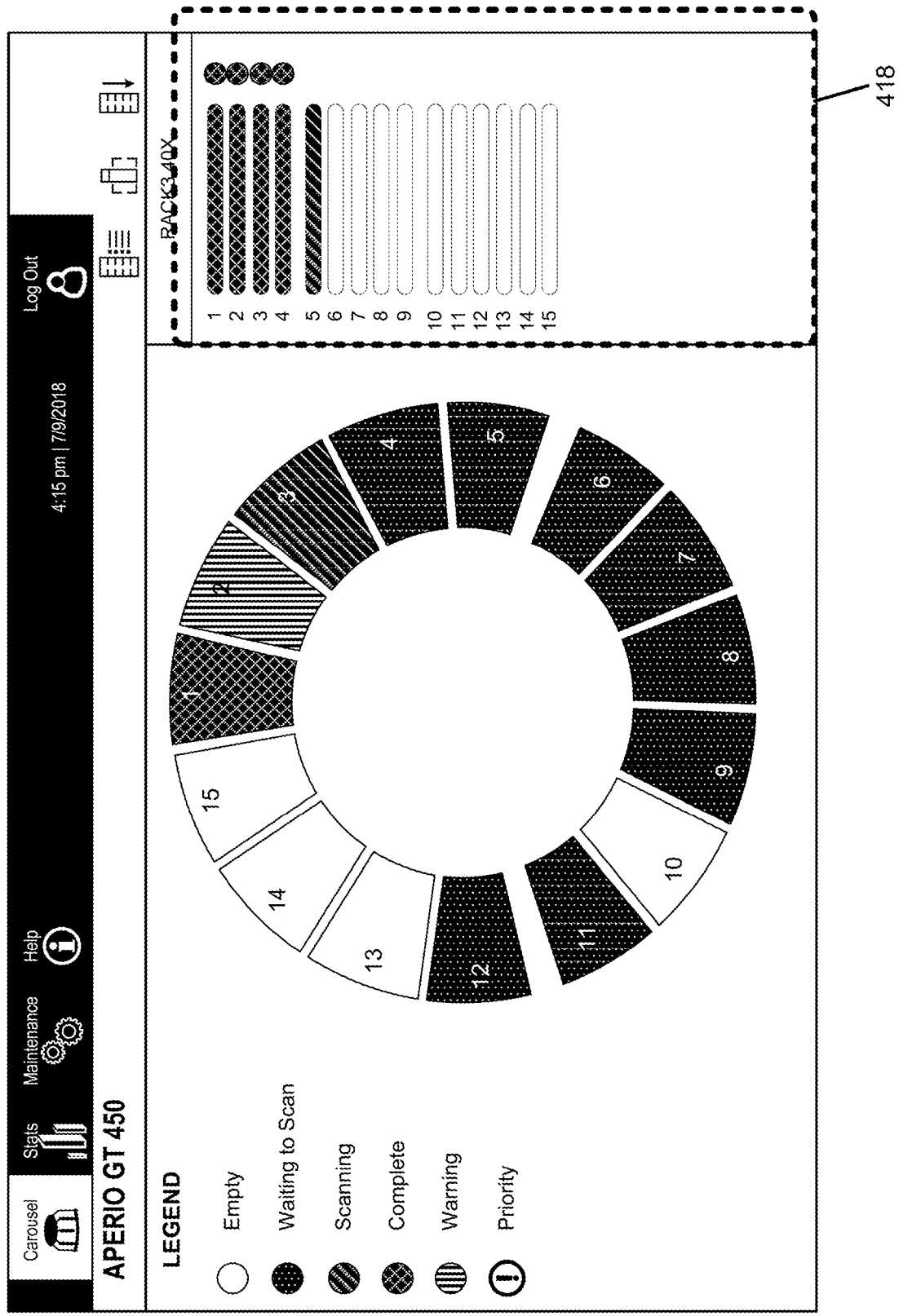

In FIG. 4J, since no graphical slot representation 408 has been selected, viewing pane 418 automatically displays information concerning the slide rack 220 currently being processed (i.e., the slide rack 220 within the rack slot 208 corresponding to the graphical slot representation 408, labeled "3," in the "scanning" status). Notably, the rack view has been selected from view-selection ribbon 416 for display in viewing pane 418. Accordingly, viewing pane 418 displays a list of individual glass slides 114, along with their respective statuses, within the slide rack 220 that is currently occupying the corresponding rack slot 208. As illustrated in viewing pane 418, the slide rack 220 being processed has thirty slide slots, the glass slides 114 in slots two through five have been scanned (e.g., represented by a green color fill and a checkmark icon), and the glass slide 114 in slot six is currently in the process of being scanned. FIG. 4K illustrates the carousel screen in the same state as in FIG. 4J, but in a scenario in which the slide rack 220, currently being processed and represented in viewing pane 418, comprises only twenty slide slots.

Figure 4L:
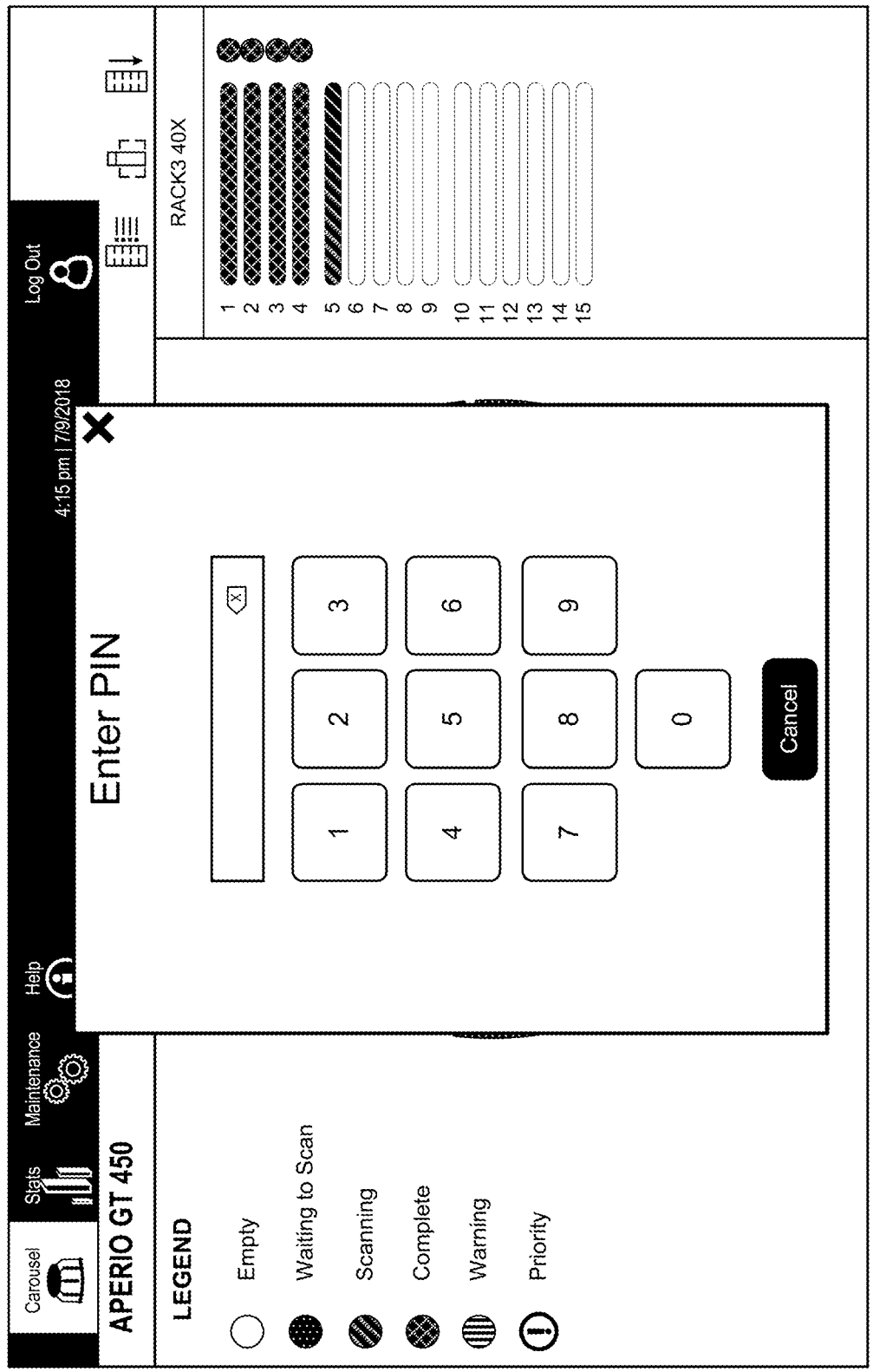

FIG. 4L illustrates a log-in frame that may be displayed on the touch panel display of scanning system 100, according to an embodiment. For example, the log-in frame may be displayed whenever a user selects log-in/log-out input element 422 while the user is not logged in and log-in/log-out input element 422 is in its logged-out state. Additionally, the log-in frame may be displayed any time that a user interacts with or touches the touch panel display while no one is logged into scanning system 100. As illustrated, in the log-in frame, the user is prompted to enter a personal identification number (PIN), using a keypad that is overlaid on top of whatever screen was being displayed at the time that the user selected log-in/log-out input element 422. The screen being overlaid may be grayed out, to emphasize the log-in frame. After entering the user's associated PIN, the user may select an input element to submit the entered PIN for authentication. In response to the submission of the PIN, a processor 104 may attempt to authenticate the PIN (e.g., by comparing it to an authorized PIN stored locally or remotely on a network server). If the PIN is not authenticated, an error message may be displayed in the log-in frame, and the user may be prompted to reenter the PIN. Otherwise, if the PIN is authenticated, processor 104 may remove the log-in frame and update the log-in/log-out input element 422 to transition from a logged-out state to a logged-in state. Once logged in, processor 104 may provide the user with additional functionality, so as to include all features of scanning system 100, such as the ability to preview macro slide images, labels of scanned slides, and/or the like.

In an embodiment, a processor 104 may automatically log out a user after a predetermined amount of time (e.g., fifteen minutes, thirty minutes, one hour, etc.) has passed with no user interactions. This amount of time may be a system or user setting (e.g., stored in the SAM server). Each time a user interaction occurs (e.g., a user touches the touch panel display), a timer, which counts down the amount of time before logging out the user, may be reset. The length of the required PIN (e.g., five numbers) may also be a system or user setting (e.g., stored in the SAM server). In an embodiment, PINs may be set using a graphical user interface (e.g., webpages) of the SAM server. Whenever there is no user logged into scanning system 100, the graphical user interface may automatically revert to the carousel screen with a rack view in viewing pane 418 that corresponds to the slide rack 220 that is currently being processed.

Figure 4M:
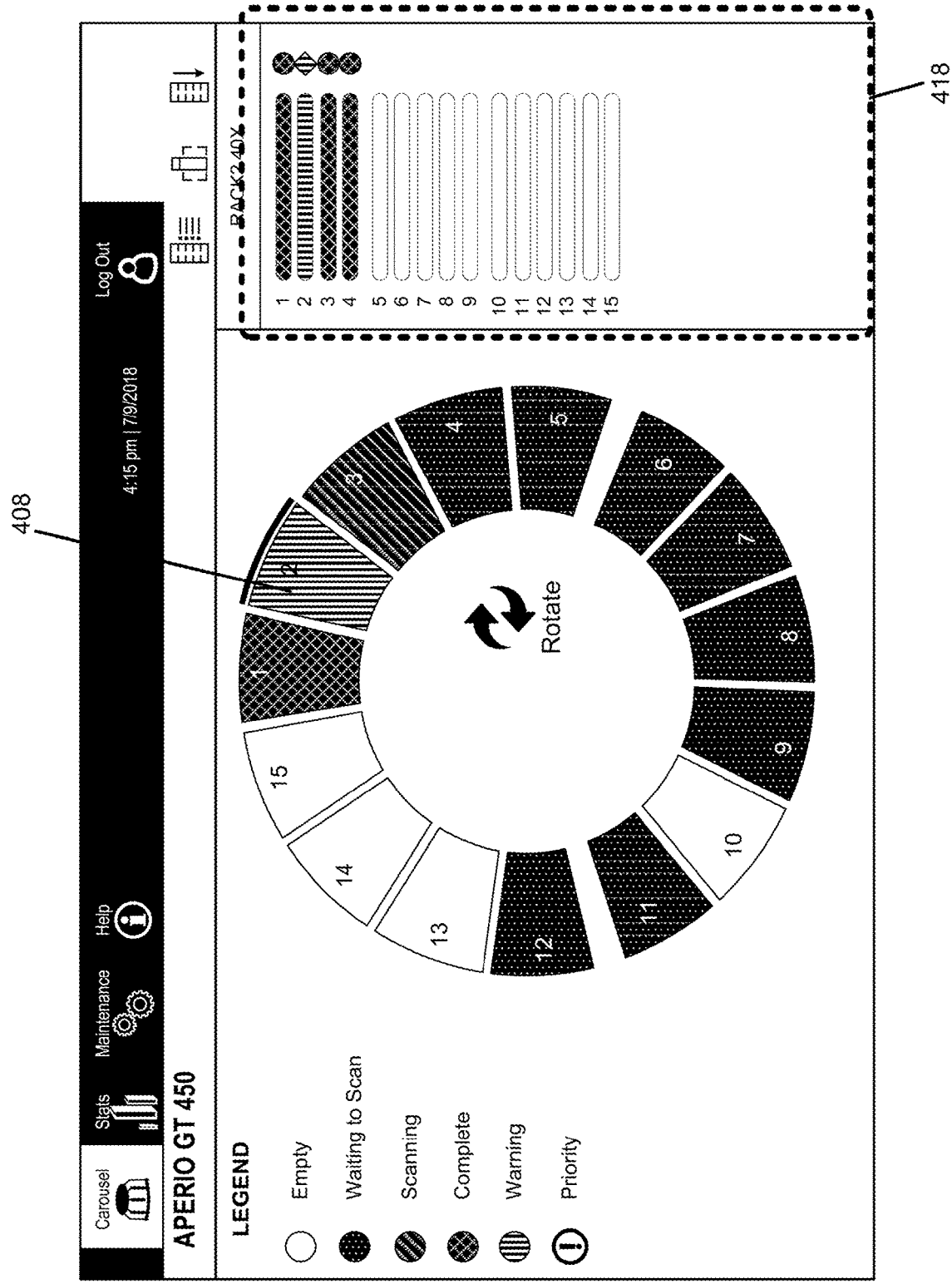

FIG. 4M illustrates the carousel screen, after a user has selected the graphical slot representation 408 identified as being in the "warning" state, according to an embodiment. Viewing pane 418 has been updated to graphically represent the glass slides 114 in the corresponding slide rack 220. As illustrated, the graphical representation of the specific glass slide 114 that caused the warning (i.e., the glass slide 114 in slot "2" of the corresponding slide rack 220) is distinguished from graphical representations of glass slides 114 which did not cause a warning (e.g., glass slides 114 in slots "1", "3", and "4" of the corresponding slide rack 220 were successfully scanned). For example, the graphical representation may be distinguished using the color associated with the "warning" state (e.g., orange) and/or a warning icon (e.g., an orange diamond with an exclamation point).

Figure 4N:
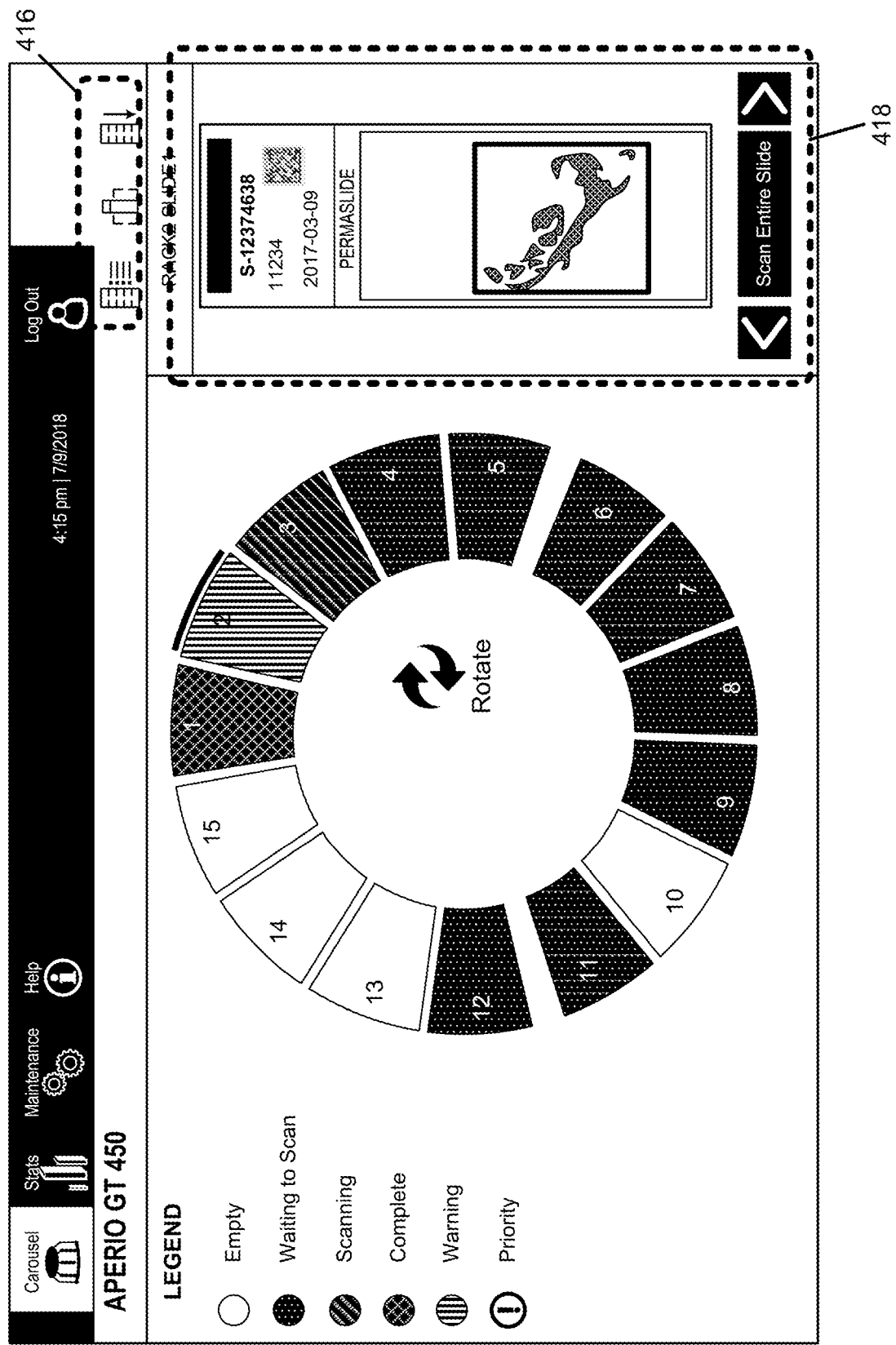

FIG. 4N illustrates the slide view for a selected slide in viewing pane 418 of the carousel screen, according to an embodiment. Notably, in the illustrated example, a user has logged into scanning system 100, and therefore, has access to the slide view via view-selection ribbon 416. In the slide view, a preview image of a glass slide 114 to be scanned is displayed (along with its label). As illustrated, a processor 104 of scanning system 100 may execute a tissue-finding algorithm on a preview image of the glass slide 114 to identify tissue, and the identified tissue may be highlighted in the slide view (e.g., by overlaying a green rectangle around the identified tissue) for that glass slide 114. The green rectangle represents the area of the glass slide 114 that will be scanned to produce the final image of the glass slide 114. In an embodiment, the slide view may comprise an input element for specifying that the entire glass slide 114 should be scanned, instead of just the area identified by the tissue-finding algorithm. In response to the selection of this input, a processor 104 of scanning system 100 may flag the glass slide 114 so that the entire area of that glass slide 114 will be scanned when the final image is generated.

In an embodiment, the slide view may also comprise navigation input elements to navigate between preview images of the glass slides 114 within the slide rack 220 corresponding to the selected graphical slot representation 408. For example, in FIG. 4N, the preview image of the glass slide 114 in slot "1" of the corresponding slide rack 220 is shown, and a user may select the left arrow to navigate to a preview image of the glass slide 114 in the closest preceding occupied slot, or select the right arrow to navigate to a preview image of the glass slide 114 in the closest subsequent occupied slot.

Figure 4O:
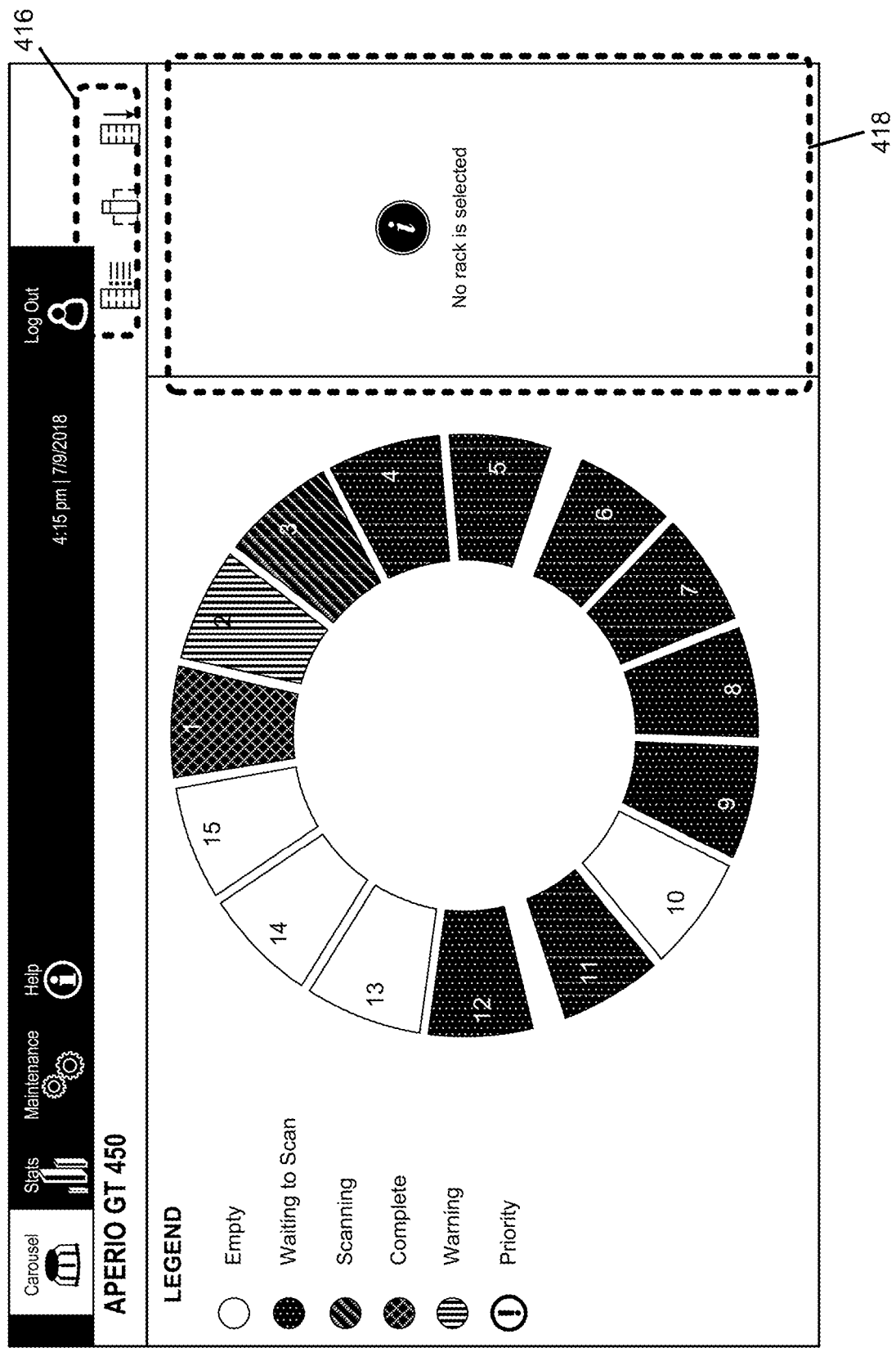

FIG. 4O illustrates the slide view in viewing pane 418 of the carousel screen, when no graphical slot representation 408 is selected, according to an embodiment. In this case, viewing pane 418 may simply indicate that no rack is selected. This lets the user know that he or she needs to select a graphical slot representation 408 in order to access the slide view for the corresponding slide rack 220.

Figure 4P:
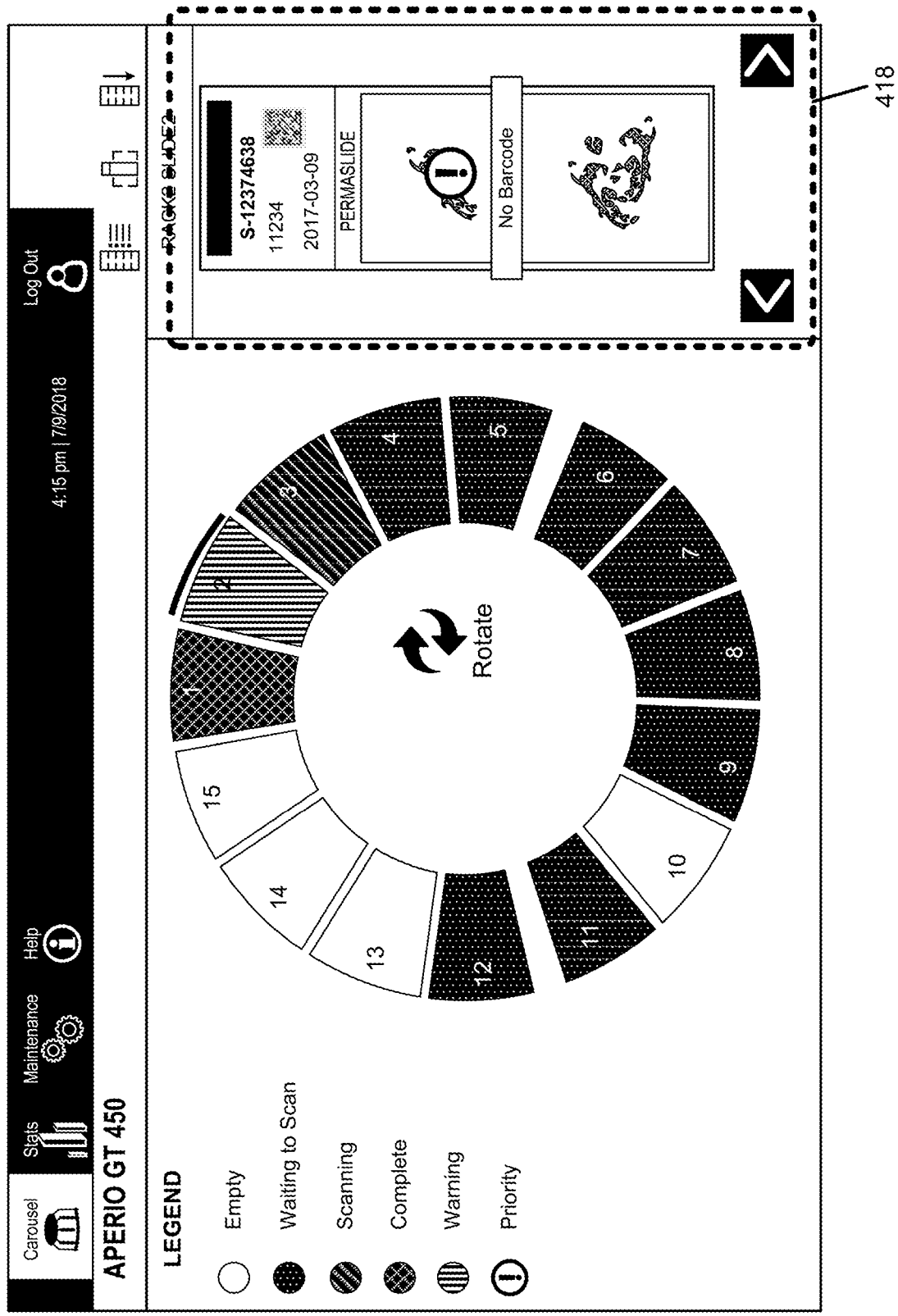

FIG. 4P illustrates the slide view in viewing pane 418 of the carousel screen, when a warning was encountered during scanning of the selected glass slide 114, according to an embodiment. As illustrated, a warning icon and a warning message may be displayed over the macro image of the glass slide 114. In this case, the warning message indicates that "no barcode" was found on the glass slide 114. Note that a border, in the color associated with the "warning state" (e.g., orange), may also be rendered around the macro image of the glass slide 114 to further emphasize the associated "warning" state. Examples of possible warning states include, without limitation, "tilted" indicating that glass slide 114 was tilted in the slide rack 220 and was not loaded, "no barcode" indicating that no barcode could be read on glass slide 114, "no tissue" indicating that no tissue was identified on glass slide 114 (e.g., by a tissue-finding algorithm), "no macro focus" indicating that macro focus failed on all focus points on glass slide 114, "aborted" indicating that the scan of glass slide 114 did not complete for any of various reasons, and/or "image quality" indicating that the scan of glass slide 114 completed but the image quality is questionable and should be reviewed (e.g., as determined by an image-quality algorithm executed by processor 104 of scanning system 100).

Figure 4Q:
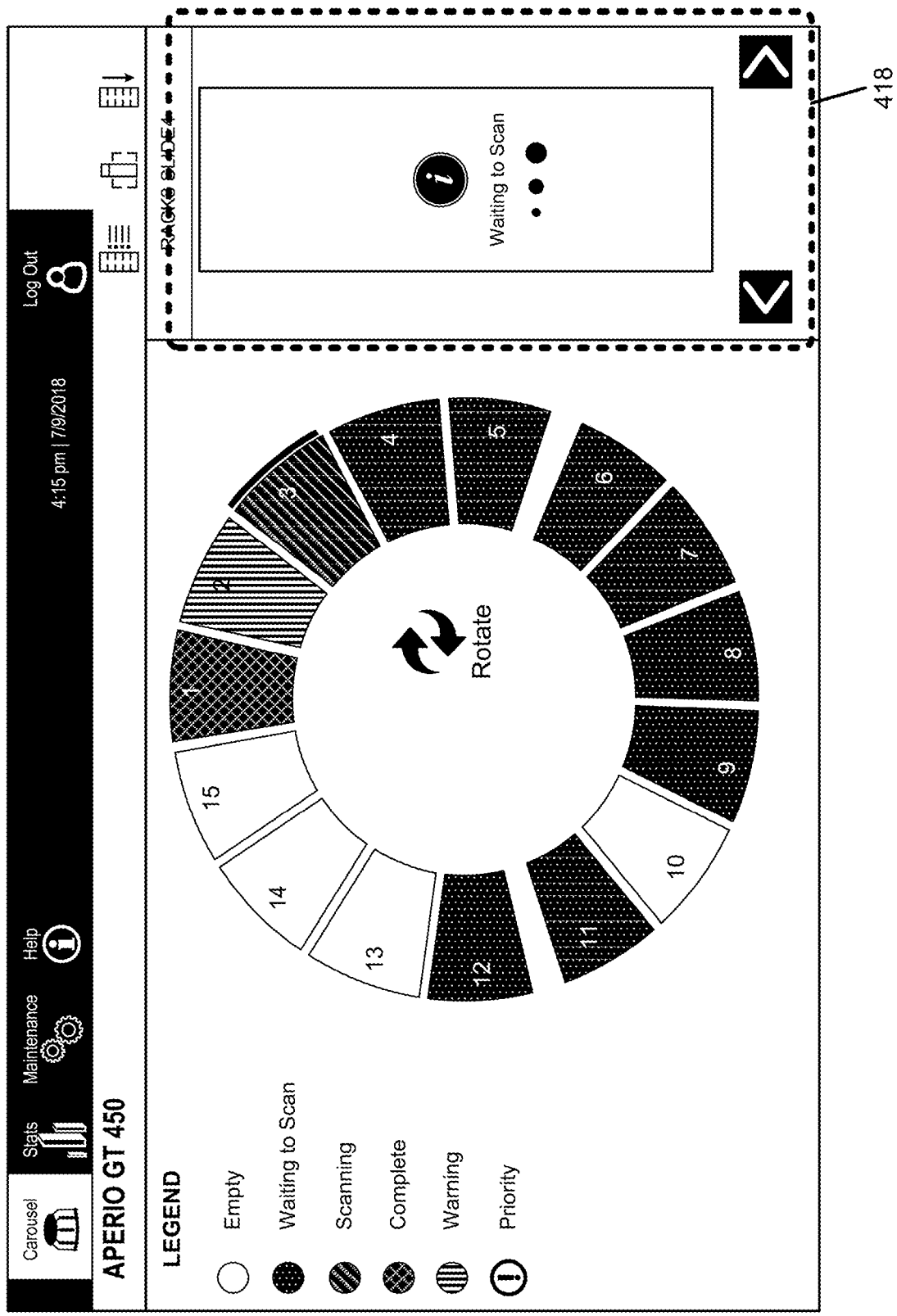

FIG. 4Q illustrates the slide view in viewing pane 418 of the carousel screen, when a glass slide 114 that is waiting to be scanned has been selected, according to an embodiment. As illustrated, a waiting icon and a waiting message may be displayed in the slide view. Note that a border, in the color associated with the "waiting to scan" state (e.g., light blue), may also be rendered around the space in which the macro image of glass slide 114 will be displayed after glass slide 114 has been scanned. An animation (e.g., animated dots) may also be displayed to visually indicate that glass slide 114 is waiting to be scanned.

Figure 4R:
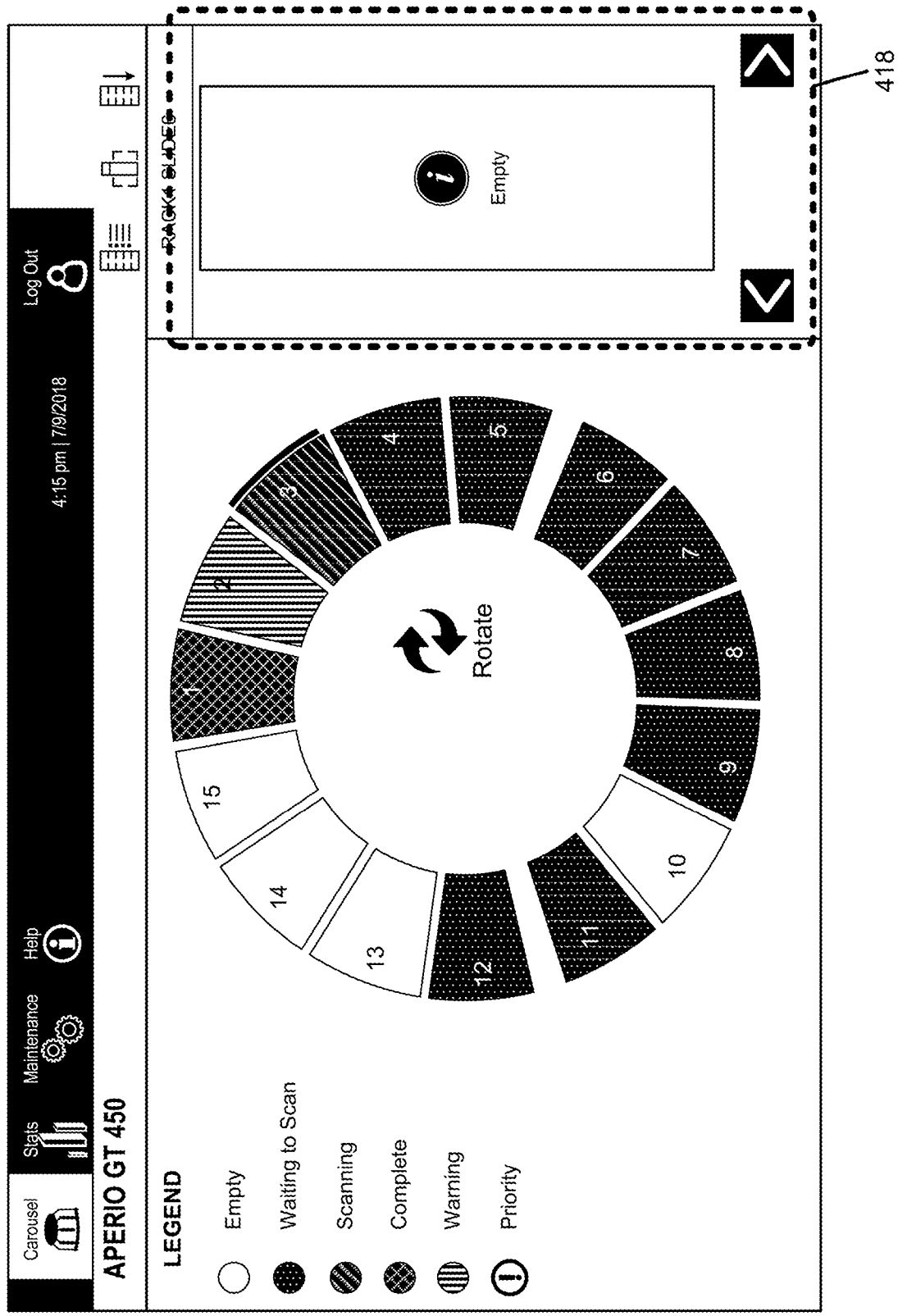

FIG. 4R illustrates the slide view in viewing pane 418 of the carousel screen, when the selected slot of the corresponding slide rack 220 is empty, according to an embodiment. As illustrated, an empty icon and an empty message may be displayed in the slide view. Note that a border, in the color associated with the "empty" state (e.g., gray), may also be rendered around the space in which a macro image would normally appear.

Figure 4S:
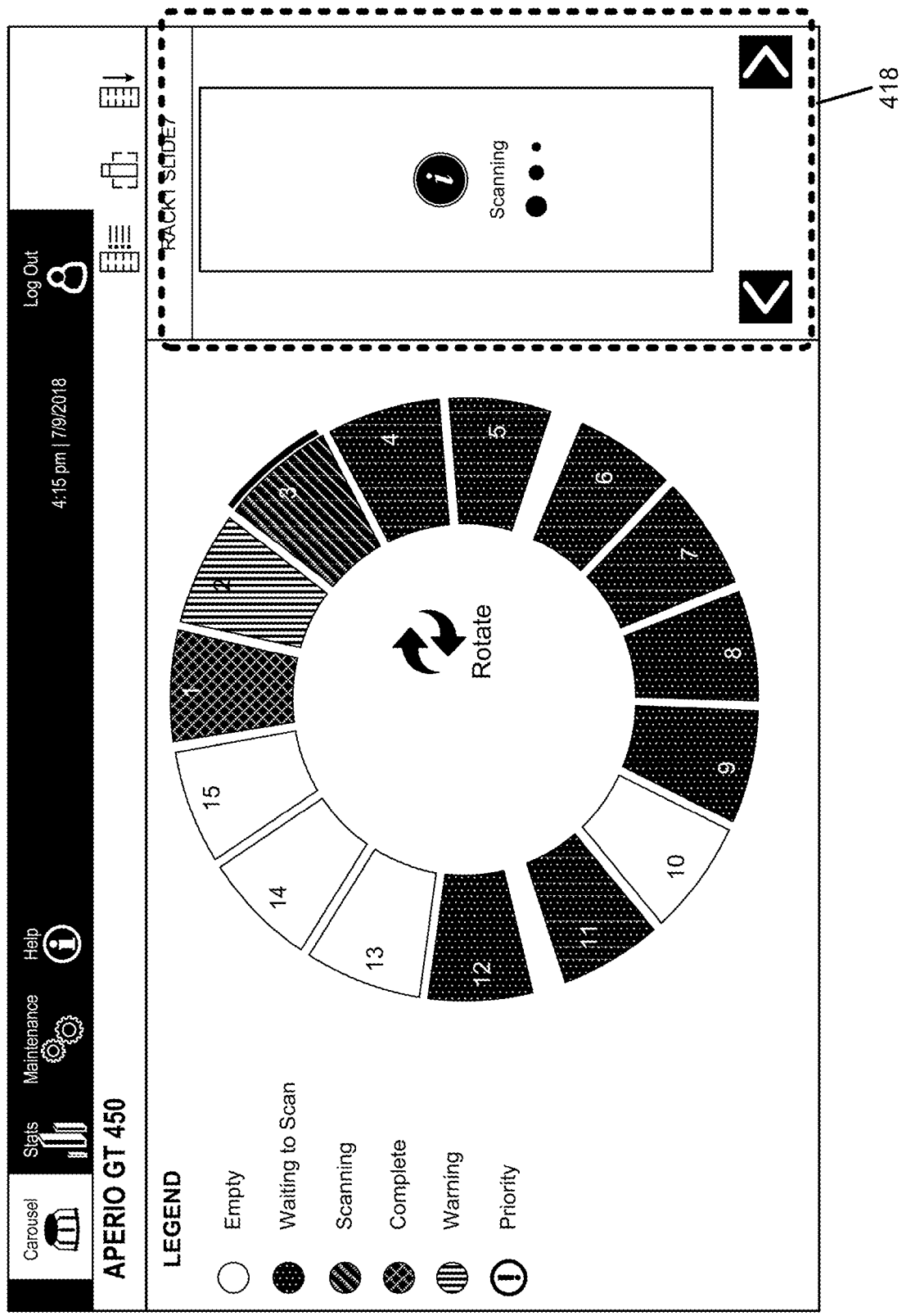

FIG. 4S illustrates the slide view in viewing pane 418 of the carousel screen, when a glass slide 114 that is being scanned has been selected, according to an embodiment. As illustrated, a scanning icon and a scanning message may be displayed in the slide view. Note that a border, in the color associated with the "scanning" state (e.g., dark blue), may also be rendered around the space in which the macro image of glass slide 114 will be displayed after scanning has been completed. An animation (e.g., animated dots) may also be displayed to visually indicate that glass slide 114 is being scanned.

Figure 4T:
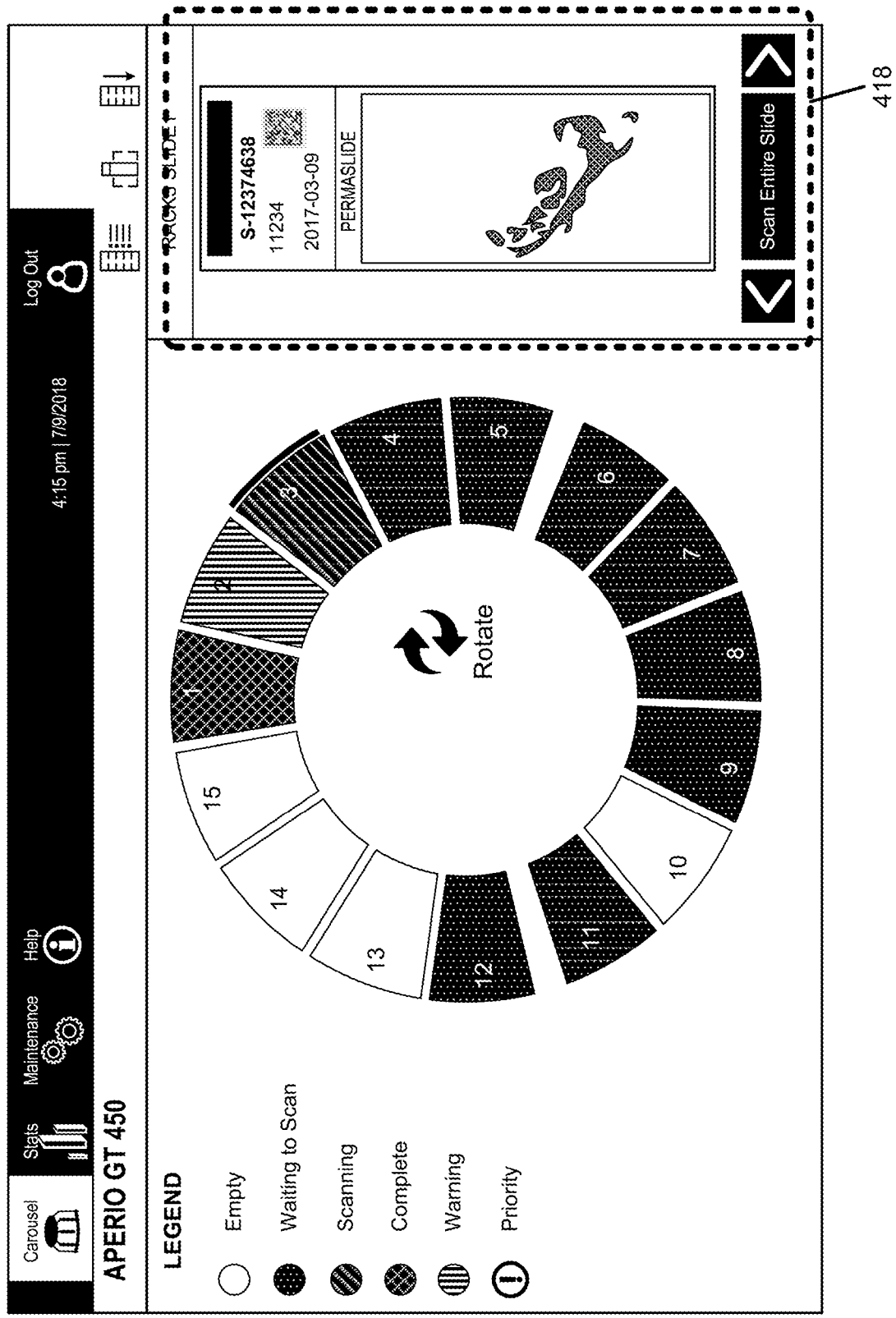

FIG. 4T illustrates the slide view for a selected slide in viewing pane 418 of the carousel screen, after scanning has been completed, according to an embodiment. In the slide view, the final image of a scanned glass slide 114 is displayed (along with its label). Note that a border, in the color associated with the "complete" state (e.g., green), may be rendered around the scanned portion of glass slide 114. In an embodiment, the slide view may comprise an input element for specifying that the entire glass slide 114 should be scanned, instead of just the area previously scanned. In response to the selection of this input, a processor 104 of scanning system 100 may flag the glass slide 114 so that the entire area of that glass slide 114 will be scanned. This feature is useful, for example, if the tissue-finding algorithm did not correctly locate an area of tissue or missed an area of tissue on glass slide 114. It should be understood that, when the entire glass slide 114 is to be scanned, the tissue-finding algorithm may be skipped or its output ignored.

Figure 4U:
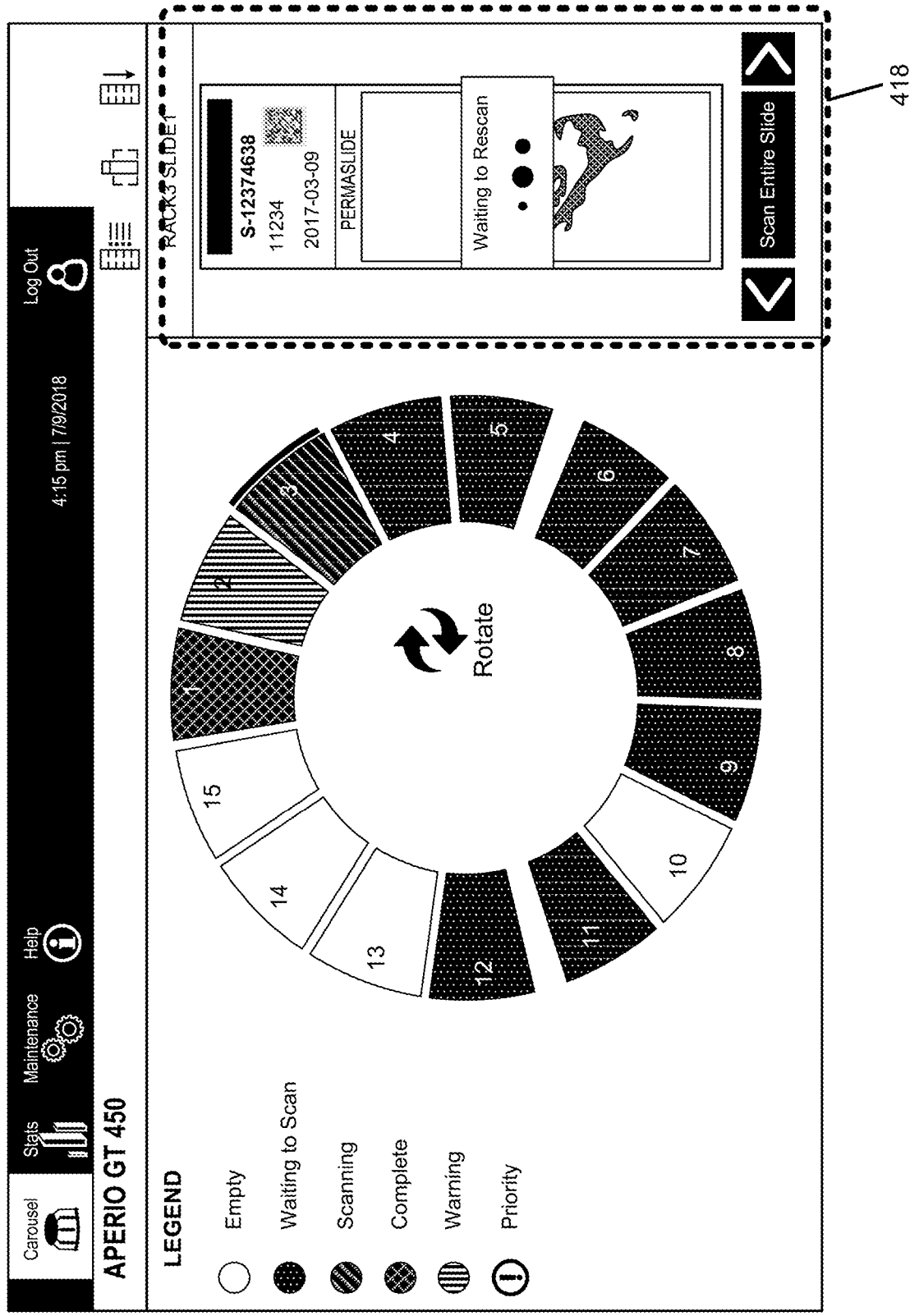

FIG. 4U illustrates the slide view for a selected slide in viewing pane 418 of the carousel screen, after a user has selected the input element for scanning the entire glass slide 114, according to an embodiment. In this case, the input element for scanning the entire glass slide 114 may be disabled to prevent it from being selected again. In addition, a waiting icon and/or a waiting message (e.g., "waiting to rescan") may be displayed over the prior macro image of glass slide 114 in viewing pane 418. Note that a border (e.g., green) may also be rendered around the space representing the entire area of glass slide 114 to be rescanned. An animation (e.g., animated dots) may also be displayed to visually indicate that glass slide 114 is being rescanned.

In an embodiment, if the glass slide 114 to be rescanned is in a slide rack 220 that is currently being processed, the glass slide 114 to be rescanned will be rescanned after all remaining glass slides 114 in the slide rack 220 have been scanned. On the other hand, if the glass slide 114 to be rescanned is in a slide rack 220 that has already been completely processed, the slide rack 220 may be assigned the lowest priority among slide racks 220 waiting to be processed. In this case, the glass slide 114 to be rescanned will be rescanned after all other pending slide racks 220 have been processed. However, as discussed elsewhere herein, a user may increase the priority of the slide rack 220, containing the glass slide 114 to be rescanned, by, for example, selecting that slide rack 220 and then selecting priority icon 434 while that slide rack 220 is selected.

Figure 4V:
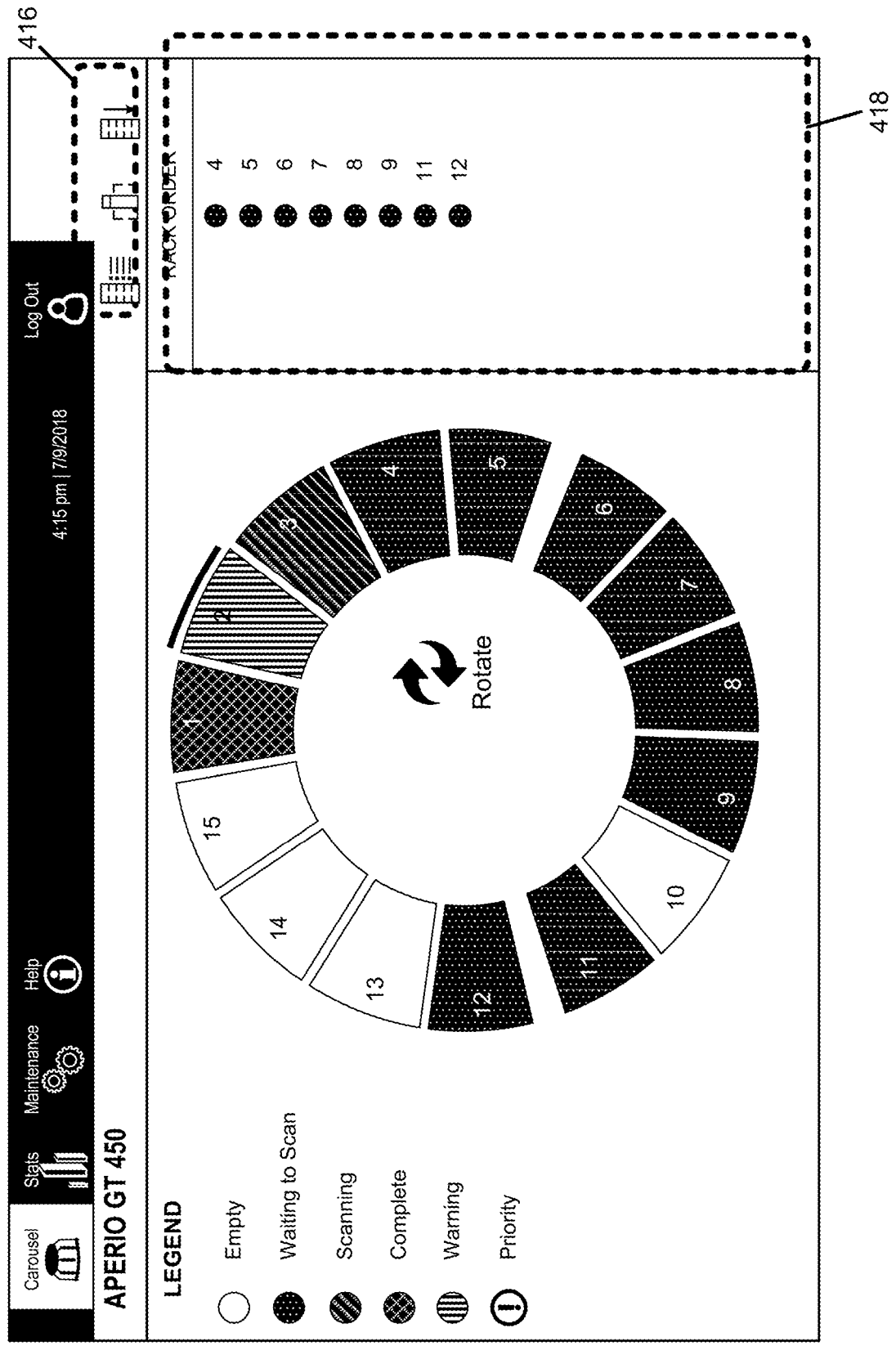

FIG. 4V illustrates the rack-order view in viewing pane 418 of the carousel screen, according to an embodiment. Notably, in the illustrated example, a user has logged into scanning system 100, and therefore, has access to the rack-order view via view-selection ribbon 416. In the rack-order view, viewing pane 418 displays the scanning order of all slide racks 220 waiting to be processed. In an embodiment, the rack-order view is only informational and does not provide any options for user interaction.

Figure 4W:
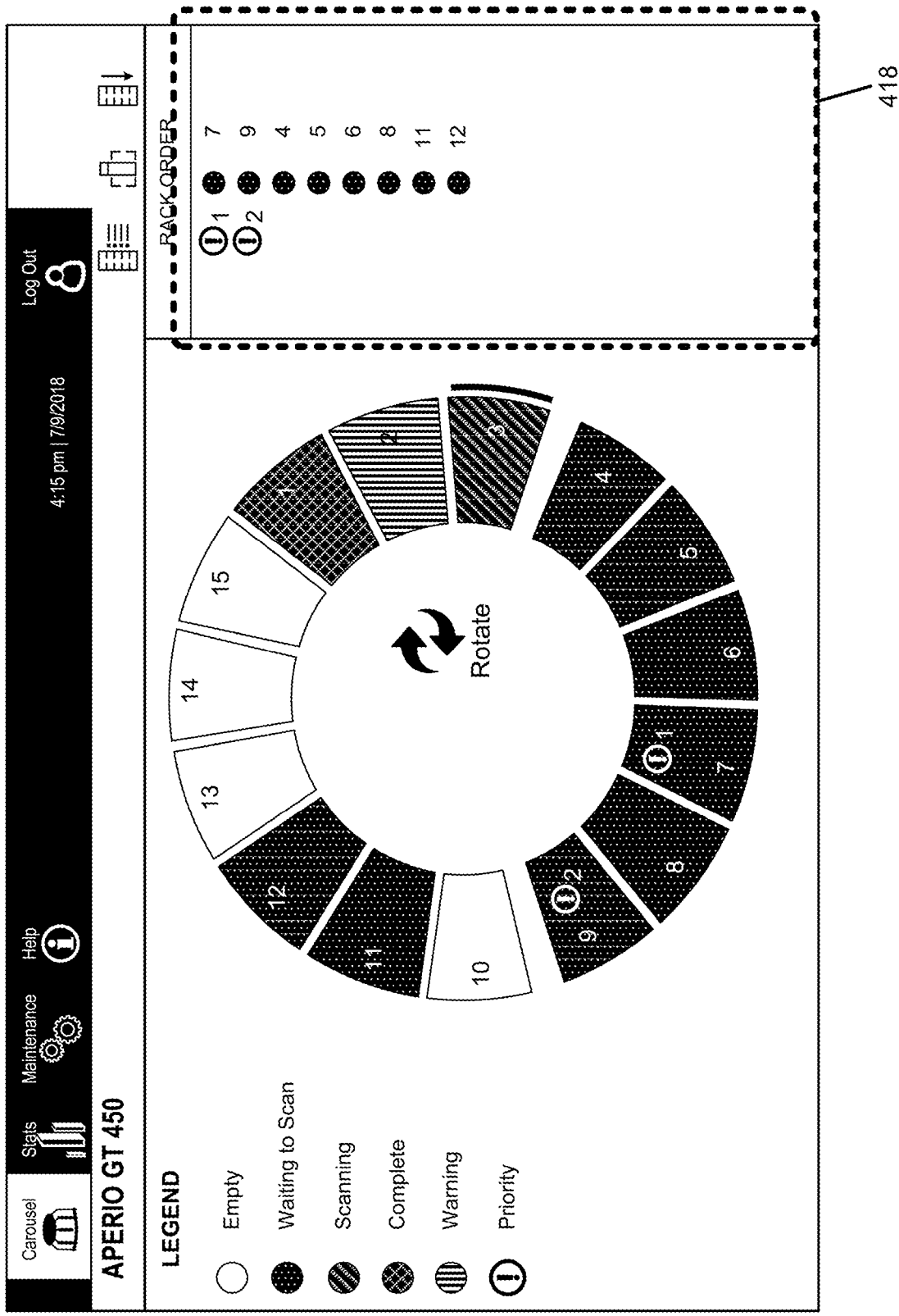

FIG. 4W illustrates the rack-order view in viewing pane 418 of the carousel screen, when one or more slide racks 220 have been prioritized (e.g., using priority icon 434), according to an embodiment. In the event that a slide rack 220 has been prioritized, this would be reflected in the scanning order by the prioritized slide rack 220 being at the top of the scanning order. The prioritization may be indicated by a priority icon (e.g., along with a numeral indicating its priority order) being displayed next to (e.g., to the left of) the representation of the prioritized slide rack 220.

In an embodiment, after a slide rack 220 has been prioritized (e.g., using priority icon 434), there is no means to reassign or change priority within the graphical user interface. Thus, to reassign or override the priority, assigned to a slide rack 220, a user may be required to eject that slide rack 220 from carousel 200 and then reload slide rack 220 into carousel 200. As an example, if three slide racks 220 have been assigned priorities one through three, and the user removes the slide rack 220 that has been assigned priority two, the slide rack 220 that had been assigned priority two will lose its priority, and the slide rack 220 with priority three will automatically be assigned priority two.

Figure 4X:
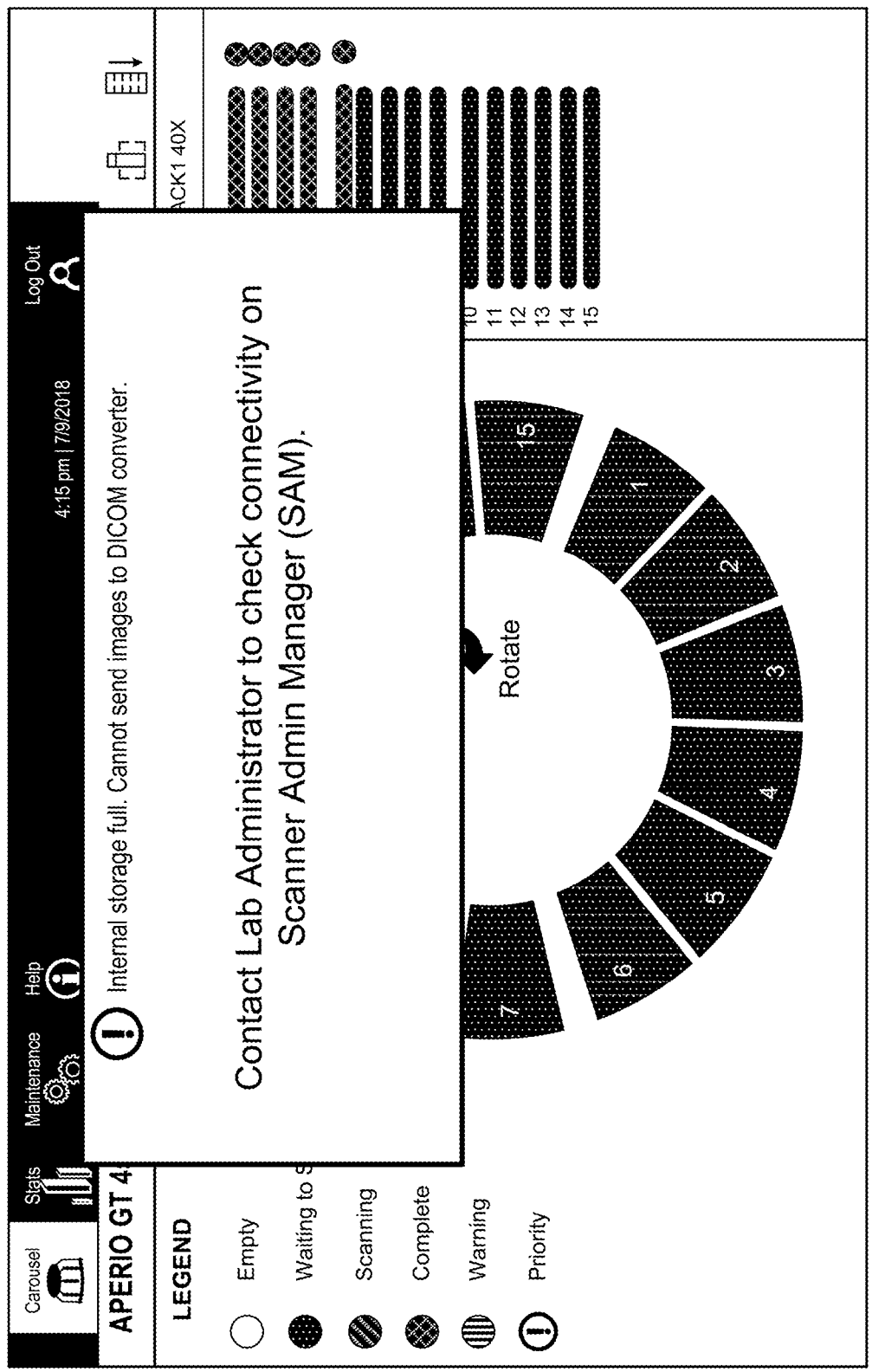

FIG. 4X illustrates an error frame that may be displayed on the touch panel display of scanning system 100, according to an embodiment. For example, the error frame may be displayed whenever an error is encountered by scanning system 100. As illustrated, the error frame is overlaid on top of whatever screen was being displayed at the time that the error occurred. The screen being overlaid may be grayed out, to emphasize the error frame. The error frame may display an error message that informs the user of the details of the error, so that the user can take appropriate action. The error frame may be displayed until the error is corrected. After the error is corrected, the error frame may be dismissed, such that focus returns to the screen on which the error frame was overlaid. In the illustrated example, the error is that the SAM server (e.g., which stores the digital slide images, resulting from scanning glass slides 114, in Digital Imaging and Communications in Medicine (DICOM) format) is out of storage space.

Figure 4Y:
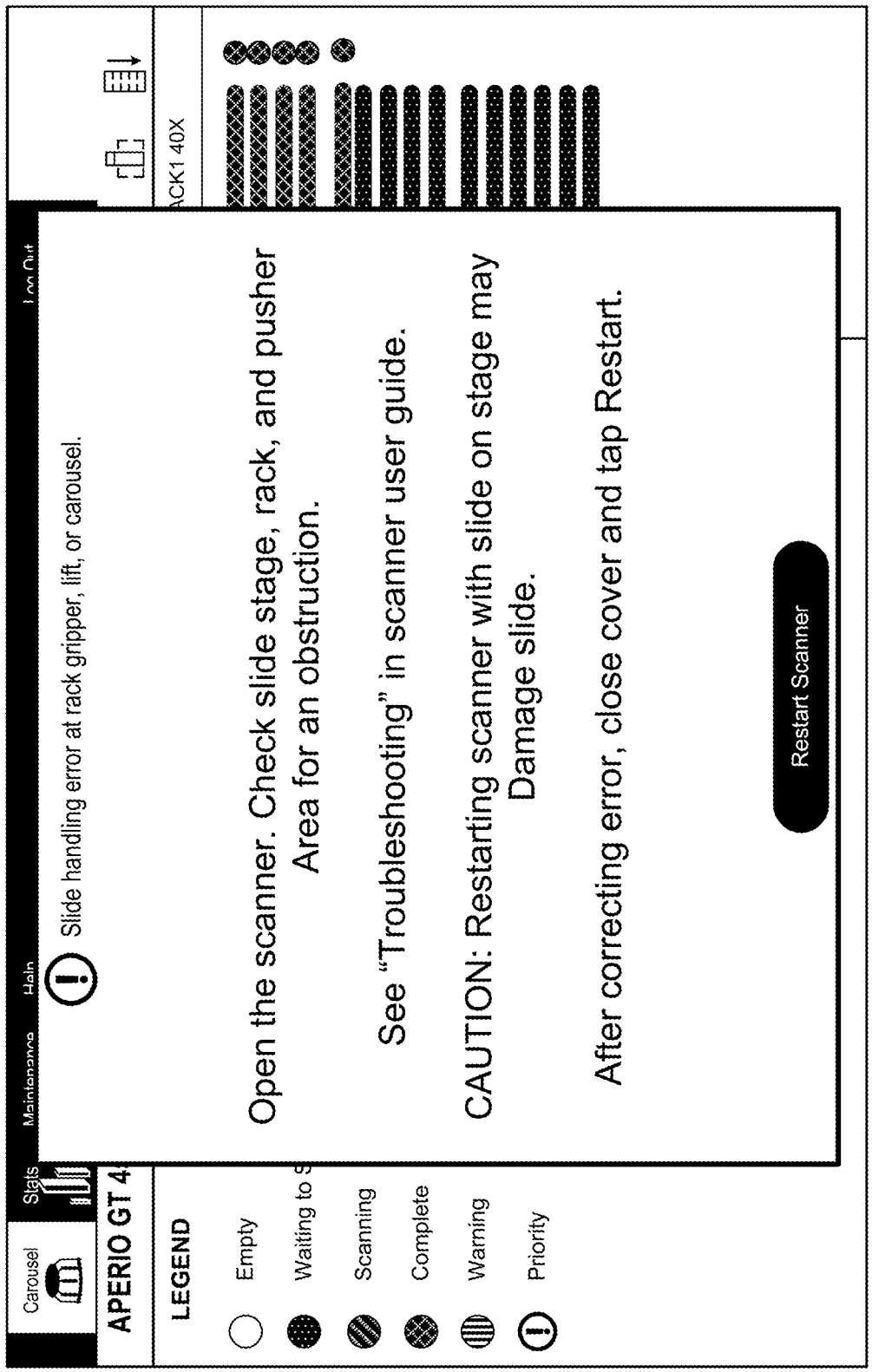

FIG. 4Y illustrates the error frame for another error, according to an embodiment. In this example, the error frame displays a set of detailed instructions for correcting the error, and includes an input element for restarting scanning system 100. Thus, a user may follow the detailed instructions and easily restart scanning system 100, via the error frame, in order to clear the error. Examples of potential errors which may occur and be notified in the error frame include, without limitation, that scanning system 100 cannot initialize, carousel 200 cannot rotate, carousel 200 is experiencing a pinch-point obstruction (e.g., that is preventing it from rotating), the internal storage of scanning system 100 is full, a slide handling error occurred (e.g., when loading or unloading a slide rack 220 from or to carousel 220, when loading or unloading a glass slide 114 from or to a slide rack 220, etc.).

Figure 4Z:
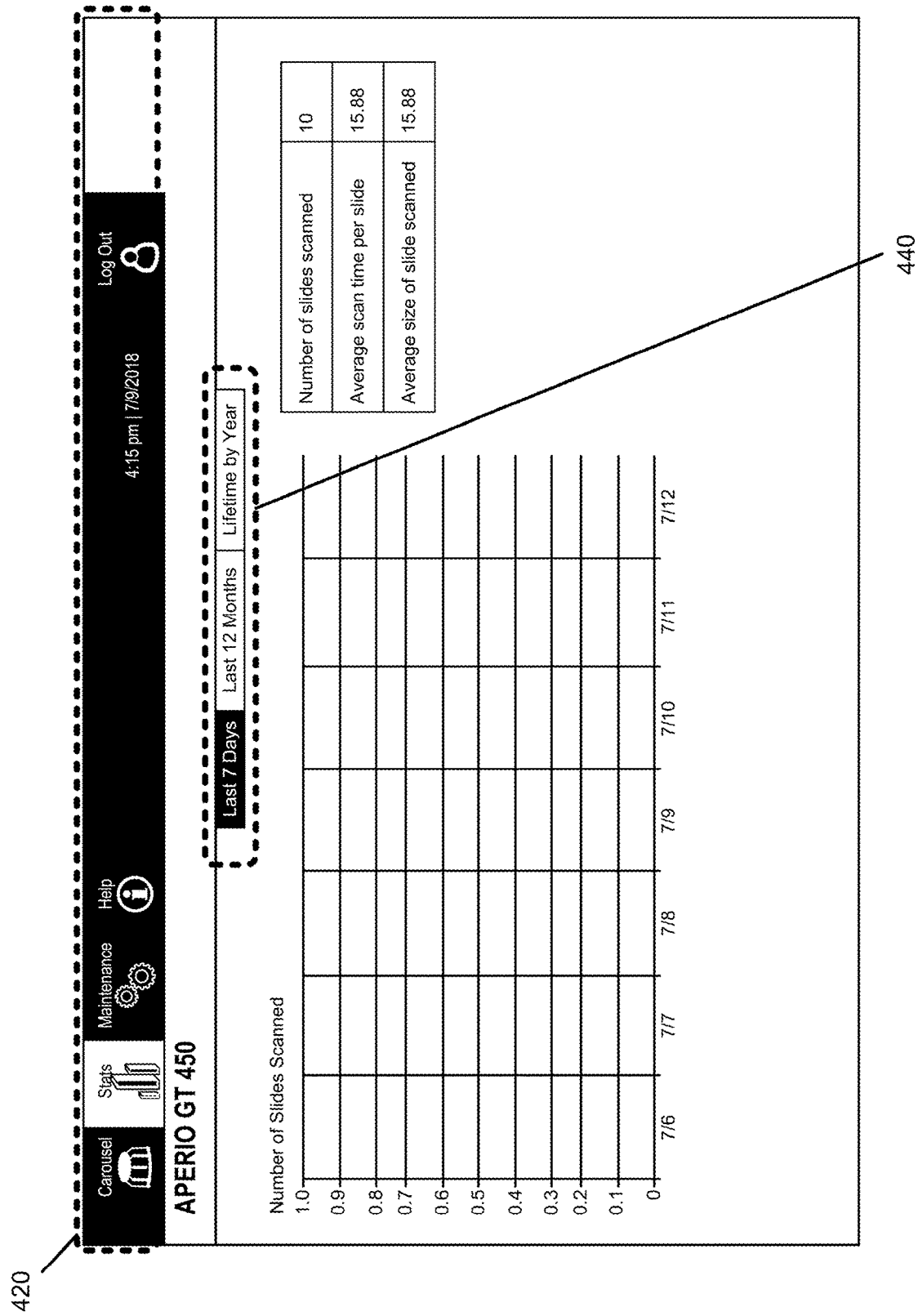
Figure 4A:
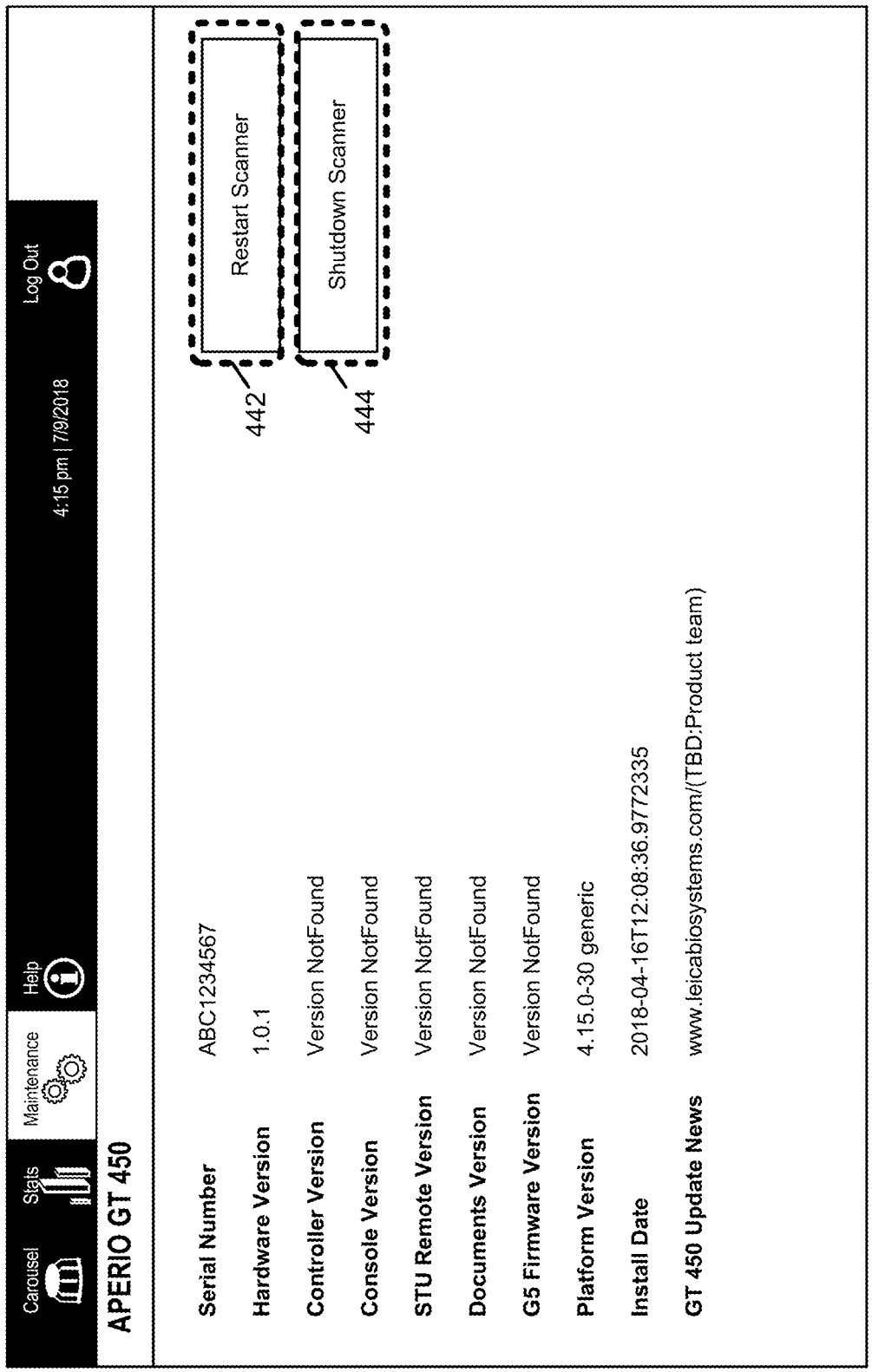
Figure 4A:
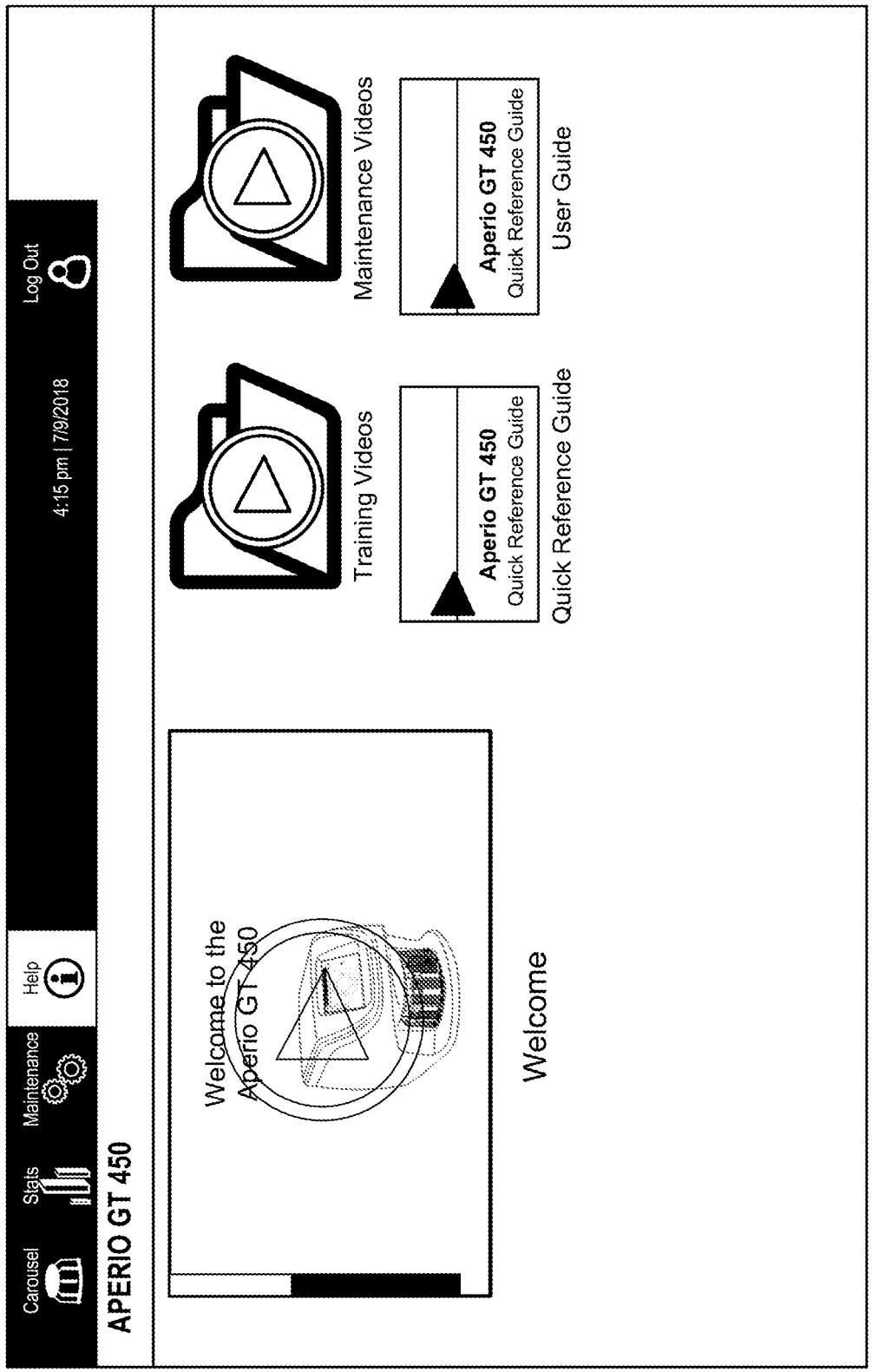
Figure 4A:
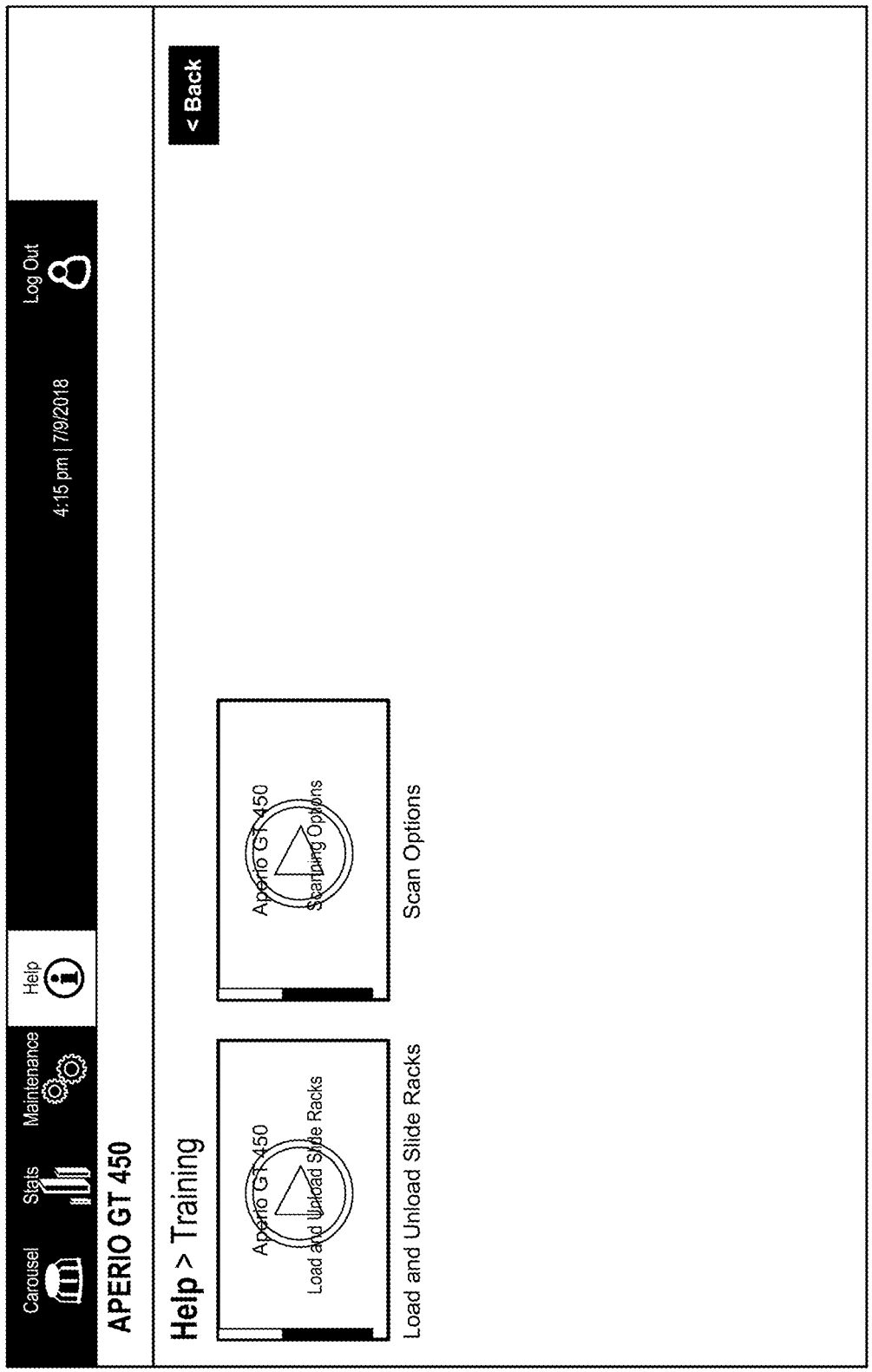
Figure 4A:
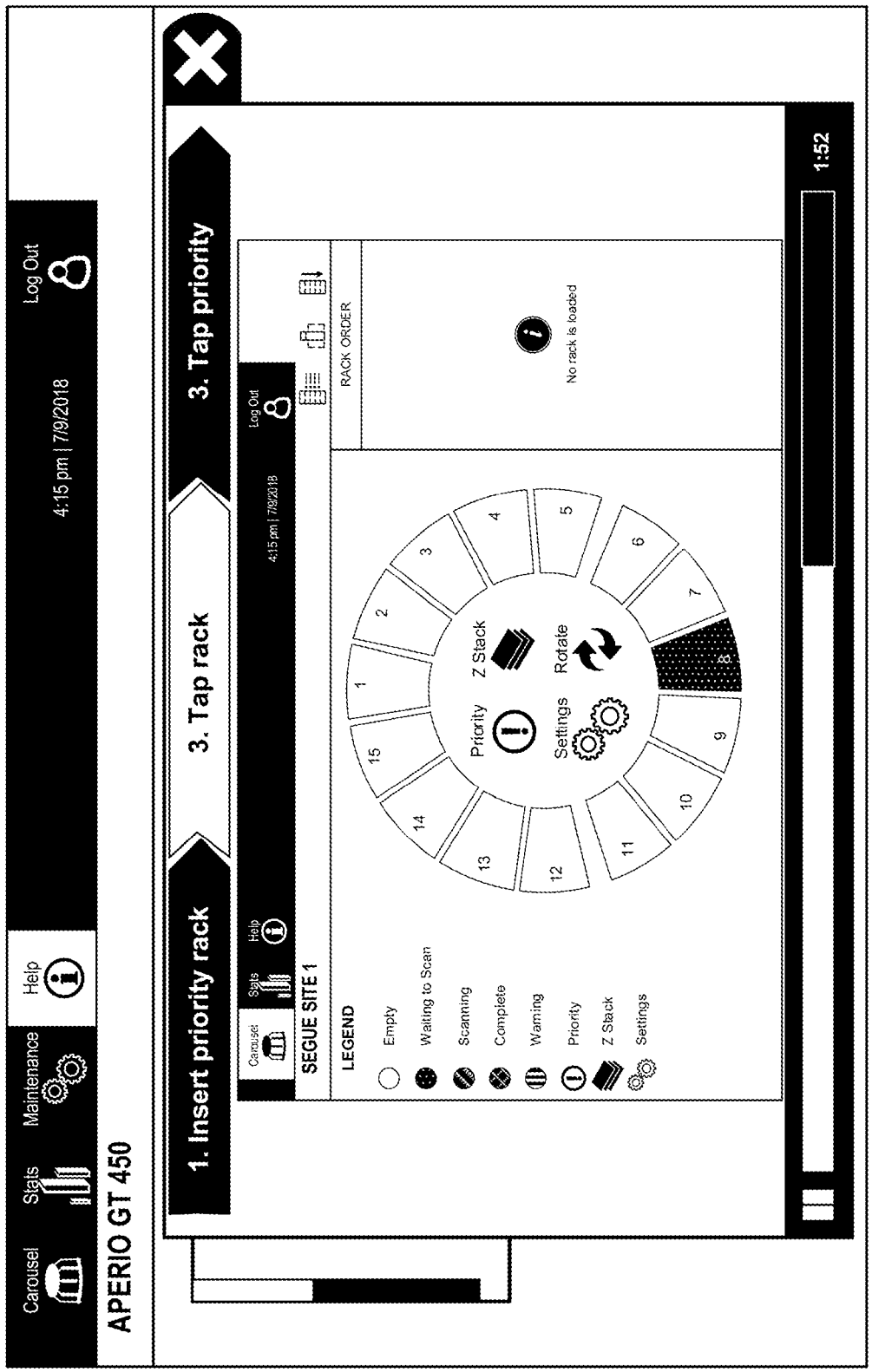
Figure 4A:
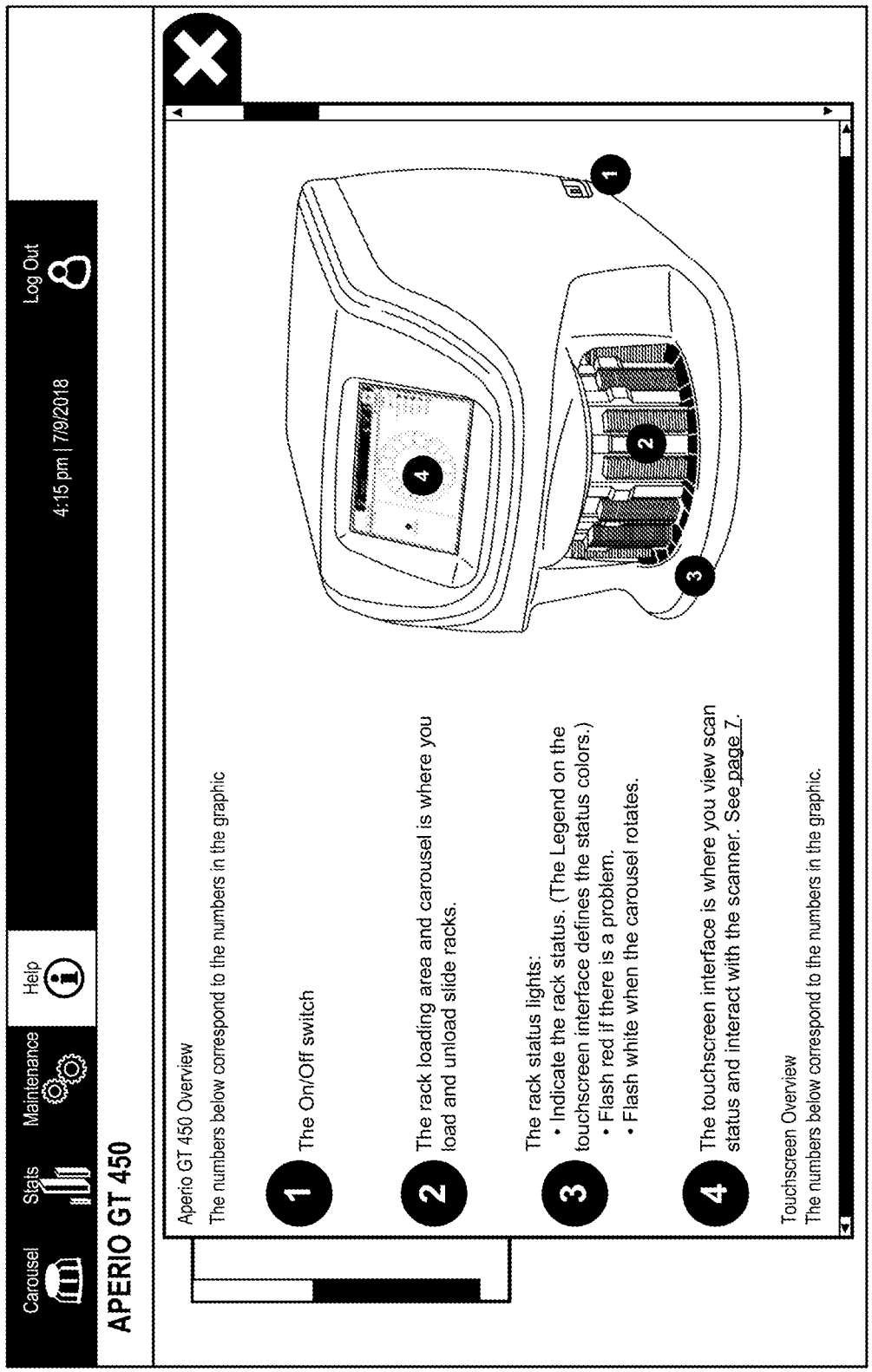

FIG. 4Z illustrates the statistics screen that may be displayed on the touch panel display of scanning system 100, according to an embodiment. For example, the statistics screen may be accessed via an input element in navigation ribbon 420. The statistics screen comprises usage statistics of scanning system 100. The usage statistics may be conveyed using numbers, text, graphs, tables, and/or the like. In the illustrated embodiment, the statistics screen comprises a graph of the number of glass slides 114 scanned over a selected time period (e.g., the last week, last year, or lifetime by year, as selected by a user using time-selection input elements 440), as well as values for the number of glass slides 114 scanned during the selected time period, the average scan time per glass slide 114 during the selected time period, and the average size of glass slides 114 scanned during the selected time period.

FIG. 4AA illustrates the maintenance screen that may be displayed on the touch panel display of scanning system 100, according to an embodiment. For example, the maintenance screen may be accessed via an input element in navigation ribbon 420, The maintenance screen may comprise information about scanning system 100, including, without limitation, the serial number, the hardware version, the controller version, the console version, a s remote canner test utility (STU) version, the documents version, the G5 firmware version, the platform version, an install date, and/or a reference (e.g., hyperlink) to product news (e.g., news about updates). In addition, the maintenance screen may comprise a restart input element 442 for restarting scanning system 100 and/or a shutdown input element 442 for turning off scanning system 100.

FIG. 4AB illustrates the help screen that may be displayed on the touch panel display of scanning system 100, according to an embodiment. For example, the help screen may be accessed via an input element in navigation ribbon 420. The help screen may comprise support information for scanning system 100, including, without limitation, a welcome video, access to tutorial videos that illustrate how to operate and/or maintain scanning system 100, access to a quick-reference guide, access to a user guide, and/or the like. As illustrated, there may be separate folder icons provided for training videos on how to operate scanning system 100 and maintenance videos on how to maintain scanning system 100. A user may select one of the folders to view a list of available videos, as illustrated in FIG. 4AC, according to an embodiment, and select one of the videos in the list to play the video within the maintenance screen. A user may also select a link (e.g., by touching a position on the touch panel display at which the link is being displayed) to the quick-reference guide and/or user guide to view the selected guide as an electronic document within the maintenance screen. As the user navigates through pages of the maintenance screen, input elements (e.g., a back button) may be provided on the pages to return to the previously viewed page of the maintenance screen. In addition, a user may return to the primary help screen, at any time, by simply re-selecting the input element for the help screen in navigation ribbon 420.

FIG. 4AD illustrates the help screen, after a user has selected a video for playback, according to an embodiment. As illustrated, a video frame is overlaid over the help screen and comprises an area in which the video is played and one or more playback controls for playing the video, pausing the video, rewinding the video, fast-forwarding the video, and/or the like. An input element may also be included for closing the video frame to return to the underlying help screen.

FIG. 4AE illustrates the help screen, after a user has selected a user guide for viewing, according to an embodiment. As illustrated, a document frame is overlaid over the help screen and displays a scrollable document with text and images. In the illustrated embodiment, a user may scroll through the document in the document frame by swiping up on the touch panel display to scroll down and swiping down on the touch panel display to scroll up. It should be understood that "swiping" in this context refers to a user contacting the touch panel display with his or her finger at a point within the document and maintaining contact with the touch panel display as he or she slides his or her finger along the touch panel display. An input element may also be included for closing the document frame to return to the underlying help screen.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A scanning system comprising:
   a carousel comprising a plurality of rack slots configured to receive slide racks;

a memory circuit storing computer-executable instructions; and at least one hardware processor configured to execute the computer executable instructions, wherein execution of the computer-executable instructions causes the at least one hardware processor to:

generate a graphical user interface comprising a graphical representation of the carousel, wherein the graphical representation of the carousel comprises a graphical representation of each of the plurality of rack slots, wherein the graphical representation of the carousel indicates a position of the carousel, and wherein the graphical representation of each of the plurality of rack slots indicates a status of a particular rack slot or a slide rack within the particular rack slot;

display the graphical user interface on a display of the scanning system;

detect insertion of a slide rack into a previously empty rack slot of the plurality of rack slots;

automatically rotate the carousel to rotate the slide rack into a position for processing based on detecting the insertion of the slide rack; and generate an updated graphical user interface comprising an updated graphical representation of the carousel based on automatically rotating the carousel.

2. The scanning system of claim 1, wherein the status of the particular rack slot or the slide rack within the particular rack slot comprises:

an empty status indicating that the particular rack slot is empty;

a waiting status indicating that the slide rack is within the particular rack slot and the slide rack within the particular rack slot is waiting to be processed by the scanning system;

a scanning status indicating that the slide rack is within the particular rack slot and the slide rack within the particular rack slot is being processed by the scanning system;

a complete status indicating that the slide rack is within the particular rack slot and the slide rack within the particular rack slot has been processed by the scanning system; or a warning status indicating that the slide rack is within the particular rack slot and a warning was encountered during processing of the slide rack within the particular rack slot.

3. The scanning system of claim 1, wherein the display comprises a touch-panel display, wherein the graphical representation of each of the plurality of rack slots is selectable via the touch-panel display, and wherein, in response to a selection of a graphical representation of any one of the plurality of rack slots, the execution of the computer-executable instructions further causes the at least one hardware processor to:

display a selectable graphical representation of one or more functions available for the particular rack slot; and, in response to a selection of the selectable graphical representation of the one or more functions, execute a function of the one or more functions.

4. The scanning system of claim 3, wherein the one or more functions comprise one or more of:

a rotate function, wherein the rotate function causes rotation of the carousel to position the particular rack slot within an exposed portion of the scanning system, which is exposed to an external environment of the scanning system;

a priority function, wherein the rotate function causes prioritization of processing of the particular rack slot over processing of one or more other rack slots of the plurality of rack slots;

a Z-stacking function, wherein the rotate function causes scanning of at least one slide within the particular slide rack at multiple focal depths; or a setting function, wherein the rotate function causes scanning of at least one slide within the particular slide rack according to a specified scan protocol.

5. The scanning system of claim 1, wherein the graphical representation of the carousel comprises a time-till-operation indication, and wherein, in response to determining to rotate the carousel, the execution of the computer-executable instructions further causes the at least one hardware processor to automatically:

delay automatic rotation of the carousel for a delay period; and, during the delay period, animate the time-till-operation indication to indicate a time remaining within the delay period.

6. The scanning system of claim 5, wherein, in response to determining to rotate the carousel, the execution of the computer-executable instructions further causes the at least one hardware processor to reset the delay period in response to detecting a user interaction with the carousel.

7. The scanning system of claim 1, wherein the display comprises a touch-panel display, wherein the graphical representation of each of the plurality of rack slots is selectable via the touch-panel display, wherein the graphical user interface further comprises a viewing pane, and wherein the execution of the computer-executable instructions further causes the at least one hardware processor to:

in response to identifying a selection of the particular rack slot from the graphical representation of each of the plurality of rack slots, populate the viewing pane with information associated with the particular rack slot or the slide rack within the particular rack slot; and, in response to not identifying a selection of the particular rack slot from the graphical representation of each of the plurality of rack slots, populate the viewing pane with information associated with a slide rack being processed by the scanning system.

8. The scanning system of claim 7, wherein the information associated with the particular rack slot or the slide rack within the particular rack slot comprises:

an indication that the slide rack within the particular rack slot is waiting to be processed, wherein the slide rack within the particular rack slot has not been processed; or processing results, wherein the slide rack within the particular rack slot is being processed or has been processed.

9. The scanning system of claim 8, wherein, in a rack view, the processing results comprise an inventory of slides within the slide rack within the particular rack slot, wherein the inventory of slides comprises, for each inventoried slide, an indication of a status of the inventoried slide, wherein the status of the inventoried slide comprises one of:

a completed status indicating the inventoried slide has been scanned;

a scanning status indicating the inventoried slide is currently being scanned; or a warning status indicating a warning was encountered during scanning of the inventoried slide.

10. The scanning system of claim 9, wherein, in a slide view, the processing results comprise a digital image of a particular inventoried slide.

11. The scanning system of claim 10, wherein the slide view is accessed by selecting the particular inventoried slide, from the inventory of slides in the rack view, via the touch-panel display.

12. A method comprising:
generating a graphical user interface comprising a graphical representation of a carousel, the carousel comprising a plurality of rack slots configured to receive slide racks, wherein the graphical representation of the carousel comprises a graphical representation of each of the plurality of rack slots, wherein the graphical representation of the carousel indicates a position of the carousel, and wherein the graphical representation of each of the plurality of rack slots indicates a status of a particular rack slot or a slide rack within the particular rack slot;
displaying the graphical user interface on a display of the scanning system;
detecting insertion of a slide rack into a previously empty rack slot of the plurality of rack slots;
automatically rotating the carousel to rotate the slide rack into a position for processing based on detecting the insertion of the slide rack; and
generating an updated graphical user interface comprising an updated graphical representation of the carousel based on automatically rotating the carousel.

13. The method of claim 12, wherein the display comprises a touch-panel display, wherein the graphical representation of each of the plurality of rack slots is selectable via the touch-panel display, wherein the graphical user interface further comprises a viewing pane, the method further comprising:
in response to identifying a selection of the particular rack slot from the graphical representation of each of the plurality of rack slots, populating the viewing pane with information associated with the particular rack slot or the slide rack within the particular rack slot; and,
in response to not identifying a selection of the particular rack slot from the graphical representation of each of the plurality of rack slots, populating the viewing pane with information associated with a slide rack being processed by the scanning system.

14. The method of claim 12, wherein the status of the particular rack slot or the slide rack within the particular rack slot comprises:
an empty status indicating that the particular rack slot is empty;
a waiting status indicating that the slide rack is within the particular rack slot and the slide rack within the particular rack slot is waiting to be processed by the scanning system;
a scanning status indicating that the slide rack is within the particular rack slot and the slide rack within the particular rack slot is being processed by the scanning system;
a complete status indicating that the slide rack is within the particular rack slot and the slide rack within the particular rack slot has been processed by the scanning system; or
a warning status indicating that the slide rack is within the particular rack slot and a warning was encountered during processing of the slide rack within the particular rack slot.

15. The method of claim 12, wherein the display comprises a touch-panel display, wherein the graphical representation of each of the plurality of rack slots is selectable via the touch-panel display, the method further comprising, in response to a selection of a graphical representation of any one of the plurality of rack slots:
displaying a selectable graphical representation of one or more functions available for the particular rack slot; and,
in response to a selection of the selectable graphical representation of the one or more functions, executing a function of the one or more functions.

16. A computer-readable storage medium comprising computer-executable instructions which when executed by a computing device, cause the computing device to:
generate a graphical user interface comprising a graphical representation of a carousel, the carousel comprising a plurality of rack slots configured to receive slide racks, wherein the graphical representation of the carousel comprises a graphical representation of each of the plurality of rack slots, wherein the graphical representation of the carousel indicates a position of the carousel, and wherein the graphical representation of each of the plurality of rack slots indicates a status of a particular rack slot or a slide rack within the particular rack slot;
display the graphical user interface on a display of the scanning system;
detect insertion of a slide rack into a previously empty rack slot of the plurality of rack slots;
automatically rotate the carousel to rotate the slide rack into a position for processing based on detecting the insertion of the slide rack; and
generate an updated graphical user interface comprising an updated graphical representation of the carousel based on automatically rotating the carousel.

17. The computer-readable storage medium of claim 16, wherein the status of the particular rack slot or the slide rack within the particular rack slot comprises:
an empty status indicating that the particular rack slot is empty;
a waiting status indicating that the slide rack is within the particular rack slot and the slide rack within the particular rack slot is waiting to be processed by the scanning system;
a scanning status indicating that the slide rack is within the particular rack slot and the slide rack within the particular rack slot is being processed by the scanning system;
a complete status indicating that the slide rack is within the particular rack slot and the slide rack within the particular rack slot has been processed by the scanning system; or
a warning status indicating that the slide rack is within the particular rack slot and a warning was encountered during processing of the slide rack within the particular rack slot.

18. The computer-readable storage medium of claim 16, wherein the display comprises a touch-panel display, wherein the graphical representation of each of the plurality of rack slots is selectable via the touch-panel display, and wherein, in response to a selection of a graphical representation of any one of the plurality of rack slots, the execution of the computer-executable instructions further causes the computing device to:

display a selectable graphical representation of one or more functions available for the particular rack slot; and, in response to a selection of the selectable graphical representation of the one or more functions, execute a function of the one or more functions.

19. The computer-readable storage medium of claim 16, wherein the one or more functions comprise one or more of:

a rotate function, wherein the rotate function causes rotation of the carousel to position the particular rack slot within an exposed portion of the scanning system, which is exposed to an external environment of the scanning system;

a priority function, wherein the rotate function causes prioritization of processing of the particular rack slot over processing of one or more other rack slots of the plurality of rack slots;

a Z-stacking function, wherein the rotate function causes scanning of at least one slide within the particular slide rack at multiple focal depths; or a setting function, wherein the rotate function causes scanning of at least one slide within the particular slide rack according to a specified scan protocol.

20. The computer-readable storage medium of claim 16, wherein the graphical representation of the carousel comprises a time-till-operation indication, and wherein, in response to determining to rotate the carousel, the execution of the computer-executable instructions further causes the computing device to automatically:

delay automatic rotation of the carousel for a delay period; and, during the delay period, animate the time-till-operation indication to indicate a time remaining within the delay period.

\* \* \* \* \*